US012779771B2

(12) United States Patent
Van De Ven et al.

(10) Patent No.: US 12,779,771 B2
(45) Date of Patent: Nov. 3, 2026

(54) CELLULOSE-BASED FILAMENTS, FILMS AND 3D OBJECTS AND METHODS OF MANUFACTURE THEREOF

(71) Applicant: THE ROYAL INSTITUTION FOR THE ADVANCEMENT OF LEARNING/MCGILL UNIVERSITY, Montreal (CA)

(72) Inventors: Theo G.M. Van De Ven, Montreal (CA); Nur Alam, Thunder Bay (CA); Jean-Philip Lumb, Montreal (CA); Shahidul Islam, Montreal (CA); Mohammadhadi Moradian, Shiraz (IR)

(73) Assignee: THE ROYAL INSTITUTION FOR THE ADVANCEMENT OF LEARNING/MCGILL UNIVERSITY, Montreal (CA)

( * ) Notice: Subject to any disclaimer, the term of this patent is extended or adjusted under 35 U.S.C. 154(b) by 404 days.

(21) Appl. No.: 18/555,768

(22) PCT Filed: Apr. 20, 2022

(86) PCT No.: PCT/CA2022/050599

§ 371 (c)(1),
(2) Date: Oct. 17, 2023

(87) PCT Pub. No.: WO2022/221945

PCT Pub. Date: Oct. 27, 2022

(65) Prior Publication Data

US 2024/0198579 A1 Jun. 20, 2024

Related U.S. Application Data

(60) Provisional application No. 63/177,172, filed on Apr. 20, 2021.

(51) Int. Cl.

| | |
|---|---|
| ***C08B 11/12*** | (2006.01) |
| ***B29C 64/106*** | (2017.01) |
| ***B33Y 70/00*** | (2020.01) |

(52) U.S. Cl.
CPC ............ *B29C 64/106* (2017.08); *B33Y 70/00* (2014.12); *C08B 11/12* (2013.01)

(58) Field of Classification Search
CPC ................................ C08B 11/12; C08L 1/286
See application file for complete search history.

(56) References Cited

U.S. PATENT DOCUMENTS

| | | | | |
|---|---|---|---|---|
| 9,610,379 | B2 | 4/2017 | Vanerek et al. | |
| 2021/0079173 | A1* | 3/2021 | Inoue .................. | A23K 20/163 |
| 2022/0153879 | A1* | 5/2022 | Takayama ............... | C08B 16/00 |

FOREIGN PATENT DOCUMENTS

| | | | | |
|---|---|---|---|---|
| WO | 2016115637 A1 | 7/2016 | | |
| WO | WO-2019221272 A1 * | 11/2019 | ............ | A23C 9/137 |
| WO | WO-2020195671 A1 * | 10/2020 | ............ | D21H 15/02 |

OTHER PUBLICATIONS

Clemons, Homemade Fixative from CMC Powder, Feb. 9, 2019, internet article downloaded from the internet on Feb. 10, 2026, https://dbclemons.wordpress.com/2019/02/09/homemade-fixative-from-cmc-powder/. (Year: 2019).*
Shahbaz,i(Food Hydrocolloids 61 (2016) 378-389. (Year: 2016).*
Adolphe DC, Dolez PI (2018), Advanced strength testing of textiles, Advanced Characterization and Testing of Textiles, The Textile Institute Book Series: 25-57.
Alam MN, Christopher LP (2017), A novel, cost-effective and eco-friendly method for preparation of textile fibers from cellulosic pulps, Carbohydrate Polym., 173:253-258.
Alam MN, Islam MS, Christopher LP (2019), Sustainable production of cellulose-based hydrogels with superb absorbing potential in physiological saline, ACS Omega, 4(5):9419-9426.
Al-Hobaib AS, Al-Sheetan KM, Shaik MR, Al-Suhybani MS (2017), Modification of thin-film polyamide membrane with multi-walled carbon nanotubes by interfacial polymerization, Appl Water Sci. ,7:4341-4350.
Al-Kdasi A, Idris A, Saed K, Guan C (2004), Treatment of Textile Wastewater by Advanced Oxidation Processes, A Review Global Nest Int., J 6:3:222-230.
Amirian M, Chakoli NA, Cai W, Sui J (2013), Effect of functionalized multiwalled carbon nanotubes on thermal stability of poly (L-LACTIDE) biodegradable polymer. Scientia Iranica Transactions F: Nanotechnol., 20 (3):1023-1027.
Baughman RH, Zakhidov AA, de Heer WA (2002), Carbon nanotubes the route toward applications, Science, 297:787-792.
Cai J, Zhang L (2005), Rapid dissolution of cellulose in LiOH/Urea and NaOH/Urea Aqueous Solutions, Macromol Biosci., 5(6):539-548.
Carmichael A (2015), Man-made fibers continue to grow, Textile World Innovation Forum, 165(1):20.
Casaburi A, Rojo UM, Cerrutti P, Vazquez A, Foresti ML (2018), Carboxymethyl cellulose with tailored degree of substitution obtained from bacterial cellulose, Food Hydrocolloids, 75:147-156.
Chaiyasat A, Jearanai S, Christopherc LP, Alam MN (2019), Novel superabsorbent materials from bacterial cellulose, Polym. Int., 68:102 Chaiyasat A 102-109.
Chavan RB (2011), Handbook to textile and industrial dyeing, Principles, processes and types of dyes, vol. 1 in woodhead publishing series in textiles.

(Continued)

*Primary Examiner* — Layla D Berry
(74) *Attorney, Agent, or Firm* — Lavery, de Billy, L.L.P.; Isabelle Pelletier

(57) ABSTRACT

We provide cellulose-based filaments comprising a negatively charged cellulose derivative bearing anionic functional groups as well as bubble-free films and 3D objects comprising partially decarboxylated carboxymethyl cellulose, wherein these cellulose derivatives have a charge content of less than or equal to about 1.4 mEq/g of cellulose. The filaments have a diameter of between about 1 μm and about 50 μm. Method of producing these filaments and bubble-free films and 3D objects are also provides. These methods comprise extrusion or immersion into a coagulation bath. Films can be overlaid or bent to form 3D objects.

20 Claims, 29 Drawing Sheets

(56) References Cited

OTHER PUBLICATIONS

Chen Z, Burger C, Wan F, Zhang J, Rong L, Hsiao BS, Chu B, Cai J, Zhang L (2007), Structure study of cellulose fibers wet-spun from environmentally friendly NaOH/urea aqueous solutions. Biomacromolecules, 8(6): 1918-1926.
CMC Book, 1st edition, CPKelco, a Huber Company, Carbonxymethyl cellulose (CMC).
El Seoud OA, Koschella A, Fidale LC, Dorn S, Heinze T (2007), Applications of ionic liquids in carbohydrate chemistry: A window of opportunities, Biomacromol 8(9): 2629-2647.
Elliott A, Hanby W, Malcolm B (1954), The Near Infra-Red Absorption Spectra of Natural and Synthetic Fibres, Br J Appl Phys., vol. 5:377-381.
Fei B (2018), High-performance fibers for textiles, Engineering of High-Performance Textiles, The Textile Institute Book Series, 27-58.
Ferguson, A.D. and Taylor, T.P. (1990), Standard methods for determination of the color fastness of textile and leathers, Society of dyes and colorists publication (5th ed.), 1006 Bradford, England: The Society of Dyers and Colourists.
Fushimi F, Watanabe T, Hiyoshi T., (1996), Role of interfacial potential in coagulation of cuprammonium cellulose solution, Journal of Applied Polymer Science, 59:15-21.
Ghaly AE, Ananthashankar R, Alhattab M, Ramakrishnan VV (2014), Production, characterization and treatment of textile effluents: A critical review, J Chem Eng Process Technol., vol. 5, No. 1, 1-18.
Global Rayon Fibers Market (2014), TechNavio market research report Dec. 24, SKU: IRTNTR4944.
Hummel M, Michud A, Tanttu M, Asaadi S, Ma Y, Hauru LKJ, Parviainen A, King AWT, Kilpelainen I, Sixta H (2016), Ionic liquids for the production of man-made cellulosic fibers: Opportunities and challenges, Cellulose Chemistry and Properties: Fibers, Nanocelluloses and Advanced Materials, 271:133-168.
Ingildeev D, Effenberger F, Bredereck K, Hermanutz F (2013), Comparison of direct solvents for regenerated cellulosic fibers via the lyocell process and by means of ionic liquids, Journal of Applied Polymer Science, 128 (6):4141-4150.
Keshk, Sherif M.A.S., (2008), Homogenous reactions of cellulose from different natural sources, Carbohydrate Polym., 74:942-945.
Kolorjet Chemicals Pvt ltd. (2010), Dyes and Pigments Textile Dyes.
Lafi R, Gzara L, Lajimi RH, Hafiane A (2018), Treatment of textile wastewater by a hybrid ultrafiltration/electrodialysis process, Chem Eng Processing: Process Intensification, 132:105-113.
Laszkiewicz B, Wcislo P, Cuculo JA (1992), Fibers made from concentrated viscose solutions, Journal of Applied Polymere Science, 46 (3):445-448.
Liu W, Wang M, Xu L, Zhang W, Xing Z, Hu J, Yu M, Li J, Wu G (2019), Radiation Technology Application in High-Performance Fibers and Functional Textiles, Radiation Technology for Advanced Materials From Basic to Modern Applications, 13-73.
Liu Z, Wang H, Li Z (2011), Characterization of the regenerated cellulose films in ionic liquids and rheological properties of the solutions. Mater Chemi Phys., 128 (1-2):220-227.
Long L, Dengru L, Miao W, Guocheng D, Jian C (2007), Preparation and Characterization of Sponge-like Composites by Cross-Linking Hyaluronic Acid and Carboxymethylcellulose Sodium with Adipic Dihydrazide, Eur Polym J., 43:2672-2681.
Moradian, M, Islam Md S. and van de Ven T.G.M. (2021), Insoluble regenerated cellulose films made from mildly carboxylated dissolving and kraft pulps, Industrial & Engineering Chemistry Research, 60 (15), 5385-5393.
Morton WE, Hearle JWS (2008) Physical properties of textile fibers (4th ed.), Boca Raton, FL, USA: Woodhead Publishing Limited and CRC Press LLC.
Mundsinger K, Muller A, Beyer R, Hermanutz F (2015), Multifilament cellulose/chitin blend yarn spun from ionic liquids, Carbohydrate Polymer, 131: 34-40.
Pagga U, Brown D (1986), The Degradability of Dyestuffs: Part II Behaviour of Dyestuffs in Aerobic Biodegradation Tests, Chemosphere, 15: 479-491.
Philipp B (1993), Organic solvents for cellulose as a biodegradable polymer and their applicability for cellulose spinning and derivatization, Journal of Macromolecular Science Pure and Applied Chemistry, A30(9-10): 703-714.
Rogers RD, Seddon KR (2003), Ionic liquids solvents of the future, Science, 302(5646):792-793.
Sabzalian Z, Alam MN, van de Ven TGM (2014), Hydrophobization and characterization of internally crosslink-reinforced cellulose fibers, Cellulose, 21:1381-1393.
Salvetat J-P, Bonard J-M, Thomson NH, Kulik AJ, Forro L, Benoit W, Zuppiroli L (1999), Mechanical properties of carbon nanotubes, Appl Phys A-Mater Sci Process, 69:255-260.
Siddiqua UH, Ali S, Iqbal M, Hussain T (2017), Relationship between structure and dyeing properties of reactive dyes for cotton dyeing, Journal of Molecular Liquids, 241:839-844.
Singh JP, Verma S (2017), Woven terry fabrics, Manufacturing and quality management, A volume in woodhead publishing series in textiles.
Subramoney S (1998), Novel Nanocarbon Structure, Properties, and Potential Applications, Adv Mater., 10:1157-1171.
Thostenson ET, Ren ZF, Chou T-W (2001), Advances in the science and technology of carbon nanotubes and their composites: a review, Compos Sci Technol., 61:1899-1912.
Valldeperas-Morell J, Carrillo-Navarrete F (2012), Color fastness, Understanding and Improving the Durability of Textiles, p. 82-103.
Yang H, Tejado A, Alam MN, Antal M, van de Ven TGM (2012), Films prepared from electrosterically stabilized nanocrystalline cellulose, Langmuir, ACS Publications, 28:7834-7842.

* cited by examiner

FIG. 5
(A)
Ethanol washed
Spun from modified cellulose with
1.3 mmol -COOH/g cellulose
Post-treated
200 µm
200 µm
(B)
Water washed
Spun from modified cellulose with
1.3 mmol -COOH/g cellulose
Post-treated
200 µm
200 µm
(C)
Ethanol washed
Spun from modified cellulose with
1.5 mmol -COOH/g cellulose
Post-treated
200 µm
(D)
Water washed
1.5 mmol -COOH/g cellulose
200 µm
(E)
Ethanol washed
Spun from modified cellulose with
1.7 mmol -COOH/g cellulose
Post-treated
200 µm
Water washed
1.7 mmol -COOH/g cellulose
200 µm

Carboxylated CNT

Amine functionalized CNT

Modified cellulose

Amine functionalized CNT

Modified cellulose cross-linked by f-CNT composite (CMF)

(Reactive orange 5)

(Reactive green 19)
(CMF)

back titration

1.72 mmol/g a)
b)

CELLULOSE-BASED FILAMENTS, FILMS AND 3D OBJECTS AND METHODS OF MANUFACTURE THEREOF

CROSS REFERENCE TO RELATED APPLICATIONS

This application is a National Entry Application of PCT application No. PCT/CA2022/050599 filed on Apr. 20, 2022 and published in English under PCT Article 21(2), which itself claims benefit of U.S. provisional application Ser. No. 63/177,172, filed on Apr. 20, 2021. All documents above are incorporated herein in their entirety by reference.

FIELD OF THE INVENTION

The present invention relates to cellulose-based filaments. More specifically, the present invention is concerned with cellulose-based filaments which can be washed and dried repeatedly, including methods of production thereof.

BACKGROUND OF THE INVENTION

Global volumes of textile production currently exceed 100 million metric tons per year, of which 63% is produced from petroleum (mainly polyester). This manufacturing stream is linked to a non-renewable carbon deposit, and is marked by high-energy processing technologies that produce high-risk effluents. Of the remaining 37% of textile production, 31% is derived from cotton, which is characterized by high water and pesticide use and 1% is wool. Non-cotton, cellulose-derived filaments currently account for about 5 million tons (5%) per year and is a fast-growing market. The majority of these filaments are made by the "rayon" or "viscose" process, in which cellulose is modified with carbon disulfide into cellulose xanthate, which, when passing through an acid bath, is changed back into (regenerated) cellulose, releasing the carbon disulfide. Carbon disulfide has a recommended daily exposure limit of 10 ppm, representing an acutely toxic component of the current manufacturing pipeline that creates risk to worker health and safety in both processing and waste-mitigation phases of production. Post production filament modification, including coloration or the introduction of antimicrobials, presents an additional, chemically intensive step, which is largely conducted in developing nations (e.g. India, Bangladesh or China), where relaxed environmental regulations do not prevent effluent discharge into local water supplies.

Other solvents which are being used to make textile from regenerated cellulose are: MNNO (N-methylmorpholine N-oxide), deep eutectic solvents and ionic liquids. These solvents need to be recovered, which requires an additional step in the production of textile.

Usually dyes are used as coloring materials for yarns in the dyeing industries. Different types of black dyes are used to produce black textile materials. Generally, white yarns are manufactured first and then dyeing of these yarns is performed at a later stage. During dyeing of textile materials, not all dyes attach to the fabrics and always a portion of them get released with water to the environment. Each day, approximately 1000-3000 $m^3$ of wastewaters are released to the environment after producing 12-20 tonnes of dyed textile materials. These wastewaters are highly concentrated with dyes and chemicals. Some of these dyeing chemicals are non-biodegradable, carcinogenic and can be a serious threat to health and the environment if they are not treated properly before discharging. Therefore, having an effluent treatment plant is a major requirement in current textile industries.

One of the most significant properties of textile filaments is their mechanical strength. Mechanical strength indicates the ability of filament resistance to external damage, which primarily determines the longevity of textile products. Textile filaments with high mechanical strength are in high demand for the manufacturing of high-quality textile products. Water absorbency is also an important property of textile filaments. Textile filaments with low water absorbency are preferred for high-quality textile applications.

On another related subject, polyethylene and polypropylene are neither renewable nor recyclable. The production of cellophane films (thin, transparent sheet made of regenerated cellulose) involves toxic $CS_2$. These are produced from regenerating cellulose from cellulose xanthate and do not contain charged functional groups.

Renewable drinking straws are made from paper, PLA (polylactic acid), or aluminum, but these straws become soggy, are expensive, or difficult to clean. Renewable cups, made from paper are usually lined with a plastic non-renewable film; or made from biopolymers, like PLA, which are expensive and cannot hold hot drinks.

Most plastic products are made from a molten polymer solution by molding. Cellulose-based products cannot be made this way, because cellulose degrades before it melts.

SUMMARY OF THE INVENTION

In accordance with the present invention, there is provided:

1. A cellulose-based filament comprising a negatively charged cellulose derivative bearing anionic functional groups, wherein said anionic functional groups are covalently bonded to the cellulose derivative, wherein the cellulose derivative has a charge content of less than or equal to about 1.4 mEq/g of cellulose, and wherein the cellulose-based filament has a diameter of between about 1 μm and about 50 μm.
2. The cellulose-based filament of embodiment 1, having a diameter of at most about 50 μm, preferably at most about 25 μm, more preferably at most about 15 μm, and most preferably has a dimeter of about 10 μm.
3. The cellulose-based filament of embodiment 2, wherein the diameter is between about 10 μm and about 50 μm.
4. The cellulose-based filament of any one of embodiments 1 to 3, wherein the cellulose derivative has a charge content between about 0.8 and about 1.4 mEq/g of cellulose, preferably between about 1.0 and about 1.4 mEq/g of cellulose.
5. The cellulose-based filament of any one of embodiments 1 to 4, wherein the cellulose derivative is cross-linked.
6. The cellulose-based filament of any one of embodiments 1 to 5, wherein the anionic functional groups are covalently bonded at the C2, C3, and/or C6 positions of the glucose units of the cellulose, preferably at the C2 position.
7. The cellulose-based filament of any one of embodiments 1 to 6, wherein the anionic functional groups are carboxyalkyl groups (preferably carboxymethyl groups), phosphoryl groups, amine functionalized carboxylated carbon nanotubes, reactive orange 5 dye, reactive red 2 dye, reactive green 19 dye, or combinations thereof.

8. The cellulose-based filament of any one of embodiments 1 to 7, wherein the cellulose-based filament consists of the cellulose derivative.
9. The cellulose-based filament of any one of embodiments 1 to 8, wherein the cellulose derivative is carboxymethyl cellulose.
10. The cellulose-based filament of any one of embodiments 1 to 9, wherein the cellulose-based filaments are free of bubbles.
11. The cellulose-based filament of any one of embodiments 1 to 10, wherein the cellulose derivative is partially decarboxylated carboxymethyl cellulose bearing.
12. A method of producing cellulose-based filaments, the method comprising the steps of:
    a) providing a negatively charged cellulose derivative bearing anionic functional groups, wherein said anionic functional groups are covalently bonded to the cellulose derivative, and wherein the cellulose derivative has a charge content greater than or equal to 0.8 mEq/g of cellulose,
    b) preparing a dope solution comprising the cellulose derivative;
    c) extruding said dope solution into a coagulation bath so as to obtain cellulose-based filaments; and if the cellulose-based filaments have a charge content of greater than about 1.4 mEq/g of cellulose,
    d1) curing the cellulose derivative so as to reduce the charge content to less than or equal to about 1.4 mEq/g of cellulose, and if the cellulose-based filaments have a charge content of less than or equal to about 1.4 mEq/g f cellulose,
    d2) optionally curing the cellulose derivative, such that the charge content of the cellulose-based filaments remains less than or equal to about 1.4 mEq/g of cellulose,
13. The method of embodiment 12, wherein the cellulose-based filaments the cellulose-based filaments as defined in any one of embodiments 1 to 11.
14. The method embodiment 12 or 13, further comprising the step of producing the cellulose derivative by functionalizing cellulose so as to add said anionic functional groups.
15. The method of any one of embodiments 12 to 14, wherein the cellulose derivative is carboxymethyl cellulose, preferably partially decarboxylated carboxymethyl cellulose.
16. The method of embodiment 15, further comprising reacting cellulose with sodium chloroacetate to produce carboxylated carboxymethyl cellulose.
17. The method of embodiment 15 or 16, further comprising the step of partially decarboxylating the carboxymethyl cellulose.
18. The method of embodiment 17, wherein said partially decarboxylating is carried out by exposing the carboxymethyl cellulose to a solution with a pH of less than about 4 (preferably of about 3.5), then increasing the pH to about 8 in about 15 minutes, and allowing the partial decarboxylation to occur.
19. The method of any one of embodiments 12 to 18, the charge content of the cellulose derivative provided at step a) is greater than or equal to about 1.0 mEq/g of cellulose, preferably greater than about 1.0 mEq/g of cellulose.
20. The method of any one of embodiments 12 to 19, wherein the dope solution is provided by dissolving the cellulose derivative in an alkaline aqueous solution so as to create the dope solution.
21. The method of embodiment 20, wherein the alkaline aqueous solution is an NaOH aqueous solution.
22. The method of embodiment 21, wherein the dope a NaOH/cellulose derivative weight ratio of about 0.3 to about 1.
23. The method of any one of embodiments 12 to 22, wherein the dope solution has a cellulose derivative concentration between about 4 wt % and about 8 wt %, preferably about 7 wt %, based on the total weight of the dope.
24. The method of any one of embodiments 12 to 23, further comprising filtering the dope before step c).
25. The method of any one of embodiments 12 to 24, wherein the extruding step is performed by pumping the dope through a spinneret plate, into a coagulation bath so as to cause the cellulose-based filaments to precipitate.
26. The method of embodiment 25, wherein the coagulation bath is an acid coagulation bath, preferably a bath of 10% $H_2SO_4$ aqueous solution.
27. The method of any one of embodiments 12 to 26, further comprising collecting and washing the cellulose-based filaments after step c).
28. The method of embodiment 27, wherein the cellulose-based filaments are collected together and passed via drawing rolls into a washing bath, and then collected onto a reel.
29. The method of any one of embodiments 12 to 29, wherein step d1) and step d2) comprise dipping the cellulose-based filaments into a solution of a curing agent.
30. The method of embodiment 29, wherein the solution of the curing agent has a pH of about 3.5.
31. The method of embodiment 29 or 30, wherein the curing agent is $NaPO_2H_2$.
32. The method of anyone of embodiments 29 to 32, wherein the solution of the curing agent is a 5% $NaPO_2H_2$ solutio.
33. The method of any one of embodiments 12 to 32, wherein optional curing step d2) is carried out.
34. The method of any one of embodiments 12 to 28, wherein optional curing step d2) is not carried out.
35. Textile comprising the cellulose-based filaments as defined in any one of embodiments 1 to 11.
36. A bubble-free film or 3D object comprising carboxymethyl cellulose, wherein carboxymethyl groups are covalently bonded to the carboxymethyl cellulose, wherein the carboxymethyl cellulose has a charge content of less than or equal to about 1.4 mEq/g of cellulose, and wherein the carboxymethyl cellulose is partially decarboxylated.
37. The film or 3D object of embodiment 36, wherein the carboxymethyl groups are covalently bonded at C2, C3, or C6 positions of the glucose units of the cellulose, preferably at the C2 position.
38. The film or 3D object of embodiment 36 or 37, wherein the carboxymethyl cellulose is crosslinked.
39. The film or 3D object of any one of embodiments 36 to 38, wherein the charge content is between about 0.8 and about 1.4 mEq/g, more preferably between about 1.0 and about 1.4 mEq/g.
40. The film or 3D object of any one of embodiments 36 to 39, consisting of said carboxymethyl cellulose.
41. The film or 3D object of any one of embodiments 36 to 40, wherein up to about one third of the carboxymethyl groups (preferably from about 15% to about 33% of the carboxymethyl groups) have been replaced by methyl groups in the partially decarboxylated carboxymethyl cellulose.

42. The film or 3D object of any one of embodiments 36 to 41, wherein the film has a thickness from about 1 μm to about 100 μm.
43. The film or 3D object of any one of embodiments 36 to 42, wherein the film has a thickness from about 30 μm to about 100 μm 44. The film or 3D object of any one of embodiments 36 to 42, wherein the film has a thickness from about 1 μm to about 30 μm and the carboxymethyl cellulose is cross-linked.
45. The film or 3D object of any one of embodiments 36 to 44, comprising a dye.
46. The film or 3D object of any one of embodiments 36 to 45, wherein the 3D object is made of a stack of said film.
47. The film or 3D object of any one of embodiments 36 to 45, wherein the 3D object is made of one or more of said film shaped into a 3D shape.
48. The film or 3D object of any one of embodiments 36 to 45, wherein the 3D object is made of the film bent so a part of the film is into contact with another part of film, preferably wherein the film is rolled onto itself in the shape of a tube.
49. The film or 3D object of any one of embodiments 36 to 48, being free of glue.
50. A method of producing a bubble-free film or 3D object, the method comprising the steps of:
    A) providing carboxymethyl cellulose, wherein carboxymethyl groups are covalently bonded to the cellulose derivative wherein the carboxymethyl cellulose has a charge content greater than or equal to 0.8 mEq/g of cellulose, and wherein the carboxymethyl cellulose is partially decarboxylated,
    B) preparing a dope solution comprising the carboxymethyl cellulose;
    C) extruding said dope solution into a coagulation bath or depositing said dope onto a substrate and then immerging the substrate with the dope solution into a coagulation bath, so as to obtain a film or a 3D object, and if the film or the 3D object has a charge content of greater than about 1.4 mEq/g of cellulose,
    D1) curing the carboxymethyl cellulose so as to reduce the charge content to less than or equal to about 1.4 mEq/g of cellulose, and if the film or the 3D object has a charge content of less than or equal to about 1.4 mEq/g f cellulose,
    D2) optionally curing the carboxymethyl cellulose, such that the charge content of the cellulose-based filaments remains less than or equal to about 1.4 mEq/g of cellulose.
51. The method of embodiment 50, wherein the bubble-free film or 3D object is as defined in any one of embodiments 36 to 49.
52. The method of embodiment 50 or 51, wherein step A) comprises carboxymethylating cellulose so as to add carboxyl groups and then, partially decarboxymethylating the carboxymethylated cellulose.
53. The method of embodiment 52, wherein cellulose is carboxymethylated by reacting cellulose with sodium chloroacetate to produce carboxylated carboxymethyl cellulose.
54. The method of embodiment 52 or 53, wherein the carboxymethylated cellulose is partially decarboxylated by exposing the carboxymethyl cellulose to a solution with a pH of less than about 4 (preferably of about 3.5), then increasing the pH to about 8 in about 15 minutes, and allowing the partial decarboxylation to occur.
55. The method of any one of embodiments 50 to 54, wherein the carboxymethylated cellulose has a carboxyl group content of about 1.0 to about 2.5 mmol —COOH/g cellulose.
56. The method of any one of embodiments 50 to 55, wherein the charge content of the carboxymethylated cellulose provided at step A) is greater than or equal to about 1.0 mEq/g of cellulose, preferably greater than about 1.0 mEq/g of cellulose.
57. The method of any one of embodiments 50 to 56, wherein the cellulose used as a starting material for producing the carboxymethylated cellulose is biomass, such as (chemo-) thermomechanical pulp (TMP), sawdust, forest and agricultural waste, recycled papers, etc.
58. The method of any one of embodiments 50 to 57, wherein the cellulose used as a starting material for producing the carboxymethylated cellulose is ground and then optionally screened.
59. The method of any one of embodiments 50 to 58, wherein the dope solution is provided by dissolving the cellulose derivative in an alkaline aqueous solution so as to create the dope solution.
60. The method of embodiment 59, wherein the alkaline aqueous solution is an NaOH aqueous solution.
61. The method of embodiment 60, wherein the dope a NaOH/cellulose derivative weight ratio of about 0.3 to about 1.
62. The method of any one of embodiments 50 to 61, wherein the dope solution has a cellulose derivative concentration between about 4 wt % and about 8 wt %, preferably about 7 wt %, based on the total weight of the dope.
63. The method of any one of embodiments 50 to 62, further comprising filtering the dope before step C.
64. The method of any one of embodiments 50 to 63, further comprising flocculating and separating colloidal material from the dope.
65. The method of any one of embodiments 50 to 64, wherein the dope further comprises a dye.
66. The method of any one of embodiments 50 to 65, wherein the dope further comprises a crosslinker, preferably a biodegradable crosslinker, such as epichlorohydrine.
67. The method of embodiment 66, wherein the dope has a crosslinker concentration of about 5 to about 15 wt %, preferably about 10 wt %, based on the total weight of the dope.
68. The method of any one of embodiments 50 to 67, wherein the coagulation bath is an acid coagulation bath, preferably a bath containing a 10% $H_2SO_4$ solution.
69. The method of any one of embodiments 50 to 68, step c) comprises extruding said dope solution through an extruder die into the coagulation bath, so as to obtain a film or a 3D object.
70. The method of embodiment 69, wherein the die is a slit, preferably about 0.5 to about 1 mm wide.
71. The method of embodiment 69, wherein the die is a ring.
72. The method of any one of embodiments 69 to 71, wherein the film or 3D object is pulled or pushed away from the die.

73. The method of any one of embodiments 50 to 72, further comprising washing the film or 3D object.
74. The method of any one of embodiments 50 to 73, further comprising drying the film or 3D object.
75. The method of any one of embodiments 50 to 58, wherein step c) comprises depositing said dope onto the substrate and then immerging the substrate with the dope solution into the coagulation bath, so as to obtain a film or a 3D object.
76. The method of embodiment 75, wherein the dope comprises undissolved fiber particles in the dope, e.g. from about 5 to about 20 wt % undissolved fiber particles, based on the total weight of the dope.
77. The method of embodiment 75 or 76, wherein the dope has a the carboxymethylated cellulose concentration of about 8 to about 15 wt %, based on the total weight of the dope.
78. The method of any one of embodiments 75 to 78, wherein the dope further comprises a crosslinker, the dope on the substrate is heated, for example in an oven, for example at about 100° C., e.g., for about 15 minutes or until completely dry, to allow crosslinking of the carboxymethylated cellulose, before the substrate with the dope is immersed in the coagulation bath.
79. The method of any one of embodiments 75 to 78, the dope is deposited to form a layer on the substrate, the layer is preferably about 20 μm to about 50 μm thick, more preferably about 30 μm thick.
80. The method of any one of embodiments 75 to 79, wherein the substrate is planar, and the dope is deposited to form a layer on the substrate.
81. The method of any one of embodiments 75 to 79, wherein the substrate is non-planar, and the dope is deposited to form a layer on the substrate, preferably the substrate is a mold, and the dope is deposited to form a layer around the mold or inside the mold.
82. The method of any one of embodiments 50 to 81, further comprising washing the film or 3D object, preferably with water.
83. The method of any one of embodiments 50 to 82, further comprising drying the film or 3D object.
84. The method of any one of embodiments 50 to 83, wherein step D1) and step D2) comprise dipping the film or 3D object into a solution of a curing agent.
85. The method of embodiment 84, wherein the solution of the curing agent has a pH of about 3.5.
86. The method of embodiment 84 or 85, wherein the curing agent is $NaPO_2H_2$.
87. The method of any one of embodiments 84 to 76, wherein the solution of the curing agent is a 5% $NaPO_2H_2$ solution.
88. The method of any one of embodiments 50 to 87, wherein optional curing step D2) is carried out.
89. The method of any one of embodiments 50 to 87, wherein optional curing step D2) is not carried out.
90. The method of any one of embodiments 50 to 89, further comprising step E) of shaping one or more films produced according to steps A) to C) into a 3D object, either before or after steps D1) and D2).
91. The method of embodiment 90, wherein step E) comprises at least partially overlaying two or more films while said films are nearly dry, but still contain enough moisture to allow the films to stick together upon further drying, and then allowing the films to dry.
92. The method of embodiment 91, wherein the two or more films are completely overlaid.
93. The method of embodiment 91, wherein the two or more films are partially overlaid 94. The method of embodiment any one of embodiments 91 to 93, wherein the two or more films are be overlaid within a mold to form a 3D object.
95. The method of embodiment 90, wherein step E) comprises the step of bending a film onto itself so a part of the film comes into contact with another part of film, while said film is nearly dry, but still contains enough moisture to allow said parts of the film to stick together upon further drying, and then allowing the film(s) to dry.
96. The method of embodiment 95, wherein the film is rolled onto itself one or more times, forming a tube.

DETAILED DESCRIPTION OF THE INVENTION

Figure 1:
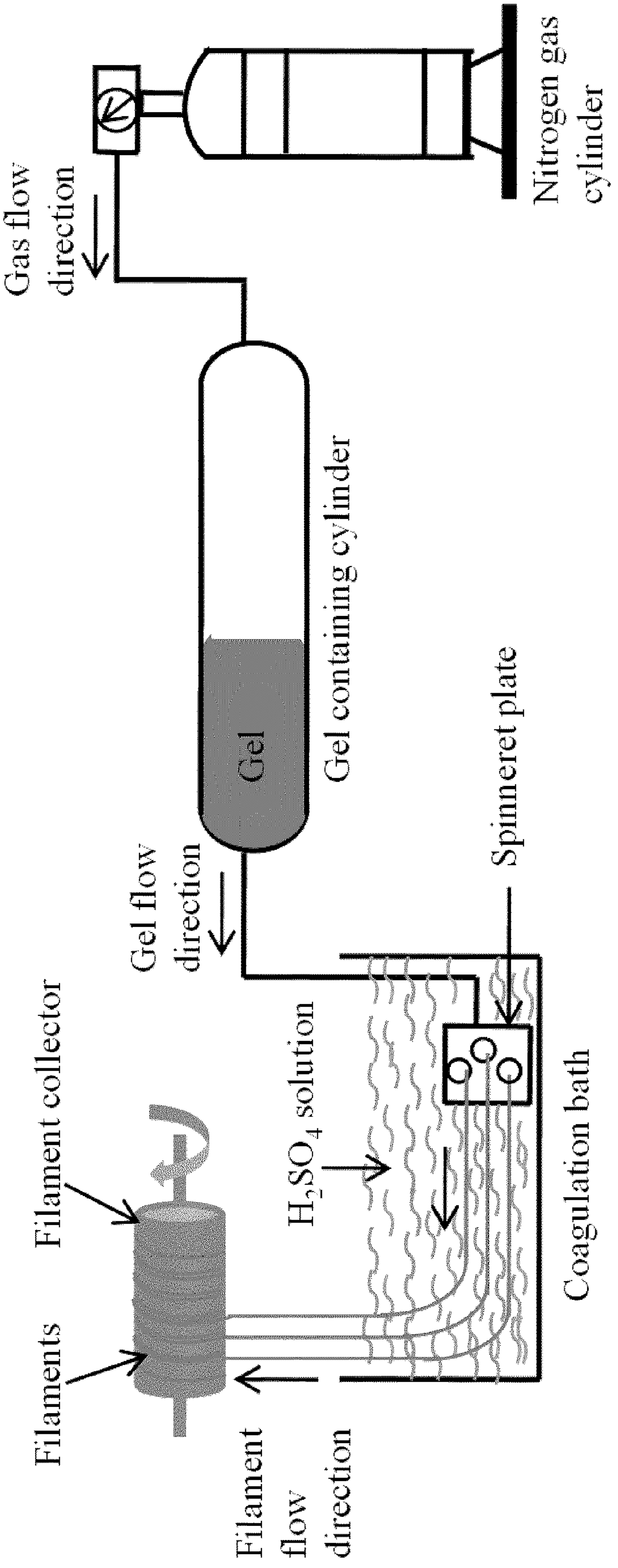
FIG. 1 shows a schematic representation of an extrusion process to fabricate textile filaments according to an embodiment of the present invention.

In a first aspect of the invention, there is provided a cellulose-based filament comprising a negatively charged cellulose derivative bearing anionic functional groups.

The present inventors discovered that cellulose-based filaments with a charge content of less than or equal to about 1.4 mEq/g of cellulose and with a diameter of at most about 50 μm (i.e. an appropriate size for textile production) are surprisingly not superabsorbent, meaning they can be repeatedly washed and dried. This means that said cellulose-based filaments can be used to make reusable textiles. The present inventors also discovered that when specific anionic functional groups are used, the resulting cellulose-based filaments can be endowed with various advantageous properties. In addition, the inventors demonstrated that by functionalizing cellulose to produce the negatively charged cellulose derivative bearing anionic functional groups, the cellulose is thereby modified at the stage of the dope, as opposed to after the filament has been extruded or woven into a textile.

In embodiments, in addition to the advantages previously discussed, the cellulose-based filaments of the present invention can present one or more of the following advantages:

- Increased mechanical strength (in embodiments, the cellulose-based filaments can have tenacities of at least 0.8 cN/dtex, preferably at least 0.9 cN/dtex, more preferably at least 0.96 cN/dtex, even more preferably at least 1.1 cN/dtex when dry, and at least 0.63 cN/dtex, preferably at least 0.96 cN/dtex, more preferably at least 1.1 cN/dtex in wet conditions);
- Decreased water absorbency (in embodiments, the cellulose-based filaments can have water absorbencies of at most 0.75 g water/g filament, preferably at most 0.61 g water/g filament);
- Improved colour-fastness (if the anionic functional group dyes the filament) (in embodiments, the cellulose-based filaments can exhibit excellent values of fastness, i.e., 5, to washing, rubbing, light and perspiration).

The cellulose-based filaments of the present invention can be used in a variety of applications. In embodiments, the cellulose-based filaments of the present invention can be woven into textiles. Due to the non-superabsorbent properties of the cellulose-based filaments, the resulting textile can be repeatedly washed and dried, thereby making it reusable. In addition, the resulting textile will also comprise the other characteristics of the cellulose-based filament; for example, a textile made from a fire-retardant or fluorescent cellulose-based filament will itself have fire retardant or fluorescent qualities.

Accordingly, the applications of the cellulose-based filaments of the present invention are vast; they can be employed in any known application for non-superabsorbent filaments. Besides being woven into textiles, the cellulose-based filaments of the present invention can be used in non-wovens and used as fillers in composite materials or strength agents in papermaking.

In addition, the method for producing the filaments of the present invention can present one or more of the following advantages:

- in embodiments, the method of the present invention is environmentally sensitive and economically viable;
- if dyed textile filaments are produced directly from the dope solution using the method of the present invention, an effluent treatment plant is not required, which inter alia lowers productions costs (in addition, there can be little to no release of dyes from the filaments into the acid bath during extrusion of the gel);
- in embodiments, high quality black color textile filaments can be obtained without using any conventional black dye; and
- Various chemicals used in the reactions can be reused (see for example Examples 1, 2, and 3).

Cellulose-Based Filaments

In a first aspect of the invention, a cellulose-based filament comprising a negatively charged cellulose derivative bearing anionic functional groups is provided, wherein said anionic functional groups are covalently bonded to the cellulose derivative wherein the cellulose derivative has a charge content of less than or equal to about 1.4 mEq/g of cellulose, and wherein the cellulose-based filament has a diameter of at most about 50 μm.

As noted above, the cellulose-based filament has a diameter of at most about 50 μm, preferably at most about 25 μm, more preferably at most about 15 μm, and most preferably has a dimeter of about 10 μm. In embodiments, such cellulose-based filament has been manufactured by extruding the negatively charged cellulose derivative through a spinneret. In preferred embodiments, the cellulose-based filament of the present invention can be made from a negatively charged cellulose derivative using the method described in more detail below. In embodiments, the cellulose-based filament has a diameter of between about 10 μm and about 50 μm.

The negatively charged cellulose derivative bearing anionic functional groups that is used to make the cellulose-based filament of the present invention is cellulose that has been modified in such a manner that said anionic functional groups are covalently bonded to the cellulose derivative, thereby resulting in a cellulose derivative with a negative charge. In embodiments, the anionic functional groups are covalently bonded at the C2, C3, and/or C6 positions of the glucose units of the cellulose, preferably at the C2 position. It is to be understood that the anionic functional groups are covalently bonded to the cellulose, as opposed to for example being ionically bonded to the cellulose or adsorbed to the cellulose.

In embodiments of the present invention, the negatively charged cellulose derivative is optionally crosslinked.

The anionic functional groups can be any anionic functional group known in the art that can covalently bond with cellulose. In preferred embodiments, said anionic functional groups are carboxyalkyl groups (preferably carboxymethyl groups), phosphoryl groups, amine functionalized carboxylated carbon nanotubes, reactive orange 5 dye, reactive red 2 dye, reactive green 19 dye, or combinations thereof.

Figure 10:
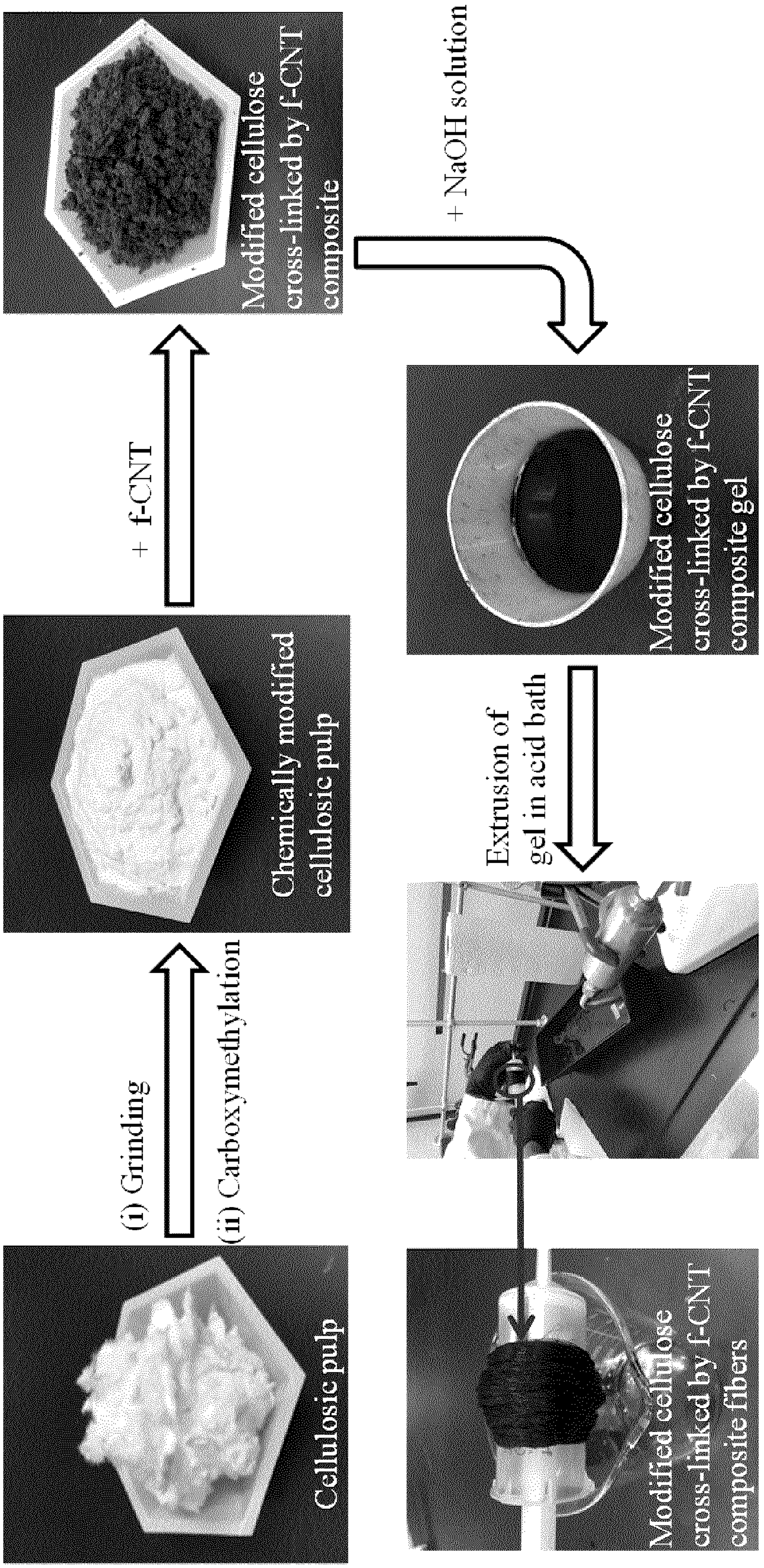
FIG. 10 shows preparation of negatively charged cellulose derivative (labelled as modified cellulose) cross-linked by f-CNT composite textile filaments from cellulosic pulps.
Figure 11:
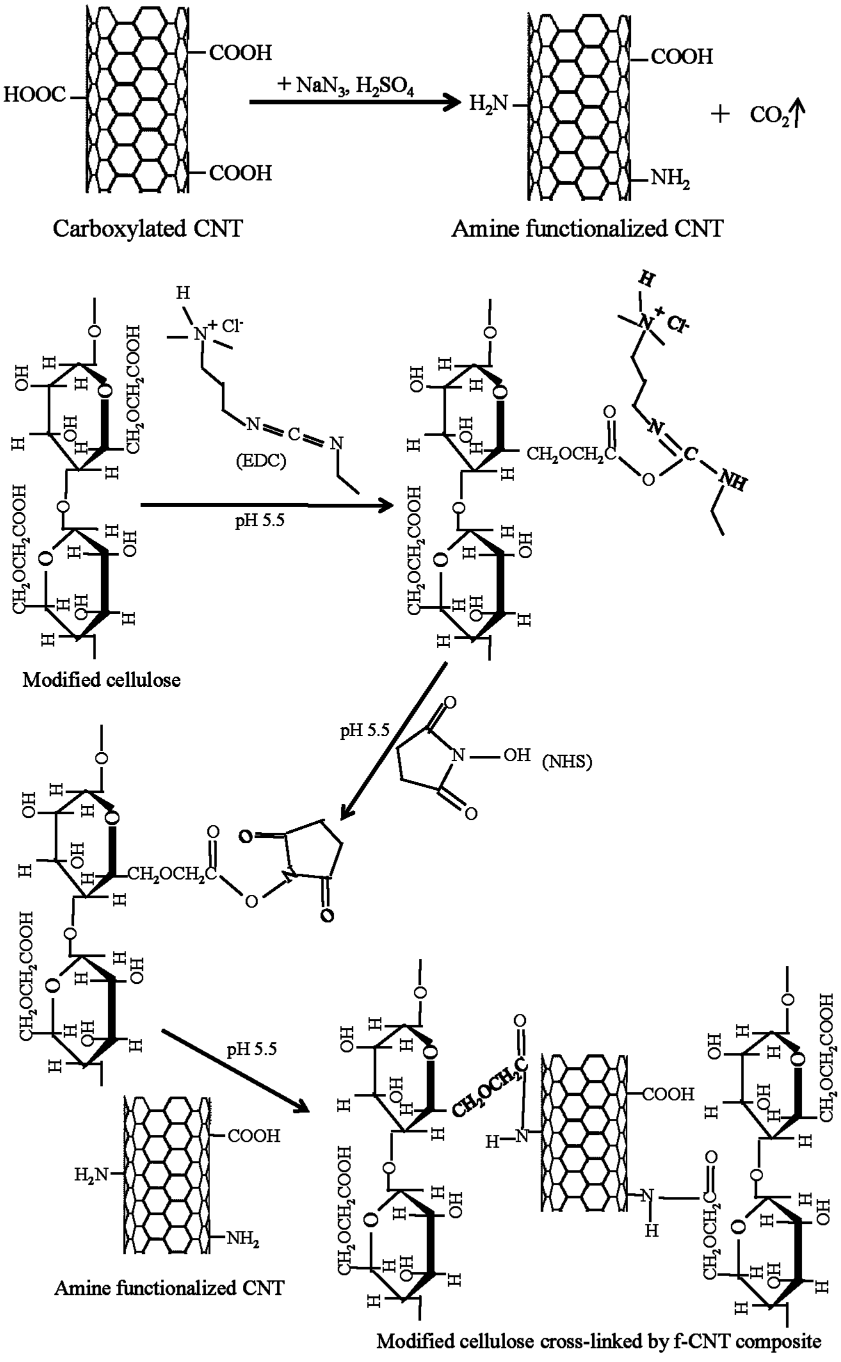
FIG. 11 shows conversion of carboxylated CNT to amine functionalized carboxylated CNT and cross-linking reaction between negatively charged cellulose derivative (labelled as modified cellulose) and f-CNT.

The presence of certain anionic functional groups can provide the cellulose-based filament with various desirable characteristics. The following represent various anionic functional groups which can be used, along with the effect said anionic functional group has on the cellulose-based filament:

- Amine functionalized carboxylated carbon nanotubes (f-CNT, see FIG. 11). These f-CNTs can cross-link the cellulose together. When this occurs, the mechanical strength of the cellulose-based filament can be increased and water absorbency can be decreased. In addition, the use of f-CNTs results in a black cellulose-based filament (see FIG. 10).
- Reactive orange 5 dye: the use of this dye can result in orange cellulose-based filament (see FIG. 16(B)).
- Reactive red 2 dye: the use of this dye can result in pink cellulose-based filament (see FIG. 16(C)).
- Reactive green 19 dye: the use of this dye can result in blue-green cellulose-based filament (see FIG. 16(D)), and increased mechanical strength.

It is to be understood that the negatively charged cellulose derivative can bear a variety of anionic functional groups at once. For example, the negatively charged cellulose can bear both covalently bonded carboxymethyl groups, as well as f-CNTs cross-linking cellulose strands together. It is to be understood that when an anionic functional group cross-links cellulose strands together, the charge of the anionic functional group is only counted once when calculating the charge content of the cellulose-based filament. It is also to be understood that when an anionic functional group cross-links cellulose strands together, mechanical strength of the cellulose-based filament can be increased and water absorbency can be decreased. It should be noted that this cross-linking can be achieved with many types of dyes.

It is also understood that other functional groups (including neutral and cationic functional groups) may be used in addition to the aforementioned anionic functional groups, as long as the cellulose derivative has a charge content of less than or equal to about 1.4 mEq/g of cellulose. For example, neutral or cationic dyes can also be used, provided the cellulose derivative has a charge content of less than or equal to about 1.4 mEq/g of cellulose.

As mentioned, the charge content of the cellulose-based filament is less than or equal to about 1.4 mEq/g, preferably between about 0.8 and about 1.4 mEq/g, more preferably between about 1.0 and about 1.4 mEq/g.

The charge content of the cellulose-based filament refers to the number of ionic charges present in each mmol of anionic functional group per gram of cellulose. For example, if the anionic functional group is a carboxymethyl group, which has a charge of −1, then a charge content of 1.0 mEq/g would be equivalent to 1.0 mmol of anionic functional group (in this case, carboxymethyl groups) per gram of cellulose. Conversely, if the anionic functional group is a phosphoryl group, which has a charge of −2, a charge content of 1.0 mEq/g would be equivalent to 0.5 mmol of phosphoryl group per gram of cellulose.

It is to be understood that the charge content of the filament takes into consideration the fact that different anionic functional groups, each with different charges, may be used. For example, if both carboxymethyl groups (charge: −1) and phosphoryl groups (charge: −2) are used, then the combination of said groups must still result in a charge content of less than or equal to about 1.4 mEq/g of cellulose.

For clarity, a charge content of 1.0 mEq/g would mean that, on average, for around every 6.17 glucose units, there is a charge of −1. Naturally, if the anionic functional group has a charge of −1, then this means there would be an average of 1 anionic functional group for every 6.17 glucose units. If the anionic functional group has a charge of −2, then this would mean there would be an average of 1 anionic functional group for every 12.34 glucose units. The above was calculated as follows:

$$\frac{1.0\text{ mEq}}{1\ g\text{ cellulose}} = \frac{0.001\text{ Eq}}{(1\ g\text{ cellulose})/\left(162.1406\ \frac{\text{g}}{\text{mol glucose unit}}\right)}$$

$$= \frac{0.001\text{ Eq} * 6.02E23\ \frac{\text{charges}}{\text{Eq}}}{0.0061745\text{ mol glucose unit} * 6.02E23\ \frac{\text{glucose units}}{\text{mol}}}$$

$$= \frac{6.02E20\text{ charges}}{3.71E21\text{ glucose units}}$$

$$= 0.162\ \frac{\text{charges}}{\text{glucose unit}}$$

The inverse of the above results equals 6.1675 glucose units per charge. Similarly, a charge content of 1.4 mEq/g would mean that, on average, for around every 4.405 glucose units, there is a charge of −1.

It is to be understood that the grams of cellulose measured when calculating the charge content refers to the mass of the cellulose excluding the mass of any anionic functional groups that may be present.

As mentioned, the inventors discovered that, when the cellulose-based filament has a diameter of at most about 50 μm and a charge content of less than or equal to about 1.4 mEq/g of cellulose, certain advantages are observed. Indeed, it has surprisingly low water absorbency, such that it is not superabsorbent (as would be expected) and, as such, can be dried and reused after becoming wet with water. Typically, when filaments have a charge content of greater than about 1.4 mEq/g of cellulose, the filament cannot be reused once wet because it becomes too water absorbent (superabsorbent). When filaments are superabsorbent, they typically exhibit swelling behaviour when exposed to water, as they absorb such a large quantity of water. Such filaments also typically retain water for significant periods of time, making them extremely difficult to dry, especially under normal handling conditions (such as doing laundry).

In a preferred embodiment of the present invention, the cellulose-based filament consists of the negatively charged cellulose derivative bearing anionic functional groups.

In preferred embodiments, the cellulose-based filaments are free of bubbles. In preferred such embodiments, the negatively charged cellulose derivative bears carboxymethyl ($-CH_2COO-$) groups as the anionic functional groups and further bears methyl groups. Such cellulose derivative can be obtained by partial decarboxylation of a cellulose derivative bearing carboxymethyl groups.

Method of Producing Cellulose-Based Filaments

In a related aspect of the invention, a method of producing the above cellulose-based filaments is provided, the method comprising the steps of:

a) providing a negatively charged cellulose derivative bearing anionic functional groups, wherein said anionic functional groups are covalently bonded to the cellulose derivative and wherein the cellulose derivative has a charge content greater than or equal to 0.8 mEq/g of cellulose, b) preparing a dope solution comprising the negatively charged cellulose derivative;

c) extruding said dope solution into a coagulation bath so as to obtain cellulose-based filaments; and if the cellulose-based filaments have a charge content of greater than about 1.4 mEq/g of cellulose, d1) curing the negatively charged cellulose derivative so as to reduce the charge content to less than or equal to about 1.4 mEq/g of cellulose, and if the cellulose-based filaments have a charge content of less than or equal to about 1.4 mEq/g f cellulose, d2) optionally curing the negatively charged cellulose derivative, such that the charge content of the cellulose-based filaments remains less than or equal to about 1.4 mEq/g of cellulose. The cellulose-based filaments, the negatively charged cellulose derivative bearing anionic functional groups, the anionic functional groups, and the charge content are as defined in the previous section.

Step a) Providing the Negatively Charged Cellulose Derivative

In embodiments, the negatively charged cellulose derivative bearing anionic functional groups is produced by functionalizing cellulose so as to add said anionic functional groups. For example, cellulose can be carboxymethylated, which would result in a negatively charged cellulose derivative bearing carboxymethyl groups.

The anionic functional group can be covalently added to the cellulose using any method known in the art, including the examples described in more detail below (see Examples 1, 2, and 3). The content of anionic functional groups in the negatively charged cellulose derivative depends on the reaction conditions, such as reactant concentration, reaction temperature and duration of reaction.

In embodiments, the charge content of the cellulose derivative provided at step a) is greater than or equal to about 1.0 mEq/g of cellulose, preferably greater than about 1.0 mEq/g of cellulose.

In preferred embodiments, carboxymethyl cellulose is used as the negatively charged cellulose derivative bearing anionic functional groups.

In embodiments, the method comprises reacting cellulose with sodium chloroacetate to produce carboxylated carboxymethyl cellulose. In more preferred embodiment, the method further comprises the step of partially decarboxylating the carboxymethyl cellulose. In embodiments, this is accomplished by exposing the carboxymethyl cellulose to a solution with a pH of less than about 4 (preferably of about 3.5), then increasing the pH to about 8 in about 15 minutes, and allowing the partial decarboxylation to occur. The decarboxylated cellulose with a pH 8 or above can be dried afterwards without cellulose degradation.

The cellulose used in the functionalization step can be obtained or prepared using commercial cellulose products, such as softwood kraft pulp. These cellulose products can be ground to small pieces of about 300 μm in size. This can be done by a Wiley grinder or any other type of grinder or apparatus which gives comparable particle sizes.

It is to be understood that a wide variety of methods can be used to obtain the cellulose used in the method of the present invention, such as the methods described in Examples 1, 2, and 3 below.

Step b) Providing the Dope Solution

The step of providing a dope solution comprising the negatively charged cellulose derivative bearing anionic functional groups can be performed using any method known in the art (see Examples 1, 2, and 3 below for examples). In embodiments, dope solution (or gel) can be produced by dissolving the negatively charged cellulose derivative bearing anionic functional groups in an alkaline aqueous solution.

In embodiments, the dope has a cellulose derivative concentration between about 4 wt % and about 8 wt %, preferably about 7 wt %, based on the total weight of the dope.

In embodiments, the alkaline aqueous solution is an NaOH aqueous solution, preferably with a NaOH/cellulose derivative weight ratio of about 0.3 to about 1. The more the carboxyl charge, the less the NaOH amount is preferred.

The dope can then be filtered before the extrusion step to remove non-dissolved residues. In embodiments, the dope is filtered through a filter with holes that are less than or equal to around 100 microns, preferably less than or equal to around 70 microns, preferably around 40 microns. This is because typically, in order to extrude the cellulose-based filaments, the dope needs to pass through the holes of a spinneret, which can be as small as around 100 microns, or even 70 microns, which would yield filaments with a diameter of about 10 microns to about 50 microns, as the filaments shrink when they dry. It is to be understood that the aforementioned diameter range of about 10 microns to about 50 microns is preferable because these are the desired dimensions for filaments used for making textiles.

Doping solutions obtained from the negatively charged cellulose derivative with a charge content of less than about 0.8 mEq/g cellulose are highly viscous, which makes spinning difficult. This is one reason why the cellulose derivative should have a charge content of greater than or equal to about 0.8 mEq/g of cellulose. Preferably, during this providing step of the method of the present invention, the cellulose derivative has a charge content between about 0.8 and about 1.4 mEq/g of cellulose. In embodiments, during this providing step of the method of the present invention, the charge content of the cellulose derivative is greater than or equal to about 1.0 mEq/g of cellulose (preferably greater than about 1.0 mEq/g of cellulose); greater than or equal to about 1.1 mEq/g of cellulose; greater than or equal to about 1.2 mEq/g of cellulose; or greater than or equal to about 1.3 mEq/g of cellulose.

Step c) Extrusion Step

The extrusion step can be carried out using any known method in the art provided that this method can produce filaments of the required diameter. One technique that does not allow obtaining such filament is simple extrusion from a syringe or the like by hand or using another slow mechanism, particularly when using a large gage needle. Indeed, in such conditions, filaments with diameters of more than 50 μm (e.g. about 1 mm) are produced.

Such filaments are must too large for textiles production.

In preferred embodiments, the dope is extruded into an acid coagulation bath (for example, 10% $H_2SO_4$ aqueous solution) to regenerate the cellulose.

In embodiments, the dope is extruded through a spinneret plate (which can contain holes of, for example, 100 microns or 70 microns in diameter), into the acid coagulation bath. Because the negatively charged cellulose derivative is not soluble in the acid solution, as soon as the dope exits the spinneret plate, dissolved negatively charged cellulose derivative precipitates out in the form of filaments.

In preferred embodiments, the filaments are collected and washed to remove residual acid. In embodiments, the filaments are collected together and passed via drawing rolls into a washing bath to remove residual acid, and collected onto a reel.

More specific examples of the extrusion step are described below (see Examples 1, 2, and 3).

Step d1) Curing Treatment (if the Cellulose-Based Filaments have a Charge Content of Greater than about 1.4 mEq/g of Cellulose)

As mentioned, the cellulose-based filaments of the present invention have a charge content of less than or equal to about 1.4 mEq/g of cellulose when measured at a pH of about 6 or more. However, after the extrusion step, it is possible that the resulting cellulose-based filaments can have a charge content of greater than about 1.4 mEq/g of cellulose when measured at a pH of about 6 or more. This occurs when there are too many anionic functional groups covalently attached to the negatively charged cellulose derivative. When this occurs, the resulting filament will be superabsorbent, such that it can no longer be considered reusable.

Accordingly, if the resulting cellulose-based filaments have a charge content of greater than about 1.4 mEq/g of cellulose when measured at a pH of about 6 or more, an additional curing step must be performed. The curing step is performed by dipping the filament into a solution of curing agent. The curing agent results in chemical crosslinking of negatively charged cellulose derivative chains e.g. through ester bonds (—COO—) occurring in the post-cured filaments. The ester bond is produced from the reaction between —OH and anionic functional groups of the negatively charged cellulose derivative chains.

Figure 7:
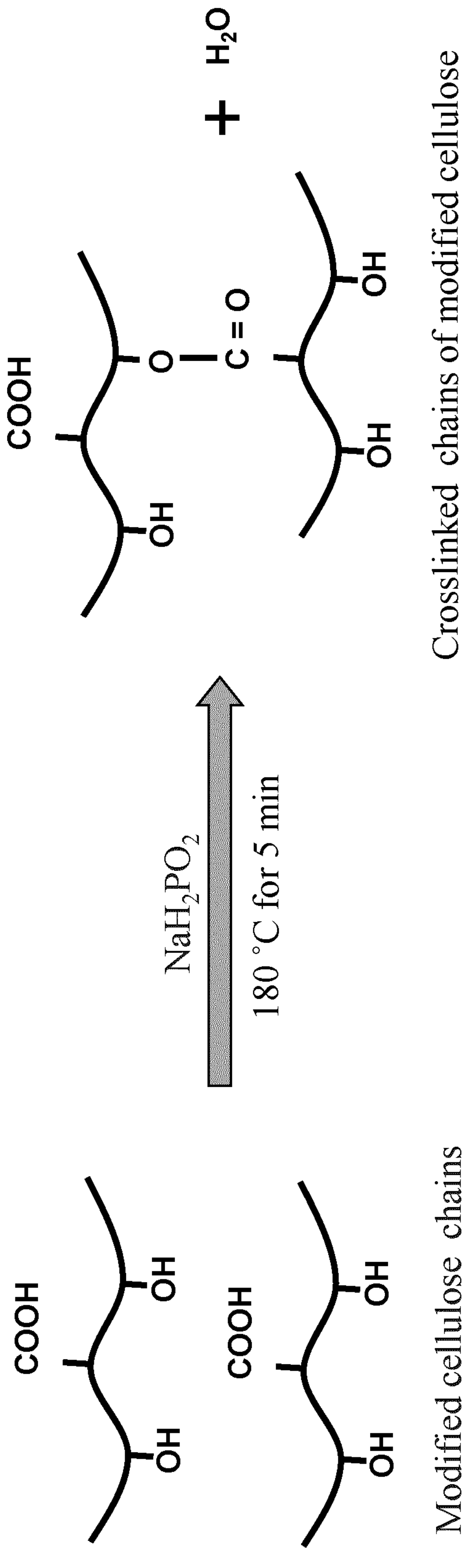
FIG. 7 shows a crosslinking reaction of negatively charged cellulose derivative (labelled as modified cellulose) during post-curing of the fabricated textile filaments.

For example, if the anionic functional group is a carboxymethyl groups, the ester bond resulting from the curing step will be produced from the reaction between —OH and —COOH groups of the negatively charged cellulose derivative chains (see FIG. 7).

In other words, the curing has the effect of reducing the number of anionic functional groups covalently bonded to the negatively charged cellulose derivatives. This has the result of reducing the charge content of the cellulose-based filaments.

The curing is performed so as to reduce the charge content of the cellulose-based filaments such that the resulting cellulose-based filament has a charge content of less than or equal to about 1.4 mEq/g of cellulose.

In preferred embodiments, the curing agent is $NaPO_2H_2$, preferably 5% $NaPO_2H_2$. In preferred embodiments, the curing step is performed at a pH of about 3.5.

As mentioned, the curing step causes the chemical cross-linking of the cellulose chains. Accordingly, the curing step will also improve the mechanical strength of the result filament, in addition to reduction the charge content thereof. In addition, the curing step further surprisingly decreases the water absorbency of the cellulose-based derivative and the swelling of the cellulose molecules caused by water.

Step d2) Optional Curing Treatment (if the Cellulose-Based Filaments have a Charge Content of Less than or Equal to about 1.4 mEq/g of Cellulose)

Even if the cellulose-based filaments have a charge content of less than or equal to about 1.4 mEq/g of cellulose, the curing step may still be performed, although it is optional. This is because the curing step, as mentioned, may improve the mechanical strength of the resulting filament and lower the water absorbency of the resulting filament.

The optional curing step can be performed in the same manner as the curing step described above. However, the optional curing step is performed in such a manner so as to maintain the charge content to less than or equal to about 1.4 mEq/g of cellulose.

Bubble-Free Films and 3D Objects

In a second aspect of the invention, bubble-free films and 3D objects are provided. These films and objects comprise carboxymethyl cellulose, wherein carboxymethyl groups are covalently bonded to the cellulose, wherein the carboxymethyl cellulose has a charge content of less than or equal to about 1.4 mEq/g of cellulose, and wherein the carboxymethyl cellulose is partially decarboxylated.

These films and 3D objects are biorenewable, biodegradable, recyclable and low-cost plastic replacements.

In embodiments, the carboxymethyl groups are covalently bonded at C2, C3, or C6 positions of the glucose units of the cellulose, preferably at the C2 position.

In embodiments of the present invention, the carboxymethyl cellulose is crosslinked. It is also to be understood that when a carboxymethyl group cross-links cellulose strands together, mechanical strength of the film/object can be increased.

As mentioned, the charge content is less than or equal to about 1.4 mEq/g, preferably between about 0.8 and about 1.4 mEq/g, more preferably between about 1.0 and about 1.4 mEq/g.

In a preferred embodiment of the present invention, the film/object consists of the above carboxymethyl cellulose.

Bubble-free films and 3D objects are free of gas bubbles trapped within the films/objects. Such bubbles are undesirable since they typically decrease the mechanical strength and uniformity of the films/objects, for example making films appear hazy rather than clear and transparent.

The carboxymethyl cellulose being "partially decarboxylated" means that some of its carboxymethyl groups have been replaced by methyl groups:

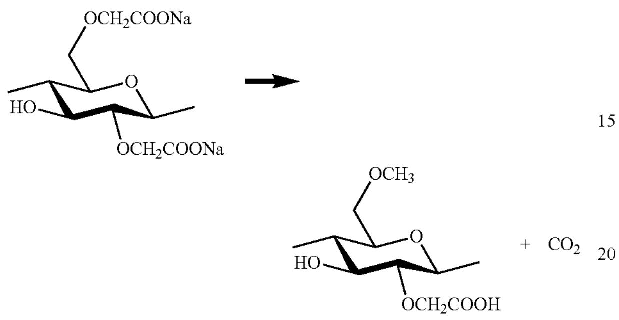

In embodiments, up to about one third of the carboxymethyl groups (preferably from about 15% to about 33% of the carboxymethyl groups) have been replaced by methyl groups in the partially decarboxylated carboxymethyl cellulose.

In embodiments, the film of the invention has a thickness from about 1 μm to about 100 μm. In preferred embodiments, the film of the invention has a thickness from about 30 μm to about 100 μm, which makes them useful for packaging. In alternative embodiments, the film of the invention has a thickness in the range from about 1 μm to about 30 μm and the carboxymethyl cellulose is cross-linked.

In embodiments, the film/object contain a dye and are therefore colored.

In embodiments, the 3D object is made of a stack of films of the invention.

In embodiments, the 3D object is made of one or more films of the invention shaped into a 3D shape. In such embodiments, the 3D objection can be a cup, a bottle, a plate, a block, a glove, etc. Such cups can withstand temperatures well over 100° C. without degrading.

In embodiments, the 3D object is made of a film of the invention bent so a part of the film is into contact with another part of film. Preferably, the film is rolled onto itself in the shape of a tube. In such embodiments, the 3D object can be a straw.

In embodiments, the film and 3D object are free of glue.

Method of Producing Bubble-Free Films and 3D Objects

In a related aspect of the invention, a method of producing the above films/objects is provided, the method comprising the steps of:

A. providing carboxymethyl cellulose, wherein carboxymethyl groups are covalently bonded to the cellulose derivative wherein the carboxymethyl cellulose has a charge content greater than or equal to 0.8 mEq/g of cellulose, and wherein the carboxymethyl cellulose is partially decarboxylated, B. preparing a dope solution comprising the carboxymethyl cellulose;

C. extruding said dope solution into a coagulation bath or depositing said dope onto a substrate and then immerging the substrate with the dope solution into a coagulation bath, so as to obtain a film or a 3D object, and if the film or the 3D object has a charge content of greater than about 1.4 mEq/g of cellulose, D1) curing the carboxymethyl cellulose so as to reduce the charge content to less than or equal to about 1.4 mEq/g of cellulose, and if the film or the 3D object has a charge content of less than or equal to about 1.4 mEq/g f cellulose, D2) optionally curing the carboxymethyl cellulose, such that the charge content of the cellulose-based filaments remains less than or equal to about 1.4 mEq/g of cellulose. The films/objects, the carboxymethyl cellulose, and the charge content are as defined above.

As shown in Example 4, since the carboxymethyl cellulose is partially decarboxylated, few if any bubbles are formed in the film or 3D object at step C).

The method of the invention has the advantage of now requiring toxic chemicals (such as $CS_2$) and, when making 3D objects, not requiring glue.

Step A) Providing the (Partially Decarboxylated) Carboxymethyl Cellulose

In embodiments, step A) comprises carboxymethylating cellulose so as to add carboxyl groups and then, partially decarboxymethylating the carboxymethylated cellulose.

These carboxymethylation and decarboxymethylation can be achieved using any method known in the art, including the examples described in more detail below (see Examples 1 to 4). The content of carboxyl groups in the negatively charged cellulose derivative depends on the reaction conditions, such as reactant concentration, reaction temperature and duration of reaction.

In embodiments, the cellulose is carboxymethylated by reacting cellulose with sodium chloroacetate to produce carboxylated carboxymethyl cellulose.

In embodiments, the carboxymethylated cellulose is partially decarboxylated by exposing the carboxymethyl cellulose to a solution with a pH of less than about 4 (preferably of about 3.5), then increasing the pH to about 8 in about 15 minutes, and allowing the partial decarboxylation to occur.

In preferred embodiments, the carboxymethylated cellulose has a carboxyl group content of about 1.0 to about 2.5 mmol —COOH/g cellulose.

In embodiments, the charge content of the carboxymethylated cellulose provided at step a) is greater than or equal to about 1.0 mEq/g of cellulose, preferably greater than about 1.0 mEq/g of cellulose, said charge content being measured at a pH of about 6 or more.

The cellulose used as a starting material can be obtained or prepared using commercial cellulose products, such as softwood kraft pulp.

Other feedstock such as any form of biomass, such as (chemo-) thermomechanical pulp (TMP), sawdust, forest and agricultural waste, recycled papers, etc. can be used. In fact, it is an advantage of the invention that films and 3D object can be made from lignin-containing fibers. When performing the carboxylation reaction on such products, the cellulose, hemicellulose and lignin therein will all be carboxylated, allowing their solubilization in alkaline to produce the dope.

These cellulose products can be ground and then optionally screened, for example using a 0.25 mm sieve, yielding an average fiber particle length of about 0.125 mm. This can be done by a GlenMills-SM300 or any other type of grinder or apparatus which gives comparable particle sizes.

Step B) Providing the Dope Solution

This step is carried out in the same way as step b) in the previous method.

Of course, when biomass is used as a starting material for carboxylation, the dope will be a lignocellulose dope. Non-dissolved substances can be readily separated from such dope. Furthermore, dispersed small colloidal material can be flocculated and separated. Since the properties of the dope are different from those of dopes made from cellulose as a raw material, which will result in objects with different properties. These properties can advantageously be tailored for specific applications.

In embodiments, the dope may further comprise a dye.

In embodiments, the dope may further comprise a crosslinker, preferably a biodegradable crosslinker, such as epichlorohydrine. In embodiments, the dope has a crosslinker concentration of about 5 to about 15 wt %, preferably about 10 wt %, based on the total weight of the dope. The use of such crosslinker is particularly useful when thin films, e.g., about 1 μm to about 10 μm thick, are desired.

Step C) Extrusion or Deposition/Immersion

In embodiments, step c) comprises extruding said dope solution into a coagulation bath, so as to obtain a film or a 3D object.

In alternative embodiments, step c) comprises depositing said dope onto a substrate and then immerging the substrate with the dope solution into a coagulation bath, so as to obtain a film or a 3D object.

In both cases, the dope comes into contact with the coagulation bath. In embodiments, the coagulation bath is an acid coagulation bath, preferably a bath containing a 10% $H_2SO_4$ solution.

When the dope is exposed to the coagulation bath, cellulose is regenerated forming an insoluble film in a few minutes. For films that are 0.5 mm thick (when wet) regeneration time in a 10% sulfuric acid bath is about 3 minutes. For 1, 2, 5, and 10 mm think films, regeneration times are about 5, 12, 25, and 60 minutes.

As shown in Example 4, regenerating cellulose from carboxymethylated cellulose in such a bath generates bubbles, causing non-uniformity within the films and 3D objects produced. However, when the carboxymethylated cellulose is partially decarboxylated, the production of bubbles is reduced or even eliminated.

Extrusion

In embodiments, step c) comprises extruding said dope solution through an extruder die into the coagulation bath, so as to obtain a film or a 3D object. The extrusion can be carried out using any known method in the art provided that this method can produce films.

In embodiments, the die is a slit. This allows making films. The slit may be for example about 0.5 to about 1 mm wide, and as long as desired. Because the negatively charged cellulose derivative is not soluble in acid, as soon as the dope exits the extruder, dissolved carboxymethyl cellulose precipitates out in the form of film.

In other embodiments, the die is a ring. This allows making tubular objects, such as straw.

Dies of any other shape can also be used.

Preferably, the film or 3D object is pulled or pushed away from the die. The film or 3D object can then be washed to reduce residual acid (e.g., by being passed via drawing rolls into a washing bath), and then optionally collected onto a reel.

In embodiments, the film is then dried.

Deposition & Immersion

In embodiments, the dope is deposited onto a substrate and then the substrate with the dope is immersed into a coagulation bath. Since the dope is very viscous, it holds its shape until immersion in the coagulation bath, where the cellulose will be regenerated thus yielding a film or a 3D object. To get a sufficiently viscous dope, it can be useful to have undissolved fiber particles in the dope, e.g. from about 5 to about 20 wt % undissolved fiber particles, based on the total weight of the dope. Another alternative is to increase the carboxymethylated cellulose concentration of the dope, for example to a level or about 8 to about 15 wt %, based on the total weight of the dope.

In embodiments in which the dope comprises a crosslinker, the dope on the substrate is heated, for example in an oven, for example at about 100° C., e.g., for about 15 minutes or until completely dry, to allow crosslinking of the carboxymethylated cellulose, before the substrate with the dope is immersed in the coagulation bath. This advantageously allows producing thin films, for example a ±1 μm thick film with a tensile stress of over about 200 MPa and an elastic modulus of about 11.6 GPa.

In embodiments, the dope is deposited to form a layer on the substrate. In preferred embodiments, this layer is about 20 μm to about 50 μm thick, preferably about 30 μm thick. If films are very thin, they are difficult to handle when further used. If films are very thick, washing out residual acid before using them can be difficult.

In embodiments, the substrate is planar, and the dope is deposited to form a layer on the substrate. This allows forming planar films.

In embodiments, the substrate is non-planar, and the dope is deposited to form a layer on the substrate.

This allows forming films having different conformations. In preferred embodiments, the substrate is a mold, and the dope is deposited to form a layer around the mold or inside the mold. Examples of objects that can be produced by these methods include cups, bottles, plates, blocks, gloves, etc. Tubes (such as straws) can be produced by depositing a layer of dope onto a rod (for example, by dipping the rod into the dope).

In embodiments, the film or 3D object is then washed, preferably with water, to remove residual acid. The films are then preferably left in water for about 15 minutes to about 30 minutes.

In embodiments, the film or 3D object is then dried.

Step D1) and D2) Curing

These steps are carried out in the same way as step d1) and d2) in the previous method.

Optional Step E) Forming a 3D Object

In embodiments, the method further comprises the step of shaping one or more films produced according to steps A) to C) into a 3D object. This step can be carried before or after steps D1) and D2).

In embodiments, step E) comprises at least partially overlaying two or more films produced according to steps A) to C) while said films are nearly dry, but still contain enough moisture to allow the films to stick together upon further drying, and then allowing the films to dry. The two or more films can be completely overlaid, thus forming a neat stack. However, they can also be partially overlaid to produce any desired shape, for example bags could be produced. The shapes could even be computer generated and the stacking automated, similar as in LOM (laminated object manufacturing). Furthermore, the films may be overlaid within a mold to form a 3D object of any given shape.

In principle films of any thickness can be produced using steps A) to D). However, when the thickness is more than 3 mm, some lumps can form on the surface of the film during regeneration, which reduces film smoothness. The thicker the dope, the rougher the surface of the film. Thus, for making a thick 3D object, making thin films and overlaying them is more advantageous. It not only reduces the regeneration time, but also creates a product with a smooth surface. Upon drying, film thickness decreases 10-15 folds (depending on the concentration of the dope).

In other alternative embodiments, step E) comprises the step of bending a film produced according to steps A) to C) onto itself so a part of the film comes into contact with another part of film, while said film is nearly dry, but still contains enough moisture to allow said parts of the film to stick together upon further drying, and then allowing the film(s) to dry. Preferably, the film is rolled onto itself one or more times, forming a tube. Drinking straws can be produced by this method.

DEFINITIONS

The use of the terms "a" and "an" and "the" and similar referents in the context of describing the invention (especially in the context of the following claims) are to be construed to cover both the singular and the plural, unless otherwise indicated herein or clearly contradicted by context.

The terms "comprising", "having", "including", and "containing" are to be construed as open-ended terms (i.e., meaning "including, but not limited to") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. All subsets of values within the ranges are also incorporated into the specification as if they were individually recited herein.

Similarly, herein a general chemical structure with various substituents and various radicals enumerated for these substituents is intended to serve as a shorthand method of referring individually to each and every molecule obtained by the combination of any of the radicals for any of the substituents. Each individual molecule is incorporated into the specification as if it were individually recited herein. Further, all subsets of molecules within the general chemical structures are also incorporated into the specification as if they were individually recited herein.

All methods described herein can be performed in any suitable order unless otherwise indicated herein or otherwise clearly contradicted by context.

The use of any and all examples, or exemplary language (e.g., "such as") provided herein, is intended merely to better illuminate the invention and does not pose a limitation on the scope of the invention unless otherwise claimed.

No language in the specification should be construed as indicating any non-claimed element as essential to the practice of the invention.

Herein, the term "about" has its ordinary meaning. In embodiments, it may mean plus or minus 10% or plus or minus 5% of the numerical value qualified.

The term "reusable", when referring to the filament or the textile composed from the filament, refers to the fact that the filament and the textile can be repeatedly immersed in water (for example, during washing), and subsequently dried. This is because the hydrophobicity of the filament and the textile are sufficient such that, when the filament is immersed in water, it can be easily dried and reused. This means that the cellulose-based filament of the present invention is not superabsorbent.

It is to be understood that the terms "filament" and "filament" are used as synonyms in the present application.

Unless otherwise defined, all technical and scientific terms used herein have the same meaning as commonly understood by one of ordinary skill in the art to which this invention belongs.

Other objects, advantages and features of the present invention will become more apparent upon reading of the following non-restrictive description of specific embodiments thereof, given by way of example only with reference to the accompanying drawings.

DESCRIPTION OF ILLUSTRATIVE EMBODIMENTS

The present invention is illustrated in further details by the following non-limiting examples.

More specifically, the following examples describe the production of various cellulose-based filaments comprising a negatively charged cellulose derivative bearing anionic functional groups. In Example 1, the anionic functional group is a carboxymethyl group. In Example 2, the anionic functional groups are carboxymethyl groups and amine functionalized carboxylated carbon nanotubes (f-CNTs). In Example 3a, the anionic functional groups are carboxymethyl groups and reactive orange 5 dye. In Example 3b, the anionic functional groups are carboxymethyl groups and reactive red 2 dye. In Example 3c, the anionic functional groups are carboxymethyl groups and reactive green 19 dye.

Example 1: Preparation of Cellulose-Based Filaments Comprising a Negatively Charged Cellulose Derivative Bearing Carboxymethyl Groups Materials Bleached softwood kraft (BSWK) pulp was supplied by a kraft pulp mill in Canada. Sodium hydroxide (NaOH) and isopropyl alcohol (IPA) were received from Fisher Scientific, USA. Sodium chloroacetate ($ClCH_2COONa$) and sodium hypophosphite ($NaH_2PO_2$) were purchased from Sigma Aldrich, Canada. $H_2SO_4$ and HCl were obtained from Caledon, Canada and Fluka, USA, respectively. Ethyl alcohol was purchased from Brampton, Canada. Milli-Q deionized (DI) water was used in all experiments.

Chemical Modification of Cellulosic Pulps 7 g grinded BSWK pulp was mixed well with 88 g IPA and then a NaOH solution was added to the pulp/IPA mixture, again mixed very well under magnetic stirring for 1 h at 40° C. This reaction step was conducted several times with various NaOH solution concentrations. Each time 1.33, 1.75, 2.54, 3.08 and 3.50 g NaOH dissolved in 7 g DI water was added to the pulp (7 g) mixed with IPA (88 g). Next, an aqueous solution of sodium chloroacetate was added to the reaction mixture and kept for 2 h under magnetic stirring at 50-60° C. This reaction step was also conducted several times by changing the concentration of sodium chloroacetate solution. Each time 1.06 (for 1.33 g NaOH), 1.42 (for 1.75 g NaOH), 2.1 (for 2.54 g NaOH), 2.64 (for 3.08 g NaOH) and 2.99 (for 3.50 g NaOH) g sodium chloroacetate dissolved in 5 g DI water was added to the reaction mixture. After completing the reaction, the negatively charged cellulose derivative was washed 3 times with an ethanol/water mixture (70% ethanol and 30% water). During the third washing, a HCl solution was added to the negatively charged cellulose derivative mixture to reduce the pH below 3.5.

Finally, the negatively charged cellulose derivative was washed with pure ethanol and then dried for 24 h at room temperature.

Preparation of Dope Solutions from the Modified Cellulosic Pulps

First, 7 g of modified cellulosic pulps was mixed well with 78 g DI water and then 15 g NaOH solution (6 g NaOH dissolved in 9 g water) was added to this mixture. This mixture was then mixed well by an automatic mixer to form a fine gel which was finally filtered through a 40 μm filter media. This filtered gel (dope solution) was ready for wet spinning to fabricate textile filaments.

Extrusion of the Dope Solutions to Fabricate Textile Filaments

The prepared dope solutions were placed inside a steel cylinder, of which one end was connected to a spinneret with multiple holes of 100 μm diameter each. The spinneret was immersed into a coagulation bath filled with a 10% $H_2SO_4$ solution. The otherend of the cylinder was connected to a nitrogen gas cylinder. During extrusion, 100 psi pressure was applied on the dope solution placed inside the cylinder from the gas cylinder causing the dope solution to pass through the holes of the spinneret plate, thus generating filaments in the coagulation bath. The generated filaments were collected by a roller from the coagulation bath. The extrusion process to fabricate filaments is shown schematically in FIG. 1. The produced filaments were then washed with DI water and ethanol followed by drying at room temperature.

Figure 2:
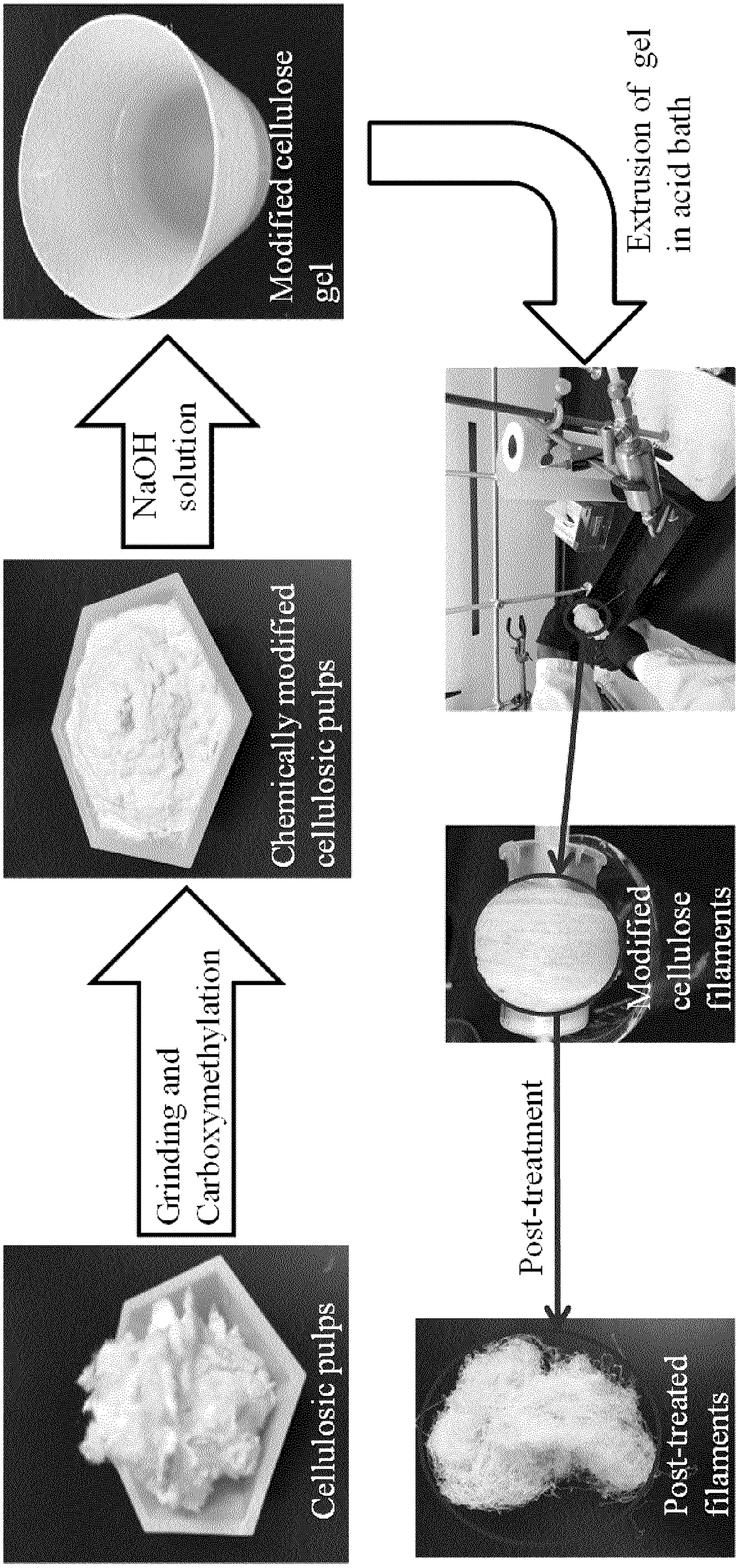
FIG. 2 shows the preparation of textile filaments from cellulosic pulps according to an embodiment of the method of present invention.

Curing of the Fabricated Filaments 5 g of dried filaments were dipped into 20 mL of 5% $NaH_2PO_2$ aqueous solution for 5 min and then taken out and heated at 180° C. in an oven for 5 min; they were then cooled to room temperature. Finally, the filaments were washed by DI water and then dried at room temperature. The entire process for fabricating textile filaments from cellulosic pulps is shown in FIG. 2.

Characterizations

Measurement of Carboxyl Group (—COOH) Content of the Negatively Charged Cellulose Derivative A conductivity titration (using a METER pH/conductivity S470-KIT, Mettler-Toledo GmbH, Greifensee, Switzerland titrator) was performed to determine the —COOH group content in the negatively charged cellulose derivative. First, a fixed quantity of negatively charged cellulose derivative dried at 105° C. in an oven was dispersed very well in 140 mL of Milli-Q DI water under magnetic stirring followed by using a homogenizer. Then, 2.5 mL of a 0.02 M sodium chloride solution was added to the above mixture under magnetic stirring conditions to achieve a very well dispersed suspension. In order to adjust the pH at 3, a HCl solution (0.1 M) was added slowly to the above cellulose suspension. Finally, titration with the suspension was conducted by adding a 0.01 M NaOH solution at a rate of 0.1 mL/min until the pH of the suspension reached 11. The —COOH group content of the negatively charged cellulose derivative was determined from the conductivity curve by using the following equation:

$$[COOH]_g = \frac{V_{NaOH} M_{NaOH}}{DW_g}$$

where $[COOH]_g$ is the —COOH group content of the negatively charged cellulose derivative (mmol/g of cellulose), $V_{NaOH}$ is the volume of NaOH solution (mL) required for deprotonation of the —COOH group, $M_{NaOH}$ is the strength of NaOH solution (mol/L), and $DW_g$ is the weight of the dried negatively charged cellulose derivative in grams dissolved in DI water.

Scanning Electron Microscopy

Scanning electron microscopy (SEM) (QUANTA FEG 450) with a platinum coating on the sample surface was performed to observe the surface morphology of the filaments prepared from the negatively charged cellulose derivative and the dyed negatively charged cellulose derivative.

Fourier Transform Infrared

Fourier transform infrared (FTIR) spectrum of the samples was conducted using a Bruker Tensor 37 instrument (Bruker, Ettlingen, Germany) with PIKE MIRacle diamond Attenuated Total Reflectance (ATR) accessory. Solid samples were placed directly on the ATR crystal and then maximum pressure was applied by lowering the tip of the pressure clamp using a ratchet-type clutch mechanism. All the spectra of measured samples from 32 scans were averaged from 400 to 4000 $cm^{-1}$ with a resolution of 4 $cm^{-1}$.

Nuclear Magnetic Resonance

Solid-state $^{13}C$-NMR spectra of the samples were obtained on a Varian/Agilent VNMRS-400 instrument operating at 100.5 MHz. Samples were packed uniformly inside a 7.5 mm zirconium rotor and spun at 5,500 Hz. Spinning sidebands were suppressed using the TOSS sequence.

Mechanical Strength

Mechanical strength of the filaments was determined by using a TMI Lab Master tensile machine (John Chatillon & Sons, New York, USA) at ambient conditions. The filament sample was taken at a length of 50 mm with the strain rate of 5 mm/min. Ten filaments were taken together for mechanical strength measurements of each filament (average value of ten filaments together).

Water Absorbency

The water absorbency value was measured by dispersing 0.5 g of dried filaments in DI water followed by soaking for 12 h, and then centrifuging them at 1000 g for 10 min placed in a tube with a porous screen at the bottom to separate water from the filaments. The centrifuged filaments were then weighed to obtain the wet weight ($W_g$). Next, the wet filaments obtained after centrifugation were dried in an oven at 105° C. and then re-weighed in dry condition ($W_d$). Finally, the water absorbency value was calculated by using the following equation $$\text{Water absorbency} = \frac{W_w - W_d}{W_d} \quad (2)$$

Results and Discussion

Chemical Modification of Cellulosic Pulps

Figure 3:
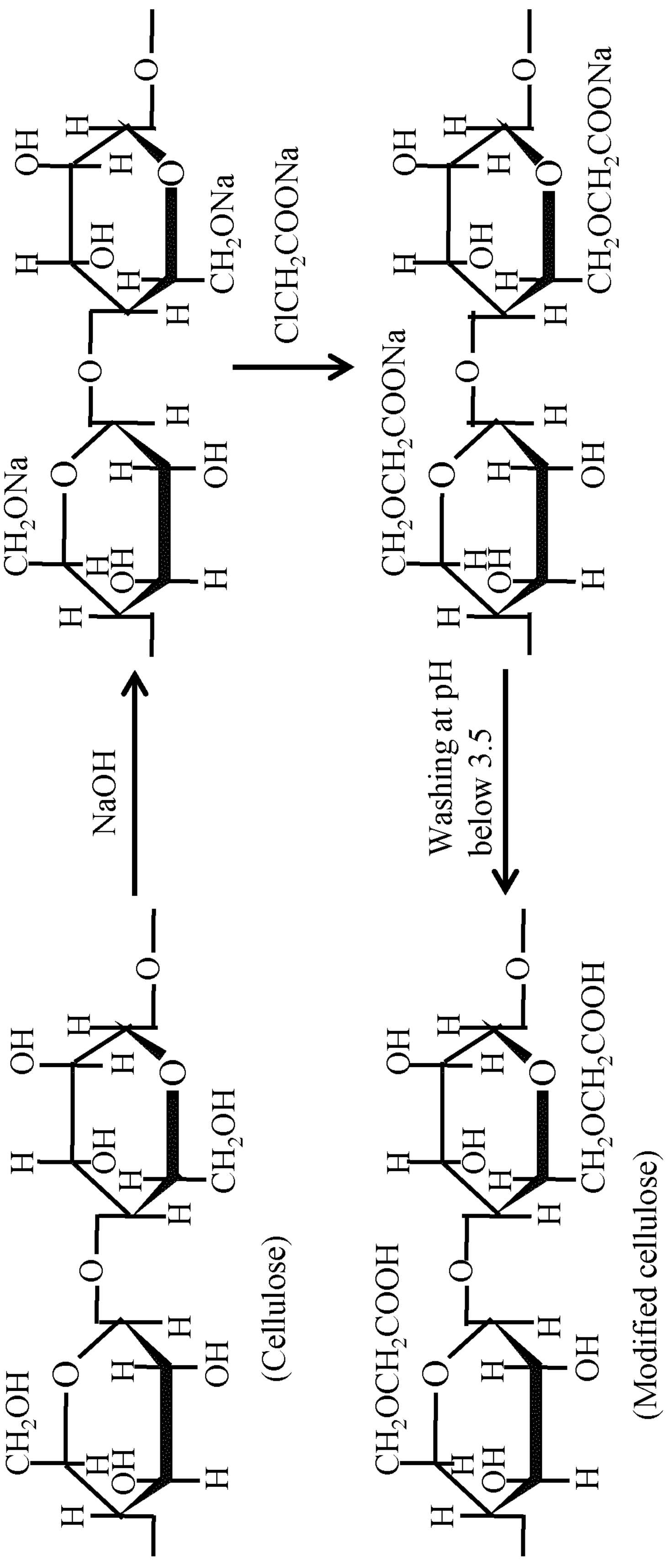
FIG. 3 shows the chemical modification reaction of cellulosic pulps used in an embodiment of the method of the present invention.

Chemical modification of cellulosic pulps through carboxymethylation was performed in order to prepare a gel/dope solution (used for fabrication of the cellulose-based filaments by spinning) from the negatively charged cellulose derivative pulps. It was not possible to make a gel from the unmodified cellulose mixed with a NaOH solution due to likely high interaction among the —OH groups attached to the cellulose chain. The entire modification process is exhibited in FIG. 3. Basically, the modification reaction involves two steps: first a reaction of unmodified cellulose with NaOH and then a reaction of the product (obtained from the first step) with $ClCH_2COONa$. In the negatively charged cellulose derivative, a number of —OH groups present in the cellulose chain were replaced by —COONa groups which then converted to —COOH groups after washing at a pH below 3.5. The content of —COOH groups in the negatively charged cellulose derivative depends on the reaction conditions, such as reactant concentration, reaction temperature and duration of reaction. The content of —COOH groups as afunction of NaOH and $ClCH_2COONa$ concentrations under constant cellulose content (7 g), temperature ($1^{st}$ step: 40° C., $2^{nd}$ step: 50-60° C.) and reaction duration ($1^{st}$ step: 1 h, $2^{nd}$ step: 2 h) is exhibited in Table 1. Table 1 demonstrates that increasing the contents of NaOH (from 1.33 to 3.50 g) and $ClCH_2COONa$ (from 1.06 to 2.99 g) increased the —COOH group content (from 0.6 to 1.7 mmol/g cellulose) in the negatively charged cellulose derivative. The negatively charged cellulose derivative with various —COOH group content (0.6 to 1.7 mmol/g cellulose) were used to produce gels for fabricating of cellulose-based filaments through spinning (Table 1). The negatively charged cellulose derivative with a —COOH group content of 0.6 mmol/g cellulose was not able to form a gel suitable for spinning. The negatively charged cellulose derivative with a —COOH group content of 1.0 and 1.7 mmol/g cellulose was able to form gels; however, the gel obtained from the negatively charged cellulose derivative with 1.0 mmol/g cellulose was highly viscous, which made spinning difficult. The other types of gel obtained from the negatively charged cellulose derivative with —COOH group contents of 1.3, 1.5 and 1.7 mmol/g cellulose were suitable for spinning to fabricate filaments. Therefore, in this research, the negatively charged cellulose derivative with —COOH group contents of 1.3, 1.5 and 1.7 mmol/g cellulose were selected to fabricate textile filaments.

stretching vibrations, respectively. The same peaks were also observed for the negatively charged cellulose derivative. In addition, a new peak at 1,740 $cm^{-1}$ indicated the successful introduction of —COOH groups in the negatively charged cellulose derivative.

Figure 5:
FIG. 5 shows SEM images of (A) Ethanol washed (without and with post-curing) and (B) Water washed (without and with post-curing) filaments spun from negatively charged cellulose derivative (labelled as modified cellulose) with the carboxyl group content of 1.3 mmol/g cellulose, (C) Ethanol washed (without and with post-curing) and (D) Water washed (without post-curing) filaments spun from negatively charged cellulose derivative (labelled as modified cellulose) with the carboxyl group content of 1.5 mmol/g cellulose, and (E) Ethanol washed (without and with post-curing) and (F) Water washed (without post-curing) filaments spun from negatively charged cellulose derivative with the carboxyl group content of 1.7 mmol/g cellulose.

Morphology of the Filaments Made from Negatively Charged Cellulose Derivative Pulps SEM images of non post-curing and post-curing cellulose-based filaments made from the negatively charged cellulose derivative with carboxyl group content of 1.3 mmol/g cellulose are shown in FIG. 5A and FIG. 5B. Filaments exhibited in FIG. 5A and FIG. 5B were washed with ethanol and water, respectively, after extrusion in acid bath. Both ethanol and water washed filaments spun from negatively charged cellulose derivative with 1.3 mmol —COOH/g cellulose were ~85 μm in diameters, which were indistinguishable after post-curing (FIG. 5A and FIG. 5B). Surface morphological changes of the filaments were also not found after post-curing. Morphologies of the ethanol washed filaments spun from negatively charged cellulose derivative with 1.5 and 1.7 mmol —COOH/g cellulose were similar to that of the filaments with 1.3 mmol —COOH/g cellulose exhibited in FIG. 5A (left), FIG. 5B (left) FIG. 5C (left) and FIG. 5E (left). Morphologies of the ethanol washed filaments with 1.5 and 1.7 mmol —COOH/g cellulose were also identical after post-curing (FIG. 5C, FIG. 5E). Morphologies of the water washed filaments spun from negatively charged cellulose derivative with 1.5 and 1.7 mmol —COOH/g cellulose were significantly different from those of the ethanol washed filaments with similar carboxyl group content shown in FIG. 5C (left), FIG. 5D, FIG. 5E (left) and FIG. 5F). It was difficult to obtain an individual filament containing 1.5 or 1.7 mmol —COOH/g cellulose after washing with water that was obvious from SEM

TABLE 1

Optimization of chemical modification reaction of cellulosic pulps to fabricate textile filaments by wet spinning process.

| Cellulose (g) | NaOH (g) | Sodium chloroacetate (g) | Reaction temp. | Reaction time | —COOH content (mmol/g cellulose | Characteristic of the negatively charged cellulose derivative |
|---|---|---|---|---|---|---|
| 7 | 1.33 | 1.06 | $1^{st}$ step: 40° C. | 1st step: 1 h | 0.6 | Not able to form gel for spinning |
| | 1.75 | 1.42 | $2^{nd}$ step: 50-60° C. | 2nd step: 2 h | 1.0 | Able to form gel but unsuitable for spinning |
| | 2.54 | 2.10 | | | 1.3 | Able to form suitable gel for spinning |
| | 3.08 | 2.64 | | | 1.5 | Able to form suitable gel for spinning |
| | 3.50 | 2.99 | | | 1.7 | Able to form suitable gel for spinning |

Figure 4:
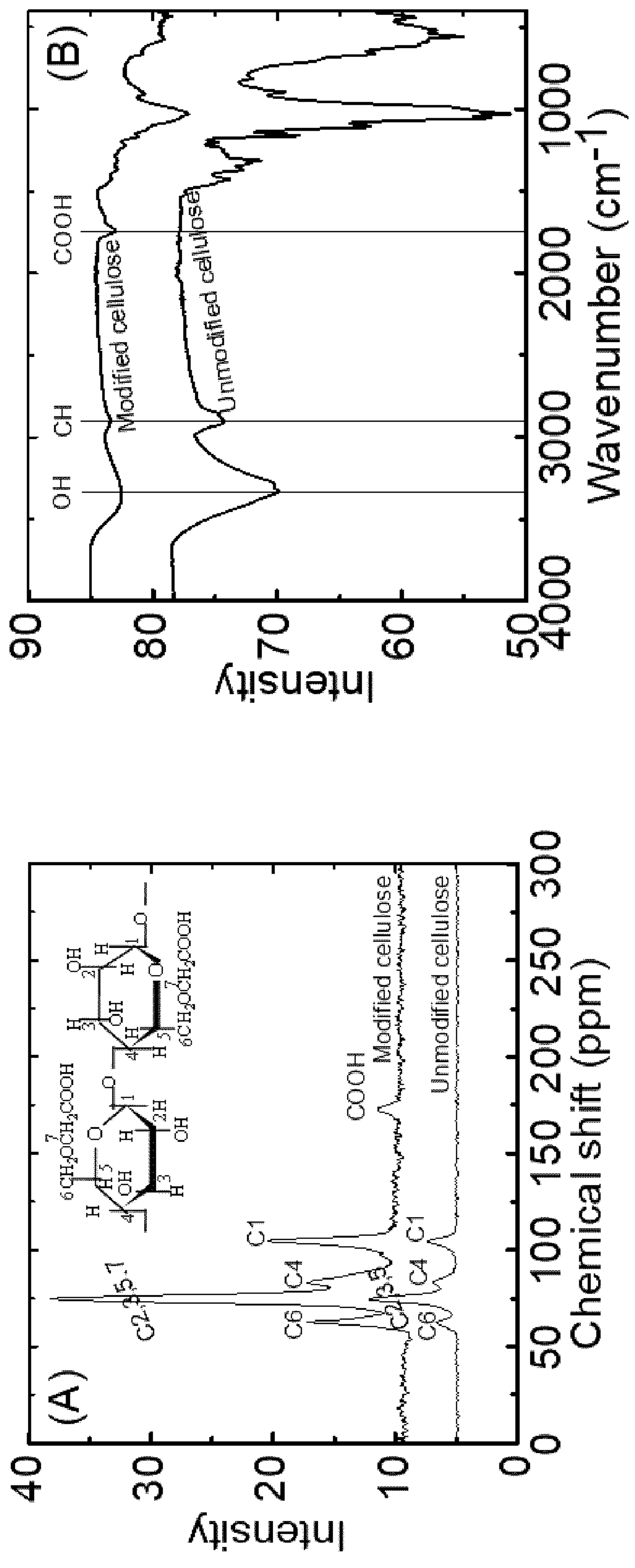
FIGS. 4 (A) and (B) respectively show 13C NMR and FTIR spectra of unmodified cellulosic pulps and negatively charged cellulose derivative pulps (labelled as modified cellulose).

The occurrence of the carboxymethylation reaction was confirmed by $^{13}C$ solid-state NMR and FTIR investigations. FIG. 4A displays the $^{13}C$-NMR spectra of unmodified cellulose and negatively charged cellulose derivative. The unmodified cellulose exhibited carbon peaks at C1 (105 ppm), C4 (85 ppm), C2, 3, 5 (74 ppm) and C6 (65 ppm), which are all typical of cellulose I. On the other hand, a new peak at 173 ppm appeared in the $^{13}C$-NMR spectra of the negatively charged cellulose derivative confirmed the presence of the newly introduced COOH— groups. The FTIR spectra of unmodified cellulose and negatively charged cellulose derivative are exhibited in FIG. 4B. In the case of unmodified cellulose, the characteristic absorption peaks at 3,330 $cm^{-1}$ and 2,900 $cm^{-1}$ correspond to O—H and C—H images demonstrating fused filaments (FIG. 5D and FIG. 5F). This morphological features were obtained likely due to high charge content of the filaments, which were dissolved partially during washing with water.

Mechanical Properties and Water Absorbency of the Filaments without Post-Curing

Figure 6:
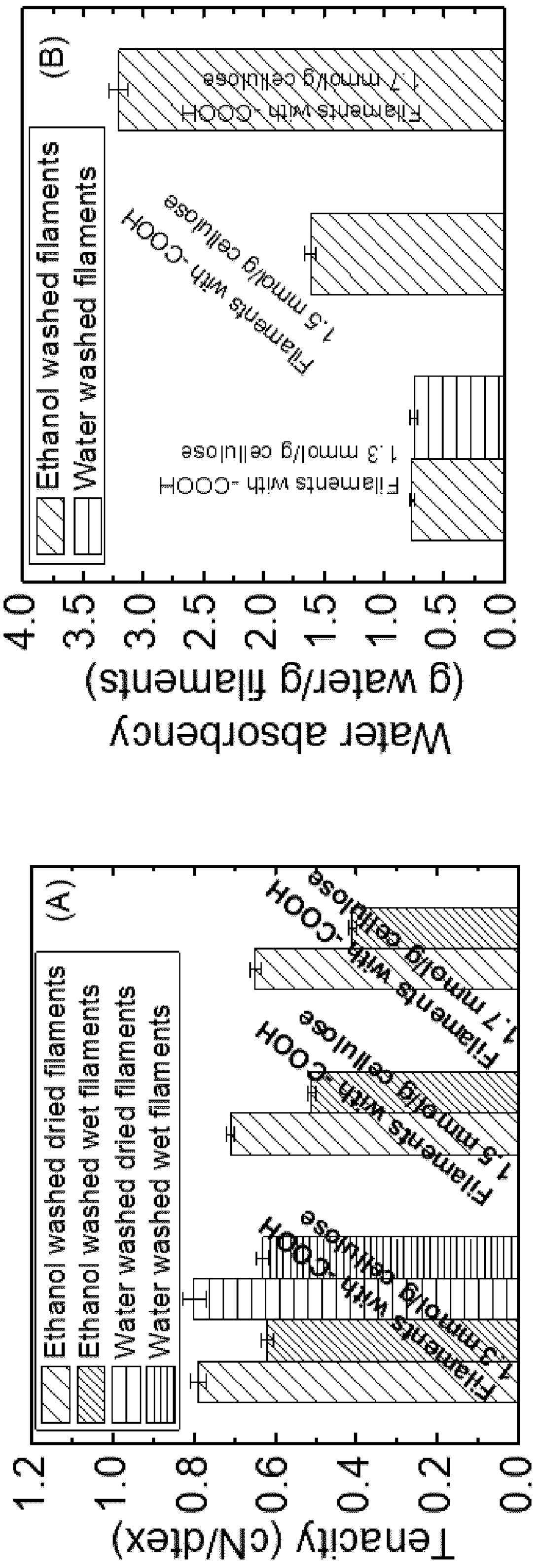
FIG. 6 shows (A) mechanical properties and (B) water absorbencies of the fabricated filaments without post-curing.

The mechanical strength of textile filaments is usually expressed in terms of tenacity. The tenacity of both dried and wet filaments was determined. Tenacities of ethanol and water washed dried filaments fabricated from the negatively charged cellulose derivative with carboxyl group contents of 1.3 mmol/g cellulose were ~0.8 cN/dtex, which decreased to ~0.63 cN/dtex in wet condition of the filaments (FIG. 6A). Tenacities of ethanol washed dried filaments fabricated from the negatively charged cellulose derivative with carboxyl group contents of 1.5 and 1.7 mmol/g cellulose were 0.71 and 0.65 cN/dtex, respectively (FIG. 6A). The tenacities decreased with increasing carboxyl group content likely due to decrease in crystallinity of negatively charged cellulose derivative with increase in carboxyl group content. FIG. 6A also demonstrates that tenacities of the filaments made from the negatively charged cellulose derivative with carboxyl group contents of 1.5 and 1.7 mmol/g cellulose decreased 28 and 37%, respectively, in wet condition as compared to dried state.

Water absorbencies of ethanol and water washed filaments made from the negatively charged cellulose derivative with carboxyl group contents of 1.3 mmol/g cellulose were 0.75 g water/g filaments (FIG. 6B).

On the other hand, water absorbencies of ethanol washed filaments made from the negatively charged cellulose derivative with carboxyl group contents of 1.5 and 1.7 mmol/g cellulose were 1.61 and 3.2 g water/g filaments, respectively (FIG. 6B). The water absorbencies increased with increasing carboxyl group content likely due to increase in charge content of negatively charged cellulose derivative.

Quality Improvement of the Fabricated Filaments by Post-Curing

The filaments fabricated from negatively charged cellulose derivative with carboxyl group contents of 1.3, 1.5 and 1.7 mmol/g cellulose were post-cured by applying heat in an oven at 180° C. for 5 min in the presence of $NaH_2PO_2$. The chemical reaction that took place during post-curing of the filaments is exhibited in FIG. 7. Chemical crosslinking of negatively charged cellulose derivative chains through ester bond (—COO—) occurred in the post-cured filaments. In fact, the ester bond was produced from the reaction between —OH and —COOH groups of the negatively charged cellulose derivative chains.

Figure 8:
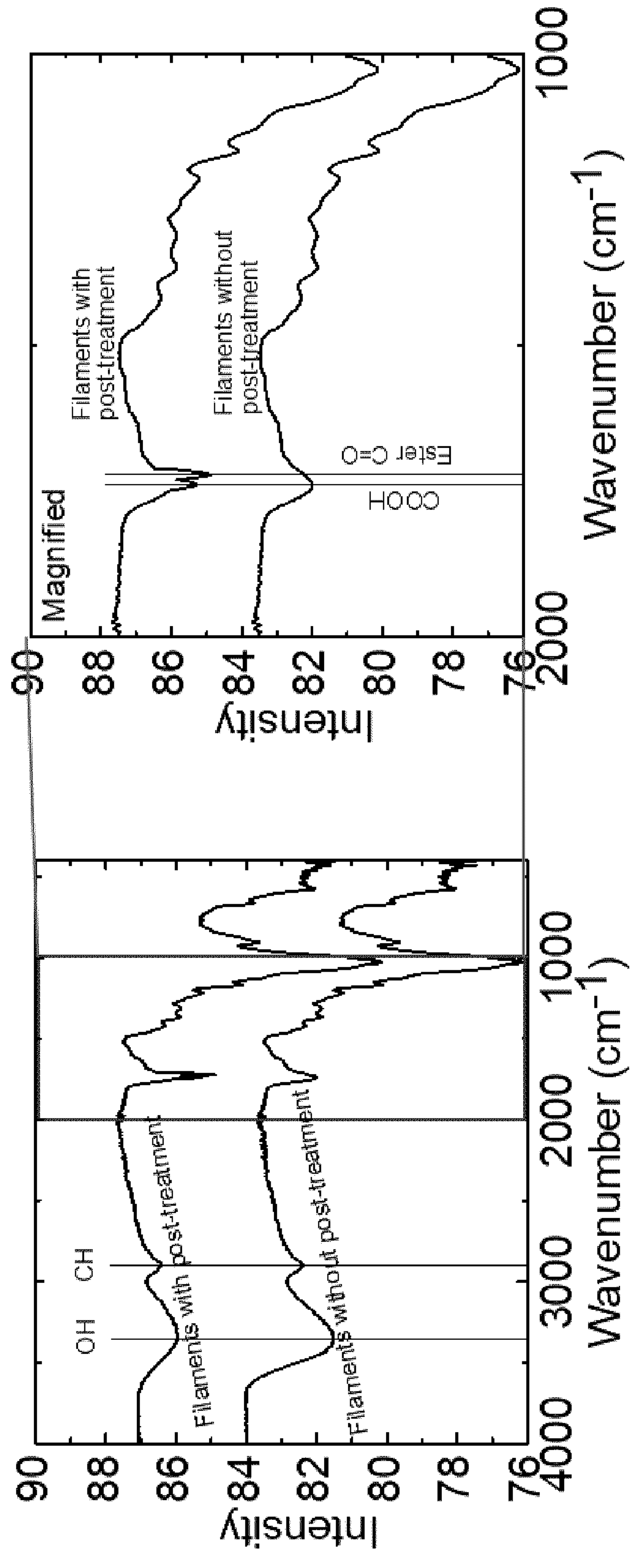
FIG. 8 shows FTIR spectra of the fabricated textile filaments without and with post-curing.

FTIR spectra of the fabricated filaments without and with post-curing are exhibited in FIG. 8. The characteristic absorption peaks at 3,330 $cm^{-1}$, 2,900 $cm^{-1}$ and 1740 $cm^{-1}$ correspond to O—H, C—H and —COOH groups, respectively, of carboxmethylated cellulose, which had been used to fabricate filaments. A new peak appeared at 1730 $cm^{-1}$ (exhibited in magnified region) demonstrated ester C═O bond formation in the post-cured filaments.

Figure 9:
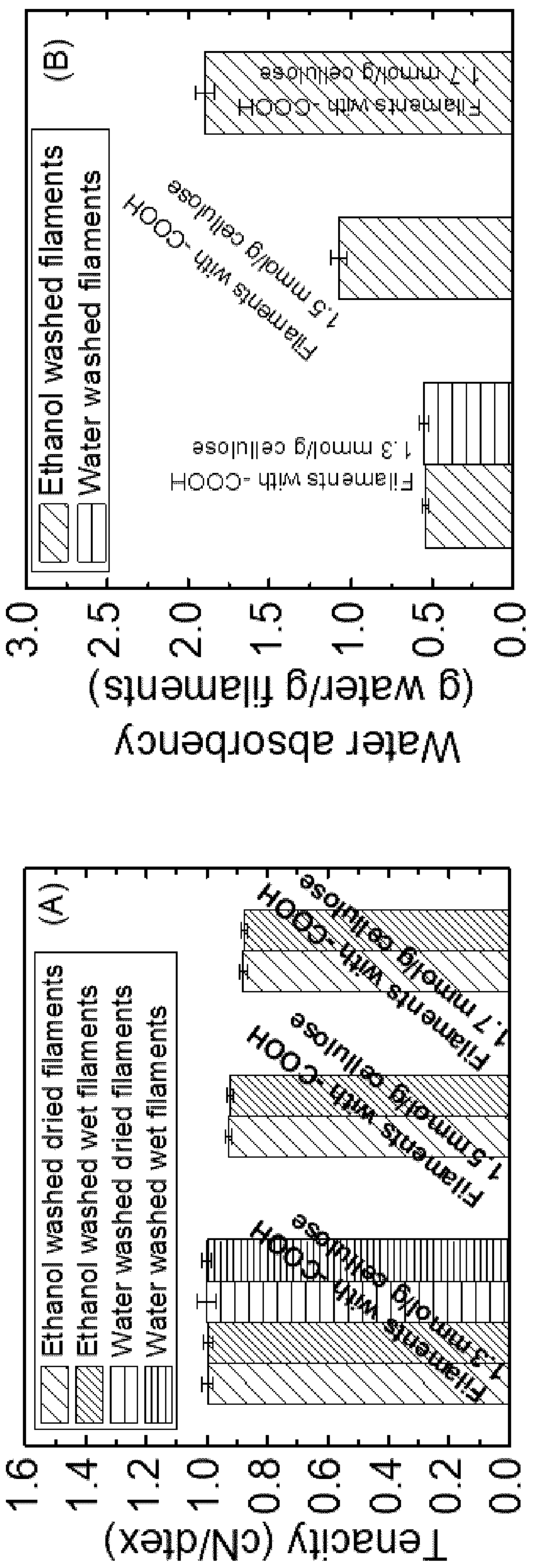
FIG. 9 shows (A) mechanical properties and (B) water absorbencies of the post-cured textile filaments.

Tenacities of ethanol and water washed dried filaments made from negatively charged cellulose derivative with carboxyl group content of 1.3 mmol/g cellulose increased 25% for the post-cured filaments (FIG. 6A and FIG. 9A). Tenacities of ethanol washed dried filaments made from negatively charged cellulose derivative with carboxyl group content of 1.5 and 1.7 mmol/g cellulose also increased 30 and 36%, respectively, for the post-cured filaments (FIG. 6A and FIG. 9A). These increase in tenacities were achieved likely due to the generation of crosslinked negatively charged cellulose derivative chains through ester bond. Moreover, the tenacity of dried filaments was similar to that of wet filaments for each type of negatively charged cellulose derivative likely due to the crosslinking of the cellulose chains through ester bond, which prevented loss of tenacity when wet (FIG. 9A). The tenacity of the post-cured filaments made from the negatively charged cellulose derivative with carboxyl group content of 1.3 mmol/g cellulose was ~10% higher than the literature value of rayon filaments while these values for the post-cured filaments with carboxyl group content of 1.5 and 1.7 mmol/g cellulose were similar to the literature value of rayon filaments (tenacity 0.9 cN/dtex).

Water absorbencies of ethanol and water washed filaments made from negatively charged cellulose derivative with carboxyl group content of 1.3 mmol/g cellulose decreased 28% for the post-cured filaments (FIG. 6B and FIG. 9B). Water absorbencies of ethanol washed filaments made from negatively charged cellulose derivative with carboxyl group content of 1.5 and 1.7 mmol/g cellulose also decreased 34 and 41%, respectively, for the post-cured filaments (FIG. 6B and FIG. 9B). As it is mentioned earlier that crosslinked negatively charged cellulose derivative chains through ester bonds were achieved during post-curing of the filaments. Generally, crosslinking of cellulose causes a denser macromolecular network with less capillary spaces in the crosslinked filaments. The crosslinked network reduces swelling of the cellulose molecules by water. For this reason, lower water absorbencies were obtained for the post-cured filaments as compared to those of the filaments without post-curing. The water absorbencies of the post-cured filaments with carboxyl group content of 1.3, 1.5 and 1.7 mmol/g cellulose were ~3.7 to 7.4 times, ~1.9 to 3.7 times and ~1 to 2 times lower, respectively, than that of rayon filaments (2-4 g water/g filament).

Possibility of Reuse of the Chemicals

Mild chemical modifications through carboxymethylation of cellulose and then mixing of aqueous solution of NaOH with the negatively charged cellulose derivative for preparing dope solutions from which filaments were spun in an acid bath were performed in this Example. Post-curing of these filaments with the use of aqueous solution of $NaH_2PO_2$ was also accomplished to obtain the filaments with extremely good properties for textile applications. Isopropyl alcohol used as a solvent for carboxymethylation (with the use of aqueous solutions of NaOH and $ClCH_2COONa$) of cellulose, ethanol/water mixture (70% ethanol and 30% water by volume) for washing of the negatively charged cellulose derivative and aqueous solution of $NaH_2PO_2$ used as a catalyst for the chemical reaction occurred at the time of post-curing of the filaments were employed during the above steps.

After reaction, isopropyl alcohol separated from negatively charged cellulose derivative could be reused for carboxymethylation of cellulose. In this stage, it might not be required to add extra aqueous solutions of NaOH and $ClCH_2COONa$ in isopropyl alcohol, just mixing of cellulose into this solvent could be required. However, lower amount of cellulose must be mixed in this solvent in order to achieve the same amount of carboxyl group content obtained previously.

Ethanol/water mixture was used to wash the negatively charged cellulose derivative separated from isopropyl alcohol after the carboxymethylation reaction. This used ethanol/water mixture could be reused many times for the same purpose. Ethanol from the ethanol/water mixture used for many times for washing can be separated by thermal distillation for further using.

In post-curing, dried filaments were dipped into an aqueous solution of $NaH_2PO_2$ for a few min and then took it out and heated in an oven for a few min followed by cooled to room temperature. Finally, the filaments were washed by DI water and then dried at room temperature. This washed out water mixed with the aqueous solution of $NaH_2PO_2$ in which filaments were previously dipped could be reused continuously for the post-curing of filaments.

Conclusions

Currently available processes for production of cellulose-based textiles are encountered by certain techno-economic and environmental drawbacks. A novel economical and environment friendly process—wet spinning of aqueous alkaline solution of carboxymethylated cellulose in an acid bath and then washing and drying of the spun filaments followed by heating them in the presence of $NaH_2PO_2$— has been developed in this Example to overcome some of shortcomings of the existing technologies applied for production of cellulosic textiles. After extrusion in acid bath, filaments containing 1.3 mmol —COOH/g cellulose could be washed with both water and ethanol, however, the filaments with carboxyl group content of 1.5 or 1.7 mmol/g cellulose could only be washed with ethanol. Most of the chemicals could be reused, demonstrating economical viability of this process. Carboxymethylated cellulose containing at least 1.3 mmol —COOH group/g cellulose was able to produce filaments with this process. Filaments with this amount of carboxyl group content demonstrated extremely good properties in terms of tenacity and water absorbency for textile applications. However, quality in terms of tenacity and water absorbency of the filaments containing carboxyl group content higher than 1.3 mmol —COOH group/g cellulose deteriorated due to increase in charge content in the filaments. It was also observed that the filaments with 1.3 mmol —COOH group/g cellulose demonstrated ~10% higher tenacity and ~3.7 to 7.4 times lower water absorbency as compared to the literature values of rayon filaments.

Example 2: Preparation of Cellulose-Based Filaments Comprising a Negatively Charged Cellulose Derivative Bearing Carboxymethyl Groups and Amine Functionalized Carboxylated Carbon Nanotubes (f-CNTs)

Materials and Methods

Materials

Bleached softwood kraft (BSWK) pulp was supplied by a kraft pulp mill in Canada. Sodium hydroxide (NaOH), sodium azide ($NaN_3$) and isopropyl alcohol (IPA) were received from Fisher Scientific, USA. Sodium chloroacetate ($ClCH_2COONa$) and multiwalled carboxylated carbon nanotube were purchased from Sigma Aldrich, Canada. $H_2SO_4$ was obtained from Caledon, Canada. 1-Ethyl-3-(3-dimethylaminopropyl) carbodiimide (EDC) and HCl were received from Fluka, USA. N-Hydroxysuccinimide (NHS) and Ethyl alcohol were purchased from Thermo Scientific, Japan and Brampton, Canada, respectively. Milli-Q deionized (DI) water was used in all experiments.

Modification of Cellulosic Pulps

The modification of cellulosic pulps was done using the same method as performed in the same step of Example 1. This reaction step was conducted several times with various NaOH solution concentrations (1.33, 1.75 and 2.54 g NaOH). In addition, the negatively charged cellulose derivative was washed 3 times with an ethanol/water mixture (60% ethanol and 40% water).

Amine Functionalization of Carboxylated CNT

First, carboxylated CNT was dispersed in DI water under sonication for 5 min. As compared to CNT, a 5 times larger amount of $H_2SO_4$ was added to the CNT dispersion and the mixture was sonicated again for 5 min. Afterward, a 1.5 times larger amount of $NaN_3$ (as compared to the amount of CNT) dissolved in DI water was added to the above CNT dispersion and kept for 12 h under magnetic stirring at room temperature. The CNT reaction mixture was then filtered through a0.1 μm filter followed by washing with DI water. Finally, the amine functionalized carboxylated CNT was dried in an oven at 105° C.

Preparation of Negatively Charged Cellulose Derivative Cross-Linked by f-CNT Composite Gel First 0.022 g EDC and 0.016 g NHS were dissolved in 100 g DI water. Then 7 g negatively charged cellulose derivative obtained from the modification reaction with the use of the highest amount of NaOH (2.54 g) and sodium chloroacetate (2.1 g) was thoroughly mixed with the EDC/NHS solution and kept for 2 h at a pH of 5.5. Afterward, 0.07 g amine functionalized carboxylated CNT dispersed well in 50 g DI water was added to this mixture and magnetically stirred for 5 h at a pH of 5.5. After 5 h, the pH of the reaction mixture was reduced to below 3.5 and then washed with ethanol/water mixture (60% ethanol and 40% water) followed by drying at room temperature. Afterward, 78 g DI water was mixed well with the dried negatively charged cellulose derivative cross-linked by f-CNT followed by mixing 15 g NaOH solution (6 g NaOH dissolved in 9 g water) with the use of an automatic mixer to form a fine gel. This gel was finally filtered through a 40 μm filter and the filtered gel was ready for wet spinning to fabricate filaments.

The gels without f-CNT used for wet spinning were also prepared for the all types of negatively charged cellulose derivative obtained from the modification reaction with the use of different amounts of NaOH (1.33, 1.75 and 2.54 g) and sodium chloroacetate (1.06, 1.42 and 2.1 g). First, 7 g negatively charged cellulose derivative was mixed well with 78 g DI water and then 15 g NaOH solution (6 g NaOH dissolved in 9 g water) was added to this mixture. This mixture was then mixed well by an automatic mixer to form afine gel, which was finally filtered through a 40 μm filter media. This filtered gel was ready for wet spinning to fabricate filaments.

Extrusion of Gel to Fabricate Filaments

This step was performed in the same manner as in Example 1. The entire process to fabricate the negatively charged cellulose derivative cross-linked by f-CNT composite filaments are shown in FIG. 10.

Field Emission-Scanning Electron Microscopy

Field emission-scanning electron microscopy (FE-SEM) (QUANTA FEG 450) with a platinum coating on the sample surface was performed to observe the surface and cross-sectional morphology of the filaments prepared from the negatively charged cellulose derivative and the negatively charged cellulose derivative cross-linked by f-CNT.

Fourier Transform Infrared

This step was performed in the same manner as in Example 1.

Mechanical Strength Measurement

Mechanical strength of the filaments was determined by using a TMI Lab Master tensile machine (John Chatillon & Sons, New York, USA) at the ambient condition. The filament sample was taken at a length of 50 mm with the strain rate of 5 mm/min. Ten filaments were taken together for mechanical strength measurement of each filament (average value of ten filaments together).

Carboxyl Group (—COOH) Content Measurement

This step was performed in the same manner as in Example 1.

Water Absorbency Measurement

This step was performed in the same manner as in Example 1.

Colorfastness Investigation

Color fastness of the fabricated filaments of negatively charged cellulose derivative cross-linked by f-CNT was investigated as per the method described in literature (BS 1006 1990). The washing, rubbing, light and perspiration fastness were measured according to the method of ISO 105-C02 (1989), ISO 105-X12(1987), ISO 105-B02 (1988) and ISO 105-E04 (1989), respectively.

Results and Discussion

Chemical Modification and Cross-Linking of Cellulose

This step was performed in the same manner as in Example 1.

The content of —COOH group as a function of NaOH and $ClCH_2COONa$ concentrations under constant cellulose content (7 g), temperature (1st step: 40° C., 2nd step: 50-60° C.) and reaction duration (1st step: 1 h, 2nd step: 2 h) is exhibited in Table 2. Table 2 demonstrates that increasing the contents of NaOH (from 1.33 to 2.54 g) and $ClCH_2COONa$ (from 1.06 to 2.1 g) increased the —COOH group content (from 0.6 to 1.3 mmol/g cellulose) in the negatively charged cellulose derivative.

The negatively charged cellulose derivative with various —COOH group content (0.6 to 1.3 mmol/g cellulose) were used to make gel for fabricating filaments through spinning (Table 2). The negatively charged cellulose derivative with a —COOH group content of 0.6 mmol/g cellulose was not able to form a gel (for spinning). The negatively charged cellulose derivative with a —COOH group content of 1.0 and 1.3 mmol/g cellulose was able to form gel; however, the gel obtained from the negatively charged cellulose derivative with 1.0 mmol/g cellulose was highly viscous likely due to high interaction created by hydrogen bond formation among the —OH groups residing in the cellulose chain, which is why it was not suitable for spinning. The other type of gel obtained from the negatively charged cellulose derivative with —COOH group content of 1.3 mmol/g cellulose was suitable for spinning to fabricate filaments. Therefore, the negatively charged cellulose derivative with a —COOH group content of 1.3 mmol/g cellulose was selected for fabrication of filaments produced from the negatively charged cellulose derivative cross-linked by f-CNT composite in this research.

TABLE 2

Optimization of chemical modification reaction of cellulose to fabricate filaments by wet spinning process.

| Cellulose (g) | NaOH (g) | Sodium chloroacetate (g) | Reaction temp. | Reaction time | —COOH content (mmol/g cellulose | Characteristic of the negatively charged cellulose derivative |
|---|---|---|---|---|---|---|
| 7 | 1.33 | 1.06 | 1st step: 40° C. | 1st step: 1 h | 0.6 | Not able to form gel for spinning |
| | 1.75 | 1.42 | 2nd step: 50-60° C. | 2nd step: 2 h | 1.0 | Able to form gel but unsuitable for spinning |
| | 2.54 | 2.1 | | | 1.3 | Able to form gel suitable for spinning |

Figure 12:
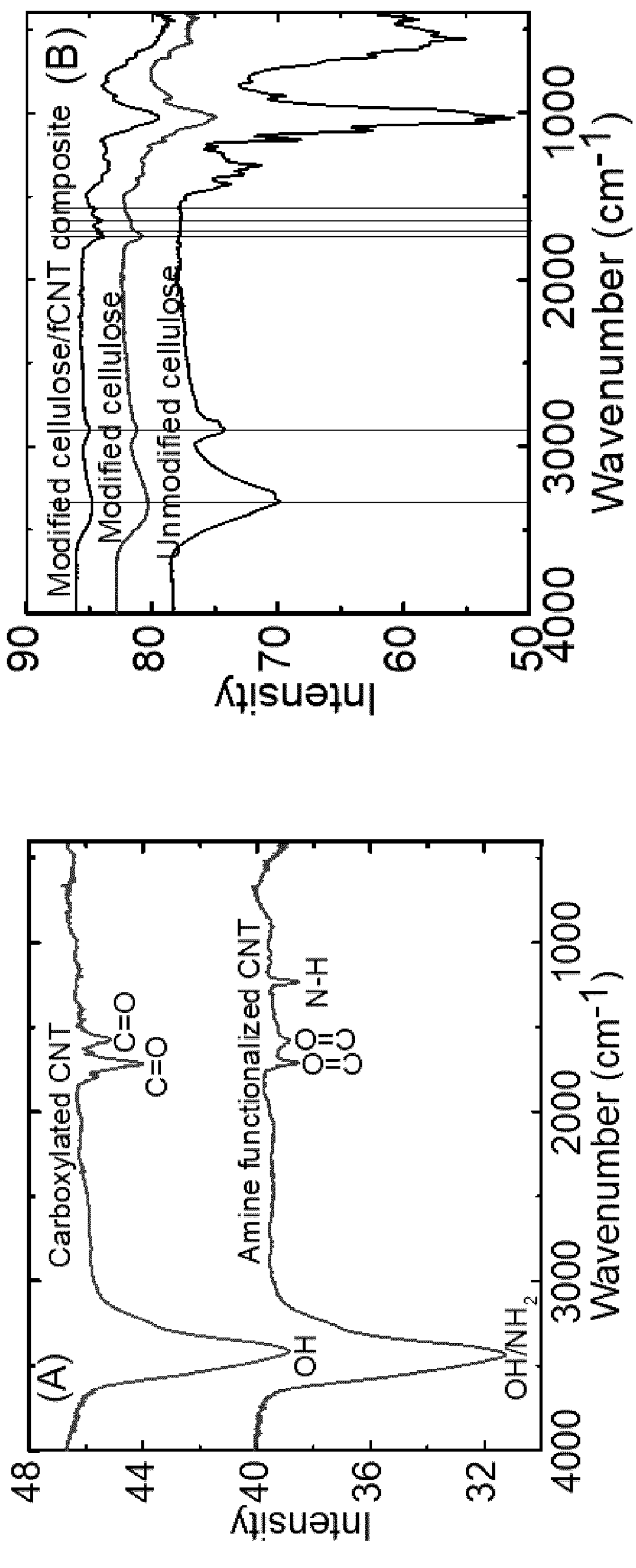
FIG. 12 shows FTIR spectra of (A) Carboxylated and amine functionalized carboxylated CNT, and (B) Unmodified cellulose, negatively charged cellulose derivative (labelled as modified cellulose) and negatively charged cellulose derivative cross-linked by f-CNT composite.

The conversion of carboxylated CNT to amine functionalized carboxylated CNT and the cross-linking reaction between negatively charged functional groups and f-CNT are presented schematically in FIG. 7. The FTIR spectrum of carboxylated CNT shows characteristic peaks at 3410 $cm^{-1}$ for —OH, and at 1715 $cm^{-1}$ and 1574 $cm^{-1}$ for ═CO of —COOH group residing in the CNT (FIG. 12A). A new peak at 1235 $cm^{-1}$ for N—H of —$NH_2$ group along with the peaks of carboxylated CNT appeared due to amine functionalization of carboxylated CNT (FIG. 12A). This FTIR result demonstrated the partial conversion of —COOH groups to —$NH_2$ groups present in the CNT (FIG. 11). A peak at 3410 $cm^{-1}$ (which overlapped completely with the peak for —OH group) for —$NH_2$ stretching has also appeared after amine functionalization of carboxylated CNT (FIG. 12A). FTIR spectra of unmodified cellulose, negatively charged cellulose derivative and negatively charged cellulose derivative cross-linked by f-CNT composite are exhibited in FIG. 12B. In the case of unmodified cellulose, the characteristic peaks at 3300 $cm^{-1}$ and 2900 $cm^{-1}$ correspond to O—H and C—H stretching vibrations, respectively. The peaks at 3300 $cm^{-1}$, 2900 $cm^{-1}$ and 1740 $cm^{-1}$ for the negatively charged cellulose derivative are due to the stretching of —OH groups and C—H, and the —COOH groups vibration, respectively. Three new peaks did appear at 1650 $cm^{-1}$, 1715 $cm^{-1}$ and 1574 cm-1 for the sample of the negatively charged cellulose derivative cross-linked by f-CNT composite filaments. The peak at 1650 $cm^{-1}$ is for C═O of the generated amide bond between negatively charged cellulose derivative and f-CNT, and the peaks at 1715 $cm^{-1}$ and 1574 $cm^{-1}$ were for C═O of the carboxylic group in f-CNT.

Figure 13:
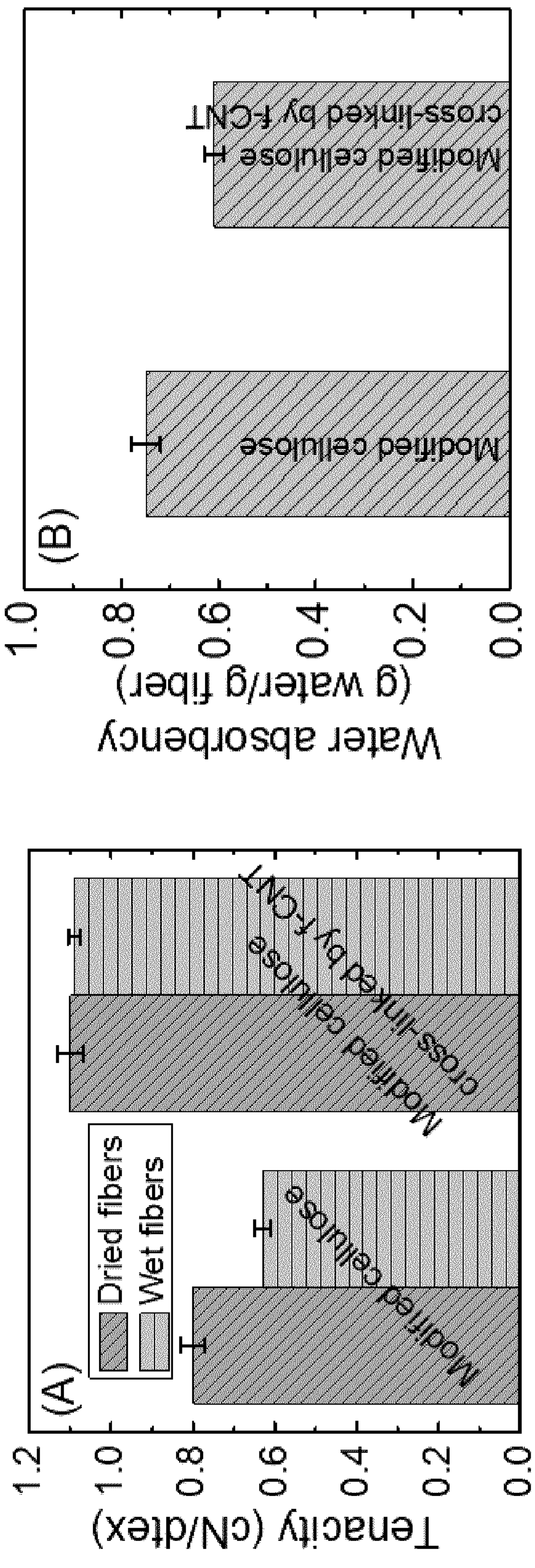
FIG. 13 shows (A) Mechanical properties and (B) Water absorbency of fabricated textile filaments according to an embodiment of the present invention (negatively charged cellulose derivative is labelled as modified cellulose).

Mechanical Properties and Water Absorbency of the Negatively Charged Cellulose Derivative Cross-Linked by f-CNT Composite Filaments The mechanical strength of textile filaments is usually expressed in terms of tenacity. The tenacity of both dried and wet filaments was determined. The tenacity of the dried filaments fabricated from the negatively charged cellulose derivative was 0.8 cN/dtex, which was ~21% higher than the tenacity of wet filaments (0.63 cN/dtex) (FIG. 13A). However, the tenacity of both dry and wet filaments made from the negatively charged cellulose derivative cross-linked by f-CNT were identical (~1.1 cN/dtex), which was ~27% higher than the value of the filaments comprising negatively charged cellulose derivative in dry conditions (FIG. 13A). The identical mechanical strength of the filaments obtained from the gel of the negatively charged cellulose derivative cross-linked by f-CNT was probably due to the cross-linking structure of the cellulose chains through f-CNT, which prevented loss of tenacity when wet. The higher mechanical strength of the filaments fabricated from the negatively charged cellulose derivative cross-linked by f-CNT as compared to the filaments comprising negatively charged cellulose derivative was likely due to two reasons: (i) the incorporation of f-CNT into the negatively charged cellulose derivative and, (ii) the generation of across-linked structure through the incorporated f-CNT in the negatively charged cellulose derivative. The tenacity of the filaments made from the negatively charged cellulose derivative cross-linked by f-CNT was ~18% higher than the literature value of rayon filaments (0.9 cN/dtex).

Water absorbency is one of the major properties of textile filaments. This property demonstrates the swelling behaviour and the capacity to take up water. The water absorbency of the filaments made from the negatively charged cellulose derivative was 0.75 water/g filament, which is ~19% higher than that of the filaments made from the negatively charged cellulose derivative cross-linked by f-CNT (0.61 water/g filament) (FIG. 13B). Generally, higher cross-linking of cellulose causes a denser macromolecular network with less capillary spaces in the cross-linked filaments. The cross-linked network structures shield the interior of the filaments from the flux of incoming water, therefore, preventing swelling of the cellulose molecules by water. For this reason, lower water absorbency was obtained for the filaments made from the negatively charged cellulose derivative cross-linked by f-CNT as compared to that of the filaments made from the negatively charged cellulose derivative. The obtained water absorbency of the filaments made from the negatively charged cellulose derivative cross-linked by f-CNT was ~3.3 to 6.6 times lower than that of rayon filaments (2-4 g water/g filament). This low water absorbency of the fabricated filaments is undoubtedly a good property for high quality textile applications.

Color Fastness Properties of the Negatively Charged Cellulose Derivative Cross-Linked by f-CNT Composite Filaments The color fastness properties of the fabricated cellulose-based filaments filled with f-CNT are presented in Table 3. Color fastness is the ability provided by dyed filaments to retain dye on them under external effects such as washing with the use of soaps and detergents, rubbing, exposure to light, contact to acid and alkaline solutions etc. Color fastness of a textile material is indicated by the numbers of 1 (poor fastness), 2 (limited fastness), 3 (fair fastness), 4 (good fastness) and 5 (excellent fastness). In this research, f-CNT was used as a coloring material alternative to the commonly used black color dyes. The fabricated filaments exhibited excellent values of fastness, i.e., 5, to washing, rubbing, light and perspiration. These excellent fastness values indicate no loss of f-CNT due to covalent bond formation with the negatively charged cellulose derivative under external effects on the fabricated filaments.

TABLE 3

Color fastness properties of the cellulose-based filaments filled with f-CNT.

| | | | | Fastness to perspiration | |
|---|---|---|---|---|---|
| Type of fastness test | Fastness to washing | Fastness to rubbing | Fastness to light | Acidic solution (pH 5) | Alkaline solution (pH 9) |
| Fastness value | 5 | 5 | 5 | 5 | 5 |

Figure 14:
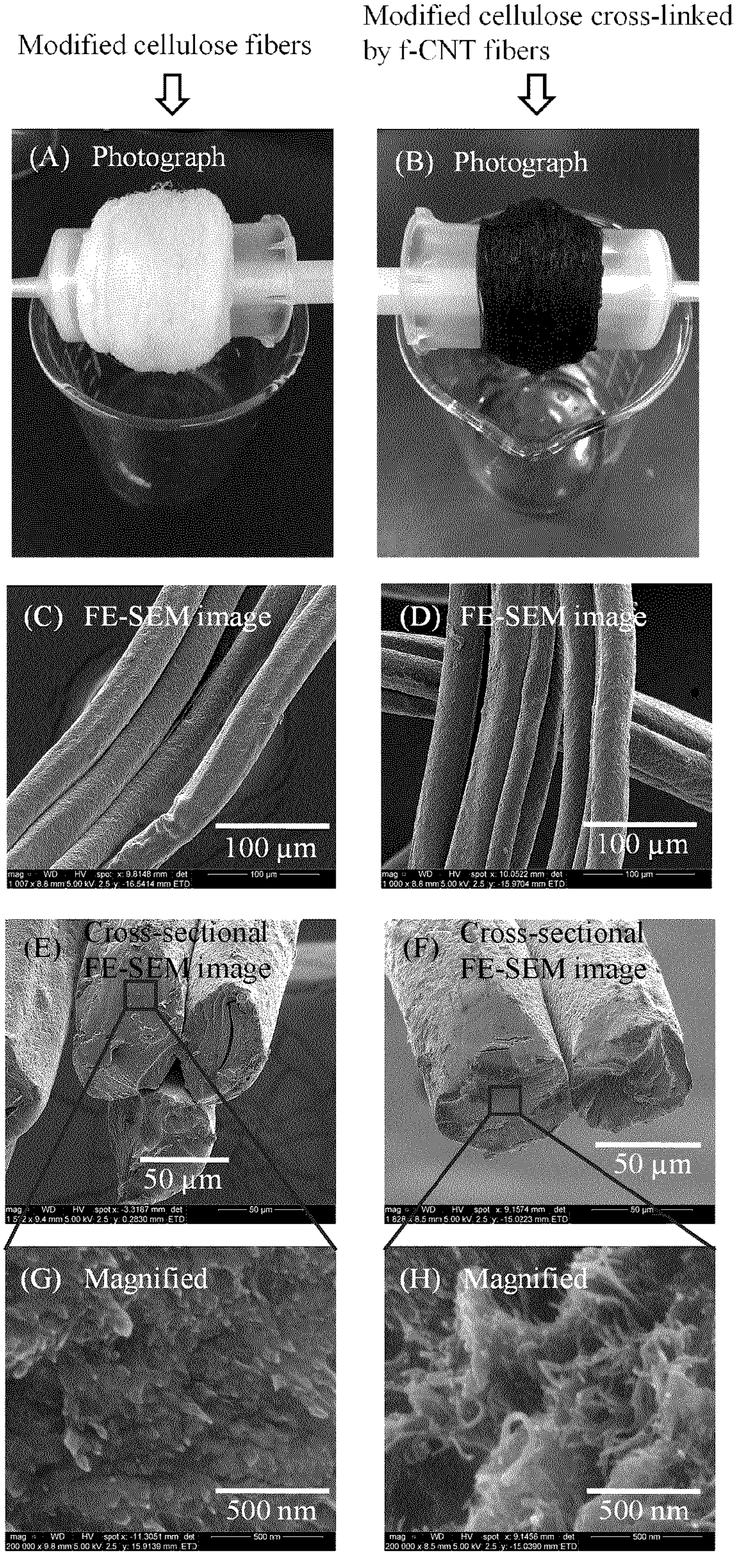
FIG. 14 shows photographs (A, B), and FE-SEM (C, D), cross-sectional FE-SEM (E, F) and magnified cross-sectional FE-SEM (G, H) images of filaments prepared from negatively charged cellulose derivative (left, labelled as modified cellulose) and negatively charged cellulose derivative (labelled as modified cellulose) cross-linked by f-CNT composite (right).

Morphological Properties of the Cellulose-Based Filaments Comprising Negatively Charged Cellulose Derivative Cross-Linked by f-CNT The morphologies of the filaments made from the negatively charged cellulose derivative and the negatively charged cellulose derivative cross-linked by f-CNT are shown in FIG. 14. Continuous white and black colors filaments were obtained from the negatively charged cellulose derivative and the negatively charged cellulose derivative cross-linked by f-CNT, respectively, shown in FIG. 14A and FIG. 14B. FE-SEM images show that the filaments obtained from both dope solutions (i.e., negatively charged cellulose derivative and negatively charged cellulose derivative cross-linked with f-CNT) were ~50 μm in diameters (FIG. 14C and FIG. 14D), which were completely filled (FIG. 14E and FIG. 14F). No morphological changes in the surface of the filaments were observed when f-CNT was incorporated into the negatively charged cellulose derivative. "Ridge and valley" structures were found both in the magnified cross-sectional FE-SEM image of the filaments prepared from negatively charged cellulose derivative dope solution (FIG. 14G) and of the filaments spun from the dope solution composed of negatively charged cellulose derivative and f-CNT (FIG. 14H).

No Release of CNT from the Filaments into Acid Bath During Extrusion of Gel

Figure 15:
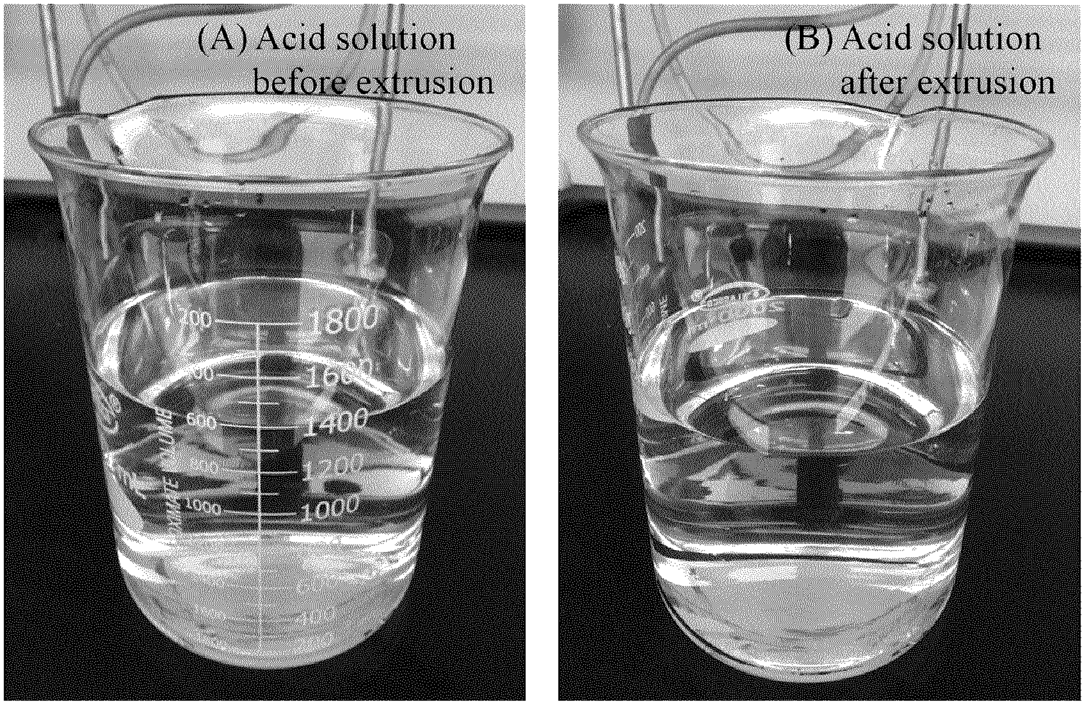
FIG. 15 shows photograph of acid solution (A) before extrusion and (B) after extrusion of cellulose-based filaments according to an embodiment of the present invention.

The negatively charged cellulose derivative formed covalent bonds with f-CNT in the dope solution used for extrusion in acid solution bath. Due to these covalent bonds, no CNT was released from the filaments into the acid solution utilized for regeneration of cellulose during extrusion. The acid solution used for regeneration of cellulose during extrusion is exhibited in FIG. 15A (before extrusion) and FIG. 15B (after extrusion). Transparency of the acid solutions before and after extrusion were similar that indicated no CNT was released from the textile filaments during extrusion.

Conclusions

Black color textile filaments were fabricated successfully from negatively charged cellulose derivative cross-linked by f-CNT by an eco-friendly method. Functionalized carboxylated carbon nanotubes were covalently cross-linked with the negatively charged cellulose derivative in the dope solution from which black color textile filaments were fabricated by extrusion in an acid solution bath. Thus, no conventional dyeing step using any commonly used black color dye was performed for the fabrication of black filaments. Production of dyed wastewaters is a common scenario in the current textile industries, whereas no chance to produce dyed wastewater due to the absence of conventional dyeing step in this research. The incorporation of f-CNT increased the mechanical strength but decreased the water absorbency along with excellent color fastness of the fabricated filaments. The increase in mechanical strength, decrease in water absorbency and excellent color fastness could make the fabricated filaments promising candidates for high quality textile applications.

Example 3: Preparation of Cellulose-Based Filaments

We prepared cellulose-based filaments comprising (a) a negatively charged cellulose derivative bearing carboxymethyl groups and reactive orange 5 dye; (b) a negatively charged cellulose derivative bearing carboxymethyl groups and reactive red 2 dye; (c) a negatively charged cellulose derivative bearing carboxymethyl groups and reactive green 19 dye

Materials and Methods

Materials

Bleached softwood kraft (BSWK) pulp was supplied by a kraft pulp mill in Canada. Sodium hydroxide (NaOH) and isopropyl alcohol (IPA) were received from Fisher Scientific, USA. Sodium chloroacetate ($ClCH_2COONa$) was purchased from Sigma Aldrich, Canada. Reactive orange 5, reactive red 2 and reactive green 19 dyes were obtained from Alfa Chemistry, USA. $H_2SO_4$ and HCl were obtained from Caledon, Canada and Fluka, USA, respectively. Ethyl alcohol was purchased from Brampton, Canada. Milli-Q deionized (DI) water was used in all experiments.

Modification of Cellulosic Pulps

This step was performed in the same manner as in Example 2.

Preparation of Negatively Charged Cellulose Derivative Gel Covalently-Linked with Dyes First, 0.006 g dye (reactive orange 5/reactive red 2/reactive green 19) was dissolved in 78 g DI water and then mixed well with 7 g dried negatively charged cellulose derivative [obtained from the modification reaction with the use of the highest amount of NaOH (2.54 g) and sodium chloroacetate (2.1 g)] followed by mixing 15 g NaOH solution (6 g NaOH dissolved in 9 g water) with the use of an automatic mixer to form a fine gel. This gel was finally filtered through a 40 μm filter and the filtered gel was ready for wet spinning to fabricate filaments. This gel was kept for 12 h before wet spinning.

Gels without dyes used for wet spinning were also prepared for all types of negatively charged cellulose derivative obtained from the modification reaction with the use of different amounts of NaOH (1.33, 1.75 and 2.54 g) and sodium chloroacetate (1.06, 1.42 and 2.1 g). First, 7 g negatively charged cellulose derivative was mixed well with 78 g DI water and then 15 g NaOH solution (6 g NaOH dissolved in 9 g water) was added to this mixture. This mixture was then mixed well by an automatic mixer to form a fine gel, which was finally filtered through a 40 μm filter media. This filtered gel was ready for wet spinning to fabricate filaments.

Extrusion of the Gels to Fabricate Textile Filaments

This step was performed in the same manner as in Example 1.

Figure 16:
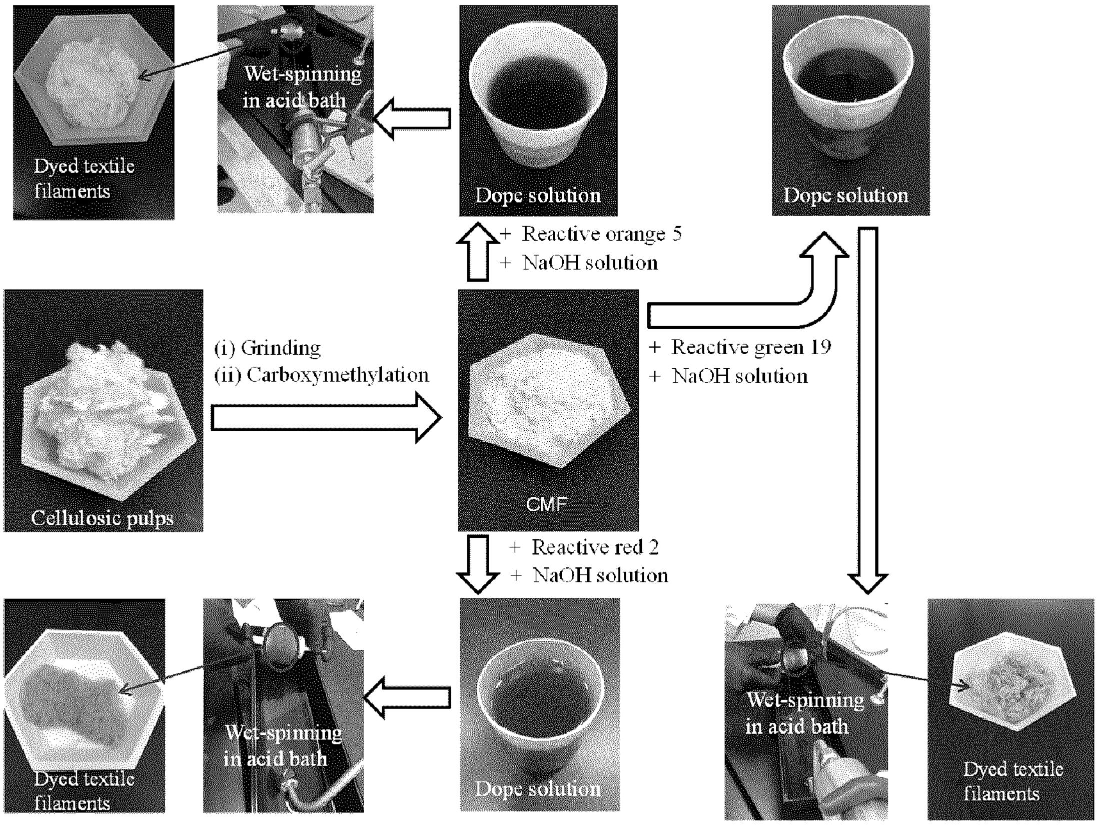
FIG. 16 shows the preparation of covalently-linked dyed textile filaments from cellulosic pulps according to an embodiment of the method of the present invention.

The entire process to fabricate covalently-linked dyed negatively charged cellulose derivative textile filaments is shown in FIG. 16.

Characterization

Measurement of Carboxyl Group (—COOH) Content of the Negatively Charged Cellulose Derivative This step was performed in the same manner as in Example 1.

Scanning Electron Microscopv

This step was performed in the same manner as in Example 1.

Fourier Transform Infrared

This step was performed in the same manner as in Example 1.

Nuclear Magnetic Resonance

This step was performed in the same manner as in Example 1.

Mechanical Strength

This step was performed in the same manner as in Example 1.

Water Absorbency

This step was performed in the same manner as in Example 1.

Color Fastness

This step was performed in the same manner as in Example 2.

Results and Discussion

Chemical Modification of Cellulose

This step was performed in the same manner as in Example 2.

The content of —COOH groups as a function of NaOH and $ClCH_2COONa$ concentrations under constant cellulose content (7 g), temperature ($1^{st}$ step: 40° C., $2^{nd}$ step: 50-60° C.) and reaction duration ($1^{st}$ step: 1 h, $2^{nd}$ step: 2 h) is exhibited in Table 4. Table 4 demonstrates that increasing the contents of NaOH (from 1.33 to 2.54 g) and $ClCH_2COONa$ (from 1.06 to 2.1 g) increased the —COOH group content (from 0.6 to 1.3 mmol/g cellulose) in the negatively charged cellulose derivative. The negatively charged cellulose derivative with various —COOH group content (0.6 to 1.3 mmol/g cellulose) were used to produce gels for fabricating of filaments through spinning (Table 4). The negatively charged cellulose derivative with a —COOH group content of 0.6 mmol/g cellulose was not able to form a gel suitable for spinning. The negatively charged cellulose derivative with a —COOH group content of 1.0 and 1.3 mmol/g cellulose was able to form gels; however, the gel obtained from the negatively charged cellulose derivative with 1.0 mmol/g cellulose was highly viscous made spinning difficult. The other type of gel obtained from the negatively charged cellulose derivative with a —COOH group content of 1.3 mmol/g cellulose was suitable for spinning to fabricate filaments. Therefore, in this research, this negatively charged cellulose derivative was selected to fabricate dyed textile filaments in which covalent bonds were formed between cellulose chains and dyes.

TABLE 4

Optimization of chemical modification reaction of cellulose to fabricate textile filaments by wet spinning process.

| Cellulose (g) | NaOH (g) | Sodium chloroacetate (g) | Reaction temp. | Reaction time | —COOH content (mmol/g cellulose | Characteristic of the negatively charged cellulose derivative |
|---|---|---|---|---|---|---|
| 7 | 1.33 | 1.06 | $1^{st}$ step: 40° C. | $1^{st}$ step: 1 h | 0.6 | Not able to form gel for spinning |
| | 1.75 | 1.42 | $2^{nd}$ step: 50-60° C. | 2nd step: 2 h | 1.0 | Able to form gel but unsuitable for spinning |
| | 2.54 | 2.1 | | | 1.3 | Able to form suitable gel for spinning |

Figure 17:
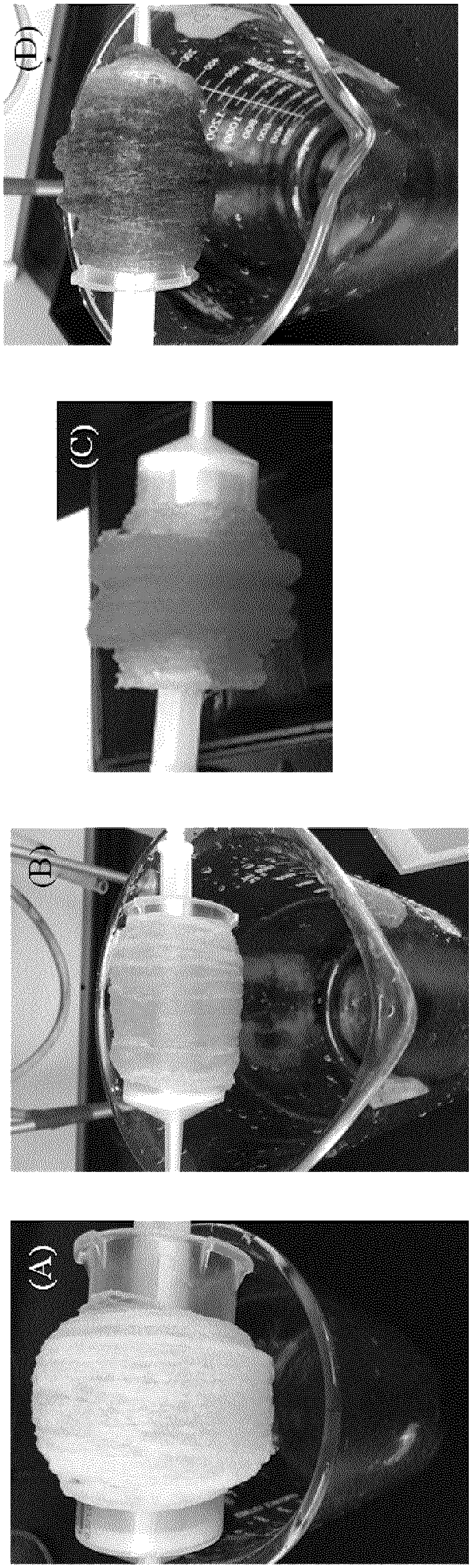
FIG. 17 shows camera images of (A) non-dyed, (B) reactive orange 5 dyed, (C) reactive red 2 dyed, and (D) reactive green 19 dyed textile filaments comprising negatively charged cellulose derivative according to an embodiment of the present invention.

Morphology of the Textile Filaments Made of Negatively Charged Cellulose Derivative and Dyes Photographs of the filaments made from the negatively charged cellulose derivative and the negatively charged cellulose derivative covalently-linked with dyes are shown in FIG. 17. Continuous white (FIG. 17A), and continuous orange (FIG. 17B), pink (FIG. 17C) and blue-green (FIG. 17D) colored filaments were obtained from the negatively charged cellulose derivative, and the negatively charged cellulose derivative covalently-linked with reactive orange 5, reactive red 2 and reactive green 19 dyes, respectively. Although the color of the filaments dyed with reactive orange 5 were orange, the colors of the filaments dyed with reactive red 2 and reactive green 19 were pink and blue-green, respectively, due to likely very low concentrations of dyes (0.08%) in the filaments.

Figure 18:
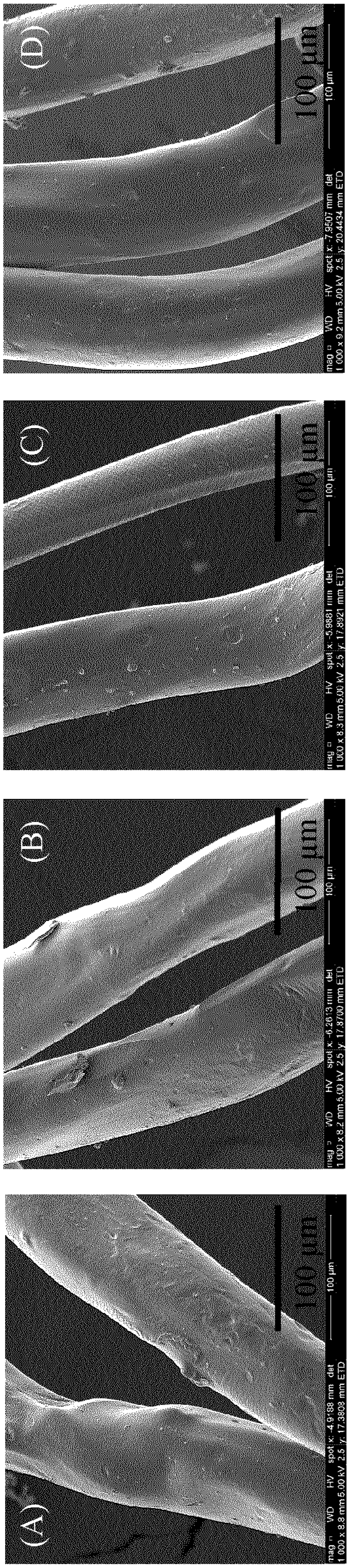
FIG. 18 shows SEM images of (A) non-dyed, (B) reactive orange 5 dyed, (C) reactive red 2 dyed, and (D) reactive green 19 dyed textile filaments comprising negatively charged cellulose derivative according to an embodiment of the present invention.

SEM images of the filaments made from the negatively charged cellulose derivative and the negatively charged cellulose derivative covalently-linked with dyes are shown in FIG. 18. SEM images show that the filaments obtained from all the dope solutions, i.e., negatively charged cellulose derivative (FIG. 18A) and negatively charged cellulose derivative covalently-linked with reactive orange 5 (FIG. 18B), reactive red 2 (FIG. 18C) and reactive green 19 (FIG. 18D) dyes, were ~70 μm in diameters. No morphological changes in the surface of the filaments were observed when dyes were incorporated into the negatively charged cellulose derivative.

Figure 19:
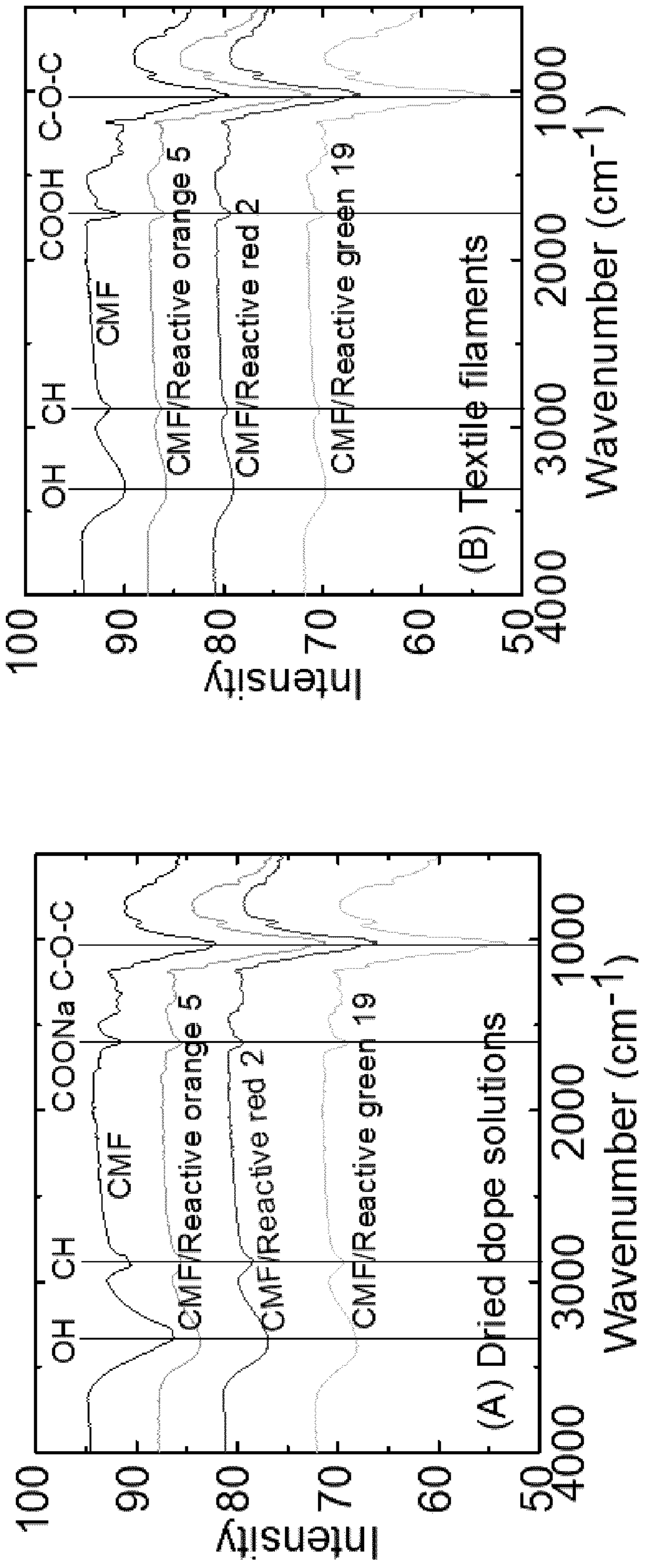
FIG. 19 shows FTIR spectra of (A) dried dope solutions and (B) textile filaments composed of negatively charged cellulose derivative bearing reactive dyes according to an embodiment of the present invention.
Figure 20:
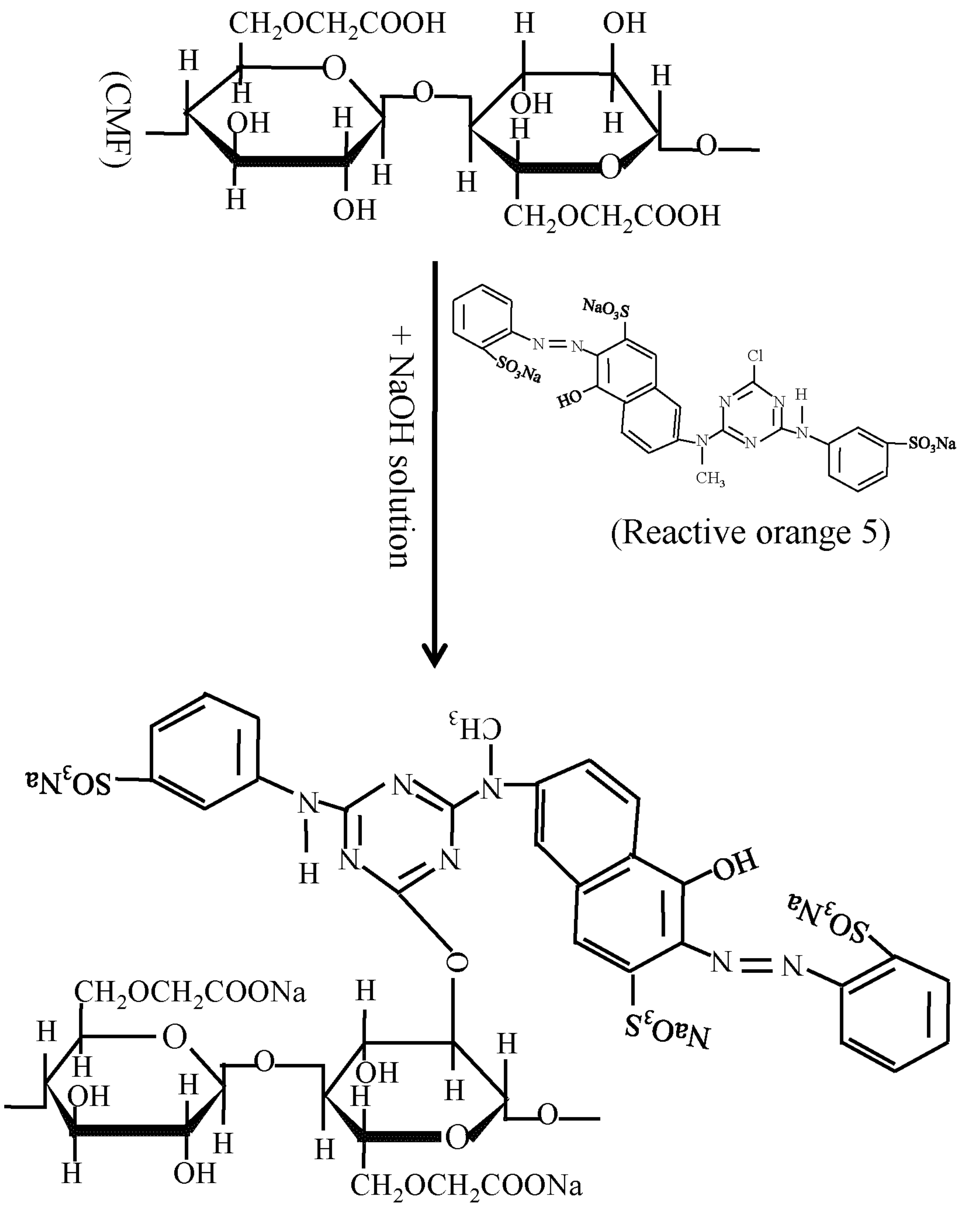
FIG. 20 shows chemical reaction between CMF and reactive orange 5 in the dope solutions.
Figure 21:
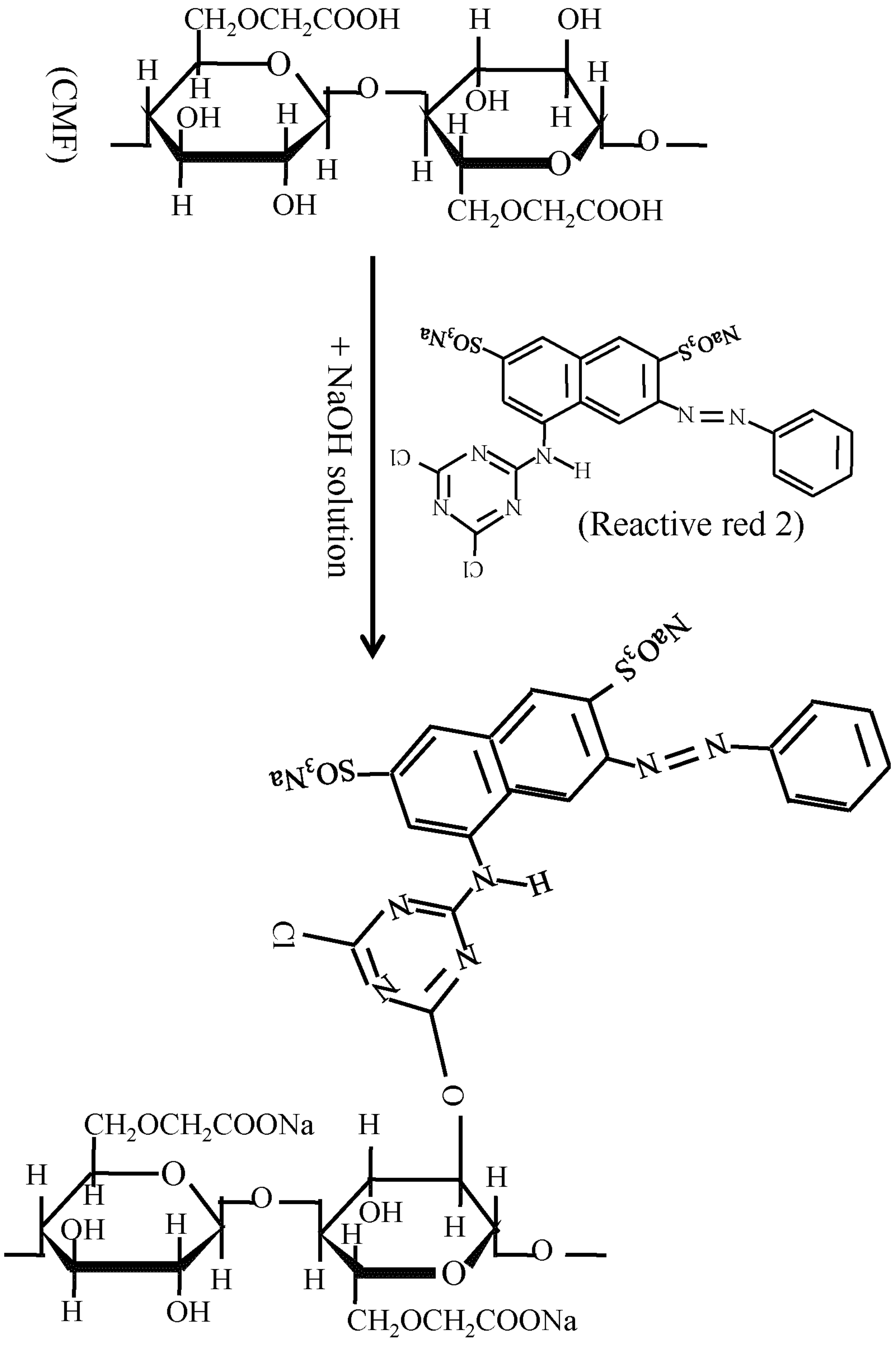
FIG. 21 shows chemical reaction between CMF and reactive red 2 in the dope solutions.
Figure 22:
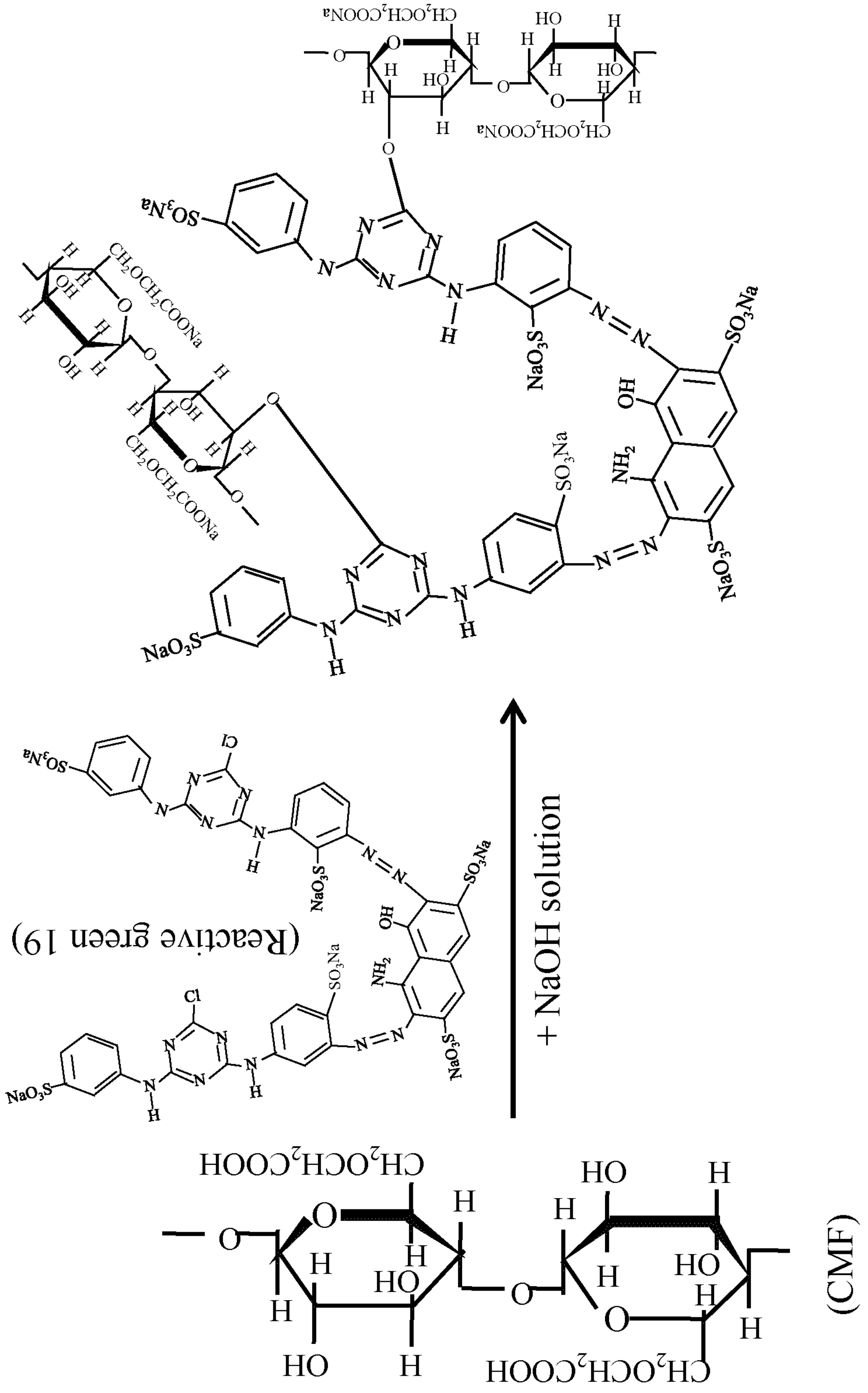
FIG. 22 shows chemical reaction between CMF and reactive green 19 in the dope solutions.

Covalently-Linking of Dyes with the Negatively Charged Cellulose Derivative in the Textile Filaments FTIR spectra of dried dope solutions and filaments made from negatively charged cellulose derivative and negatively charged cellulose derivative covalently-linked with dyes are exhibited in FIG. 19. The peaks at 3330 $cm^{-1}$, 2900 $cm^{-1}$ and 1605 $cm^{-1}$ for the negatively charged cellulose derivative are due to the stretching of —OH groups and C—H bonds, and the carboxyl vibration in the Na-form, respectively. The intensities of the peaks for —OH groups decreased while the intensities of the peaks for —C—O—C— groups (ether groups) increased due to incorporation of dyes (reactive orange 5, reactive red 2 and reactive green 19) in the dope solutions made from negatively charged cellulose derivative (FIG. 19A). This is due to the partial conversion of —OH groups into —C—O—C— groups formed by the chemical reactions between negatively charged cellulose derivative and dyes in the dope solutions (FIG. 20, FIG. 21 and FIG. 22). Due to a large distance between the reactive groups (—Cl), reactive green 19 dye could also function as a covalently-linked cross-linker of the negatively charged cellulose derivative chains (FIG. 22). The peak at 1605 $cm^{-1}$ obtained for carboxyl vibration in the Na-form (FIG. 19A) shifted to 1740 $cm^{-1}$ in case of textile filaments made from the dope solutions of negatively charged cellulose derivative and negatively charged cellulose derivative covalently-linked with dyes (reactive orange 5, reactive red 2 and reactive green 19) (FIG. 19B). Basically, the filaments regenerated in acid solution in which —COONa groups of negatively charged cellulose derivative converted to —COOH groups, which were responsible for the peak at 1740 $cm^{-1}$.

Figure 23:
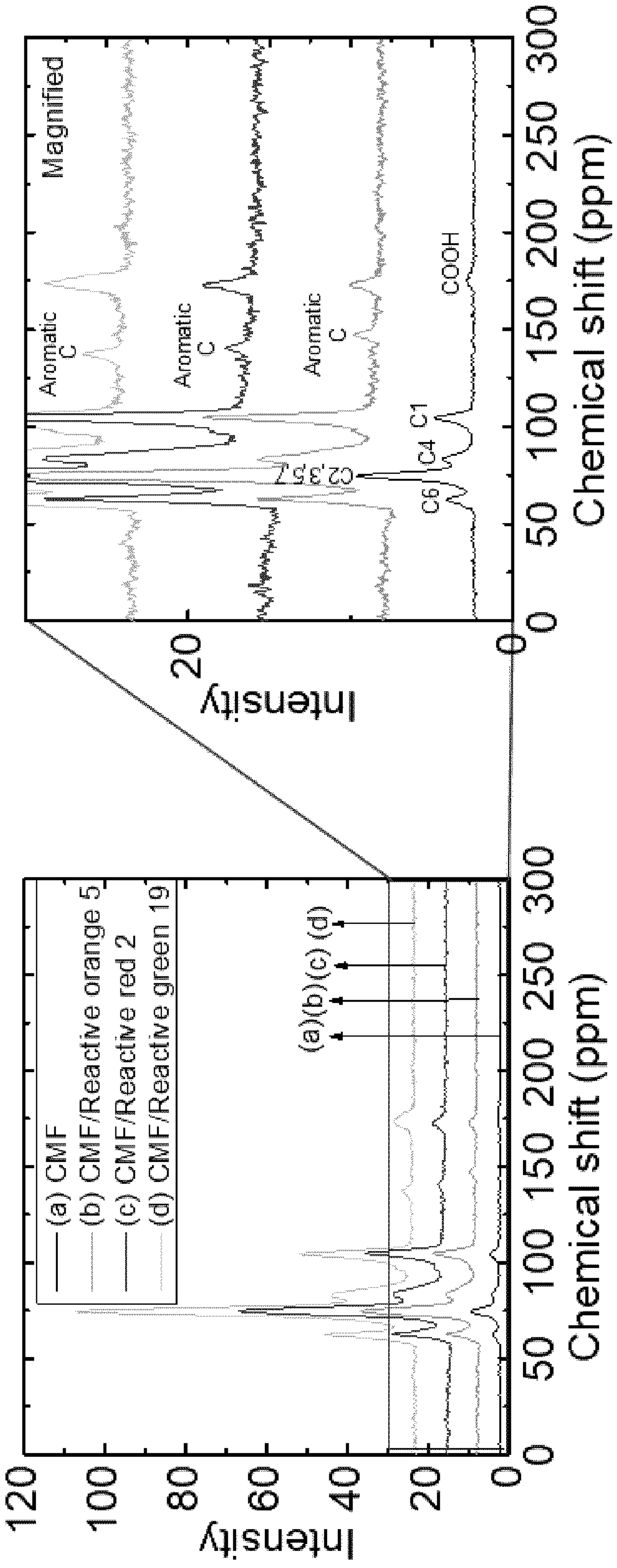
FIG. 23 shows the CNMR of textile filaments composed of negatively charged cellulose derivative bearing reactive dyes.

The occurrence of the carboxymethylation reaction and covalent linkage between negatively charged cellulose derivative and dyes were also confirmed by $^{13}C$ solid-state NMR, shown in FIG. 23. FIG. 23 displays the $^{13}C$-NMR spectra of negatively charged cellulose derivative and negatively charged cellulose derivative covalently-linked with dyes (reactive orange 5, reactive red 2 and reactive green 19). The unnegatively charged cellulose derivative exhibited carbon peaks at C1 (105 ppm), C4 (85 ppm), C2, 3, 5 (74 ppm) and C6 (65 ppm), which are all typical of cellulose I. However, a new peak at 173 ppm appeared in the $^{13}C$-NMR spectra of the negatively charged cellulose derivative (carboxymethylated) samples, confirming the presence of the newly introduced COOH— groups (FIG. 23). The appearance of aromatic carbon at 147 ppm (for reactive orange 5), 140 ppm (for reactive red 2) and 137 (for reactive green 19) demonstrated successful covalent linkage of these dyes with negatively charged cellulose derivative.

Figure 24:
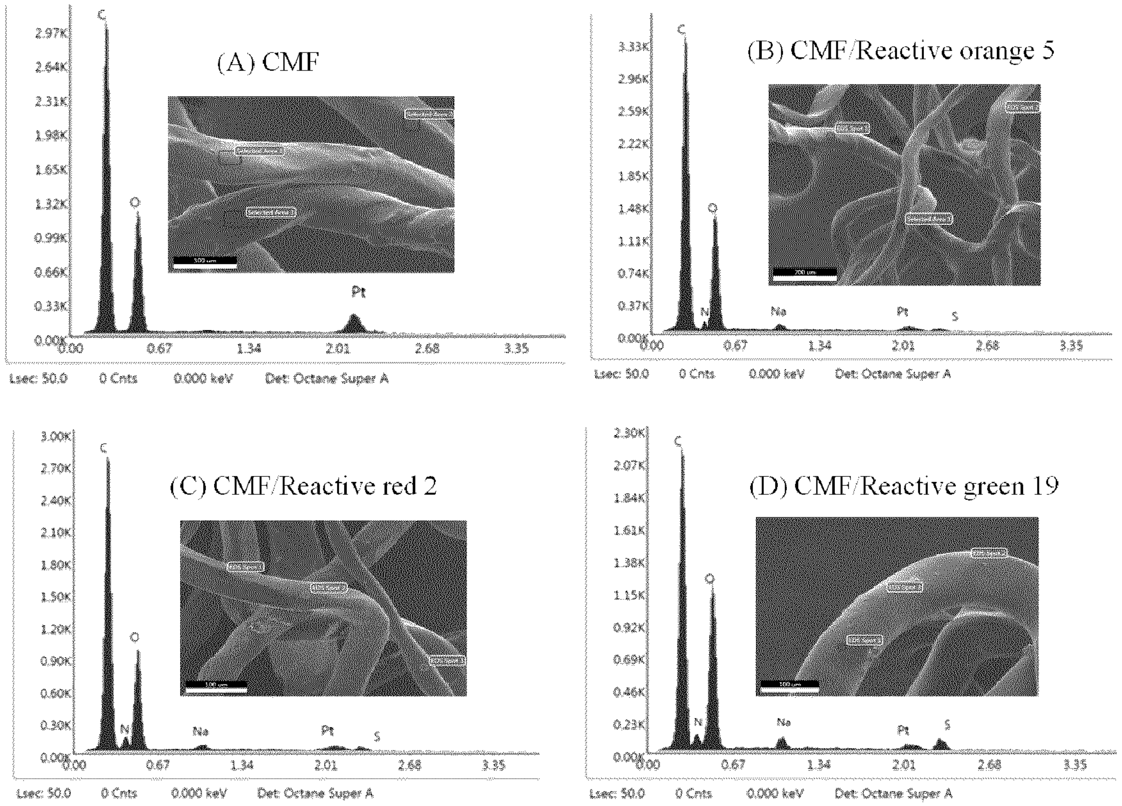
FIG. 24 shows SEM-EDS of textile filaments composed of (A) CMF, (B) CMF bearing reactive orange 5 dye, (C) CMF bearing reactive red 2 dye, and (D) CMF bearing reactive green 19 dye.

The existence of these dyes in the cellulose-based filaments comprising negatively charged cellulose derivative was also investigated by SEM-EDS shown in FIG. 24. The EDS analysis shows the expected presence of C and O atoms of negatively charged cellulose derivative (FIG. 24A). Pt was also obtained in the EDS spectrum due to the Pt coating applied to conduct the SEM analysis. The negatively charged cellulose derivative covalently-linked with dyes (reactive orange 5, reactive red 2 and reactive green 19) showed new peaks for N, Na and S (FIG. 24B, FIG. 24C and FIG. 24D).

Mechanical Properties and Water Absorbency of the Textile Filaments

Figure 25:
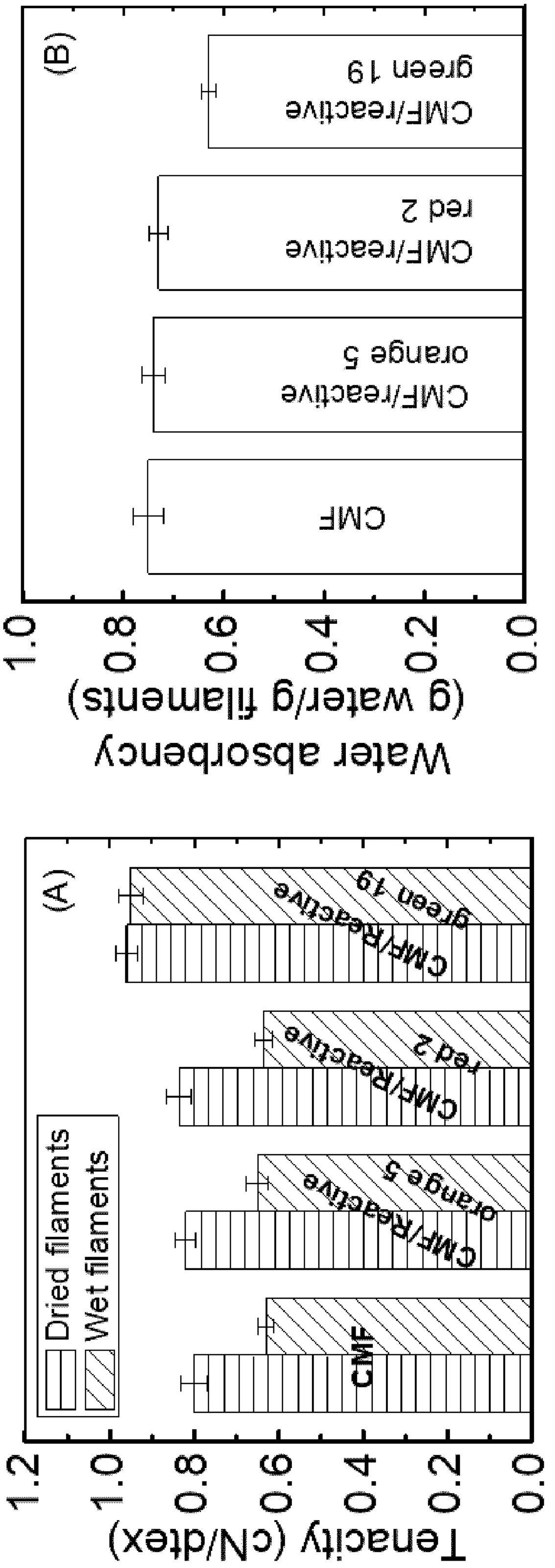
FIG. 25 shows (A) Mechanical properties and (B) Water absorbency of textile filaments according to an embodiment of the present invention.

The mechanical strength of textile filaments is usually expressed in terms of tenacity. The tenacity of both dried and wet filaments was determined. The tenacity of the dried filaments fabricated from the negatively charged cellulose derivative was 0.8 cN/dtex, which was ~21% higher than the tenacity of wet filaments (0.63 cN/dtex) (FIG. 25A). Almost the same tenacity was achieved for the filaments fabricated from negatively charged cellulose derivative covalently-linked with reactive orange 5 and reactive red 2 (FIG. 25A). However, the tenacity of both dry and wet filaments made from the negatively charged cellulose derivative covalently-linked with reactive green 19 were identical (~0.96 cN/dtex), which was ~17% higher than the value of the filaments comprising negatively charged cellulose derivative in dry conditions (FIG. 25A). The identical mechanical strength of the wet and dry filaments obtained from the gel of the negatively charged cellulose derivative covalently-linked by reactive green 19 is likely due to the crosslinking of the cellulose chains through this dye, which prevented loss of tenacity when wet. The higher mechanical strength of the filaments fabricated from the negatively charged cellulose derivative covalently-linked with reactive green 19 as compared to the filaments comprising negatively charged cellulose derivative is likely also due to the generation of a crosslinked structure through the incorporated dye molecules in the negatively charged cellulose derivative. The tenacity of the filaments made from the negatively charged cellulose derivative covalently-linked with reactive green 19 was ~7% higher than the literature value of rayon filaments (0.9 cN/dtex).

Water absorbency is one of the major properties of textile filaments. This property demonstrates the swelling behaviour and the capacity to take up water. The water absorbencies of the filaments made from the negatively charged cellulose derivative, and the negatively charged cellulose derivative covalently-linked with reactive orange 5 and reactive red 2 were ~0.75 water/g filament, which is ~16% higher than that of the filaments made from the negatively charged cellulose derivative covalently-linked with reactive green 19 (0.63 water/g filament) (FIG. 25B). Generally, higher crosslinking of cellulose causes a denser macromolecular network with less capillary spaces in the crosslinked filaments. The crosslinked network reduces swelling of the cellulose molecules by water. For this reason, lower water absorbency was obtained for the filaments made from the negatively charged cellulose derivative covalently-linked with reactive green 19 as compared to that of the filaments made from the negatively charged cellulose derivative. The water absorbency of the filaments made from the negatively charged cellulose derivative covalently-linked with reactive green 19 was ~3.2 to 6.3 times lower than that of rayon filaments (2-4 g water/g filament). This low water absorbency of the fabricated filaments is undoubtedly a good property for high quality textile applications.

Color Fastness Properties

The color fastness properties of the fabricated cellulose-based filaments comprising negatively charged cellulose derivative covalently-linked with reactive orange 5, reactive red 2 and reactive green 19 dyes are presented in Table 5. Colorfastness is the ability provided by dyed filaments to retain dye on them under external effects such as washing with the use of soaps and detergents, rubbing, exposure to light, contact to acid and alkaline solutions etc. Color fastness of a textile material is indicated by the numbers of 1 (poor fastness), 2 (limited fastness), 3 (fair fastness), 4 (good fastness) and 5 (excellent fastness). The fabricated filaments exhibited excellent values of fastness, i.e., 5, to washing, rubbing, light and perspiration. These excellent fastness values indicate no loss of dyes due to covalent bond formation with the negatively charged cellulose derivative under external effects on the fabricated filaments.

TABLE 5

Color fastness properties of the textile filaments.

| Types of textile filament | Types of fastness test | Fastness value |
|---|---|---|
| CMF/Reactive orange 5 | Fastness to washing | 5 |
| | Fastness to rubbing | 5 |
| | Fastness to light | 5 |
| | Fastness to perspiration | 5 (in acidic solution, pH 5) |
| | | 5 (in alkaline solution, pH 9) |
| CMF/Reactive red 2 | Fastness to washing | 5 |
| | Fastness to rubbing | 5 |
| | Fastness to light | 5 |
| | Fastness to perspiration | 5 (in acidic solution, pH 5) |
| | | 5 (in alkaline solution, pH 9) |
| CMF/Reactive green 19 | Fastness to washing | 5 |
| | Fastness to rubbing | 5 |
| | Fastness to light | 5 |
| | Fastness to perspiration | 5 (in acidic solution, pH 5) |
| | | 5 (in alkaline solution, pH 9) |

No Release of Dyes from the Filaments into Acid Bath During Extrusion of Gel

Figure 26:
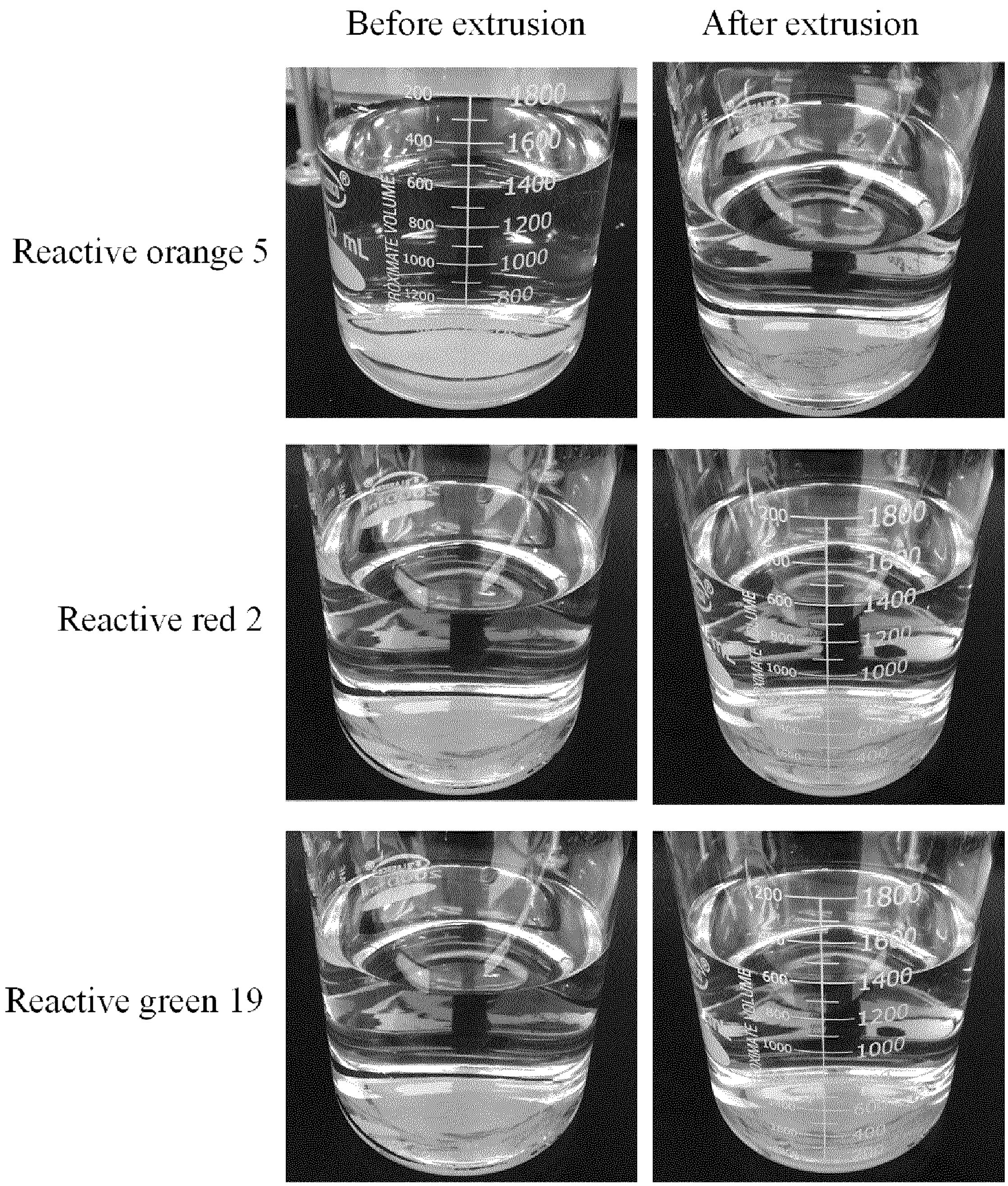
FIG. 26 shows camera images of acid solutions in which dyed textile filaments were extruded from dope solutions.

The negatively charged cellulose derivative formed covalent bonds with the dyes in the dope solution used for extrusion in acid solution bath. Due to these covalent bonds, no dye was released from the filaments into the acid solution utilized for regeneration of cellulose during extrusion. Camera images of the acid solutions used for regeneration of cellulose during extrusion is exhibited in FIG. 26 (before extrusion and after extrusion). Transparency of the acid solutions before and after extrusion were similar indicating no remarkable amount of dye was released from the textile filaments during extrusion.

Conclusions

Dyed textile filaments were fabricated successfully from negatively charged cellulose derivative covalently-linked with the dyes of reactive orange 5, reactive red 2 and reactive green 19 by an eco-friendly method. These three dyes were covalently-linked with the negatively charged cellulose derivative in the dope solution from which dyed textile filaments were fabricated by extrusion in an acid coagulation bath. Thus, no conventional dyeing step was performed for the fabrication of dyed textile filaments. Production of dyed wastewaters is a common scenario in the current textile industries, whereas no colored wastewater was produced in this research. Excellent color fastness properties of the fabricated textile filaments were obtained due to covalent-linkage between dyes and negatively charged cellulose derivative. The incorporation of reactive green 19 dye increased the mechanical strength but decreased the water absorbency of the fabricated textile filaments due to chemical crosslinking of negatively charged cellulose derivative chains through this dye. The increase in mechanical strength, decrease in water absorbency and excellent color fastness could make the fabricated filaments promising candidates for high quality textile applications.

Example 4: Getting Rid of Bubbles

Figure 27:
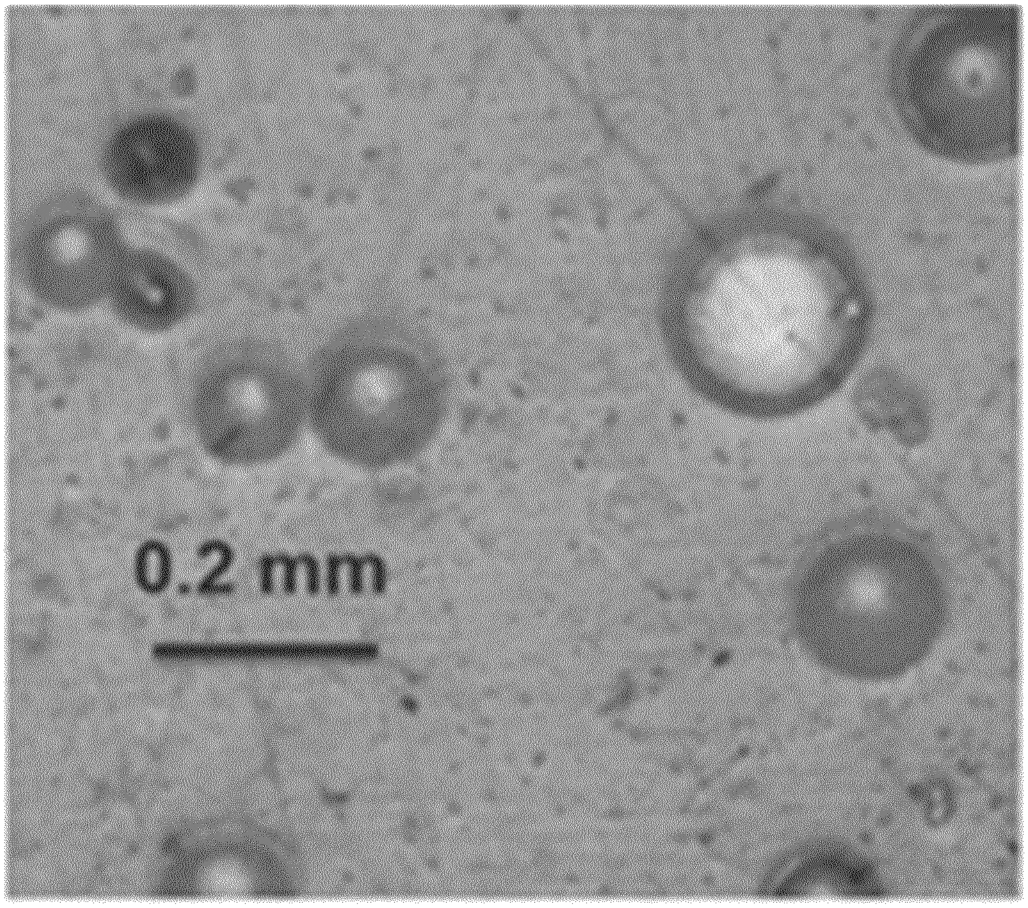
FIG. 27 is an optical microscopy image of a film with a few bubbles.

The inventors have noticed that during regeneration of the alkaline dope of carboxylated cellulose in the acid bath as described above, variable amounts of an unknown gas were formed. Some of this gas would stay in the middle of the films or filaments as bubbles (see FIG. 27) while the rest was released in the acid solution.

The bubbles decreased the mechanical strength and uniformity of the product depending on the size of the bubbles and their rate of formation. In the case of thin filaments, a small number of bubbles inside the filaments generally did not present major problems, but in the case of thin films, bubbles caused visible defects which could be a serious problem. This was especially noticeable for films with thickness >30 μm, designed for packaging, or for films in the range 10-30 μm, which might have other applications.

Degassing the dope did not reduce the number of bubbles, indicating they were not caused by dissolved air.

Figure 28:
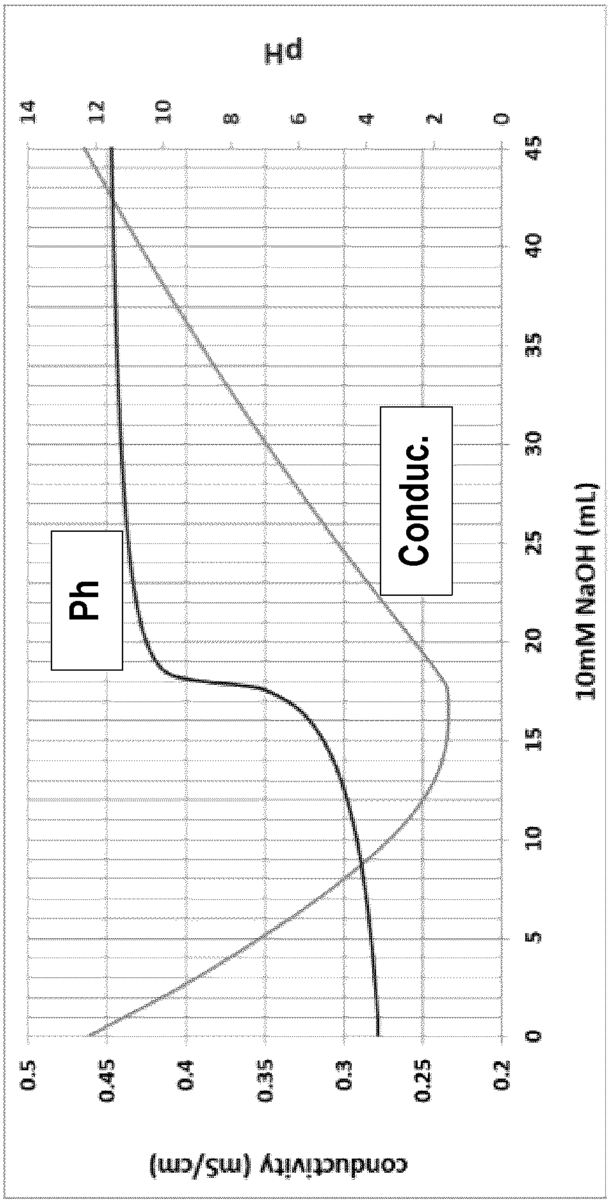
FIG. 28 shows the back titration graph of a CMF which show 0.8 mmol/g decarboxylation.
Figure 29:
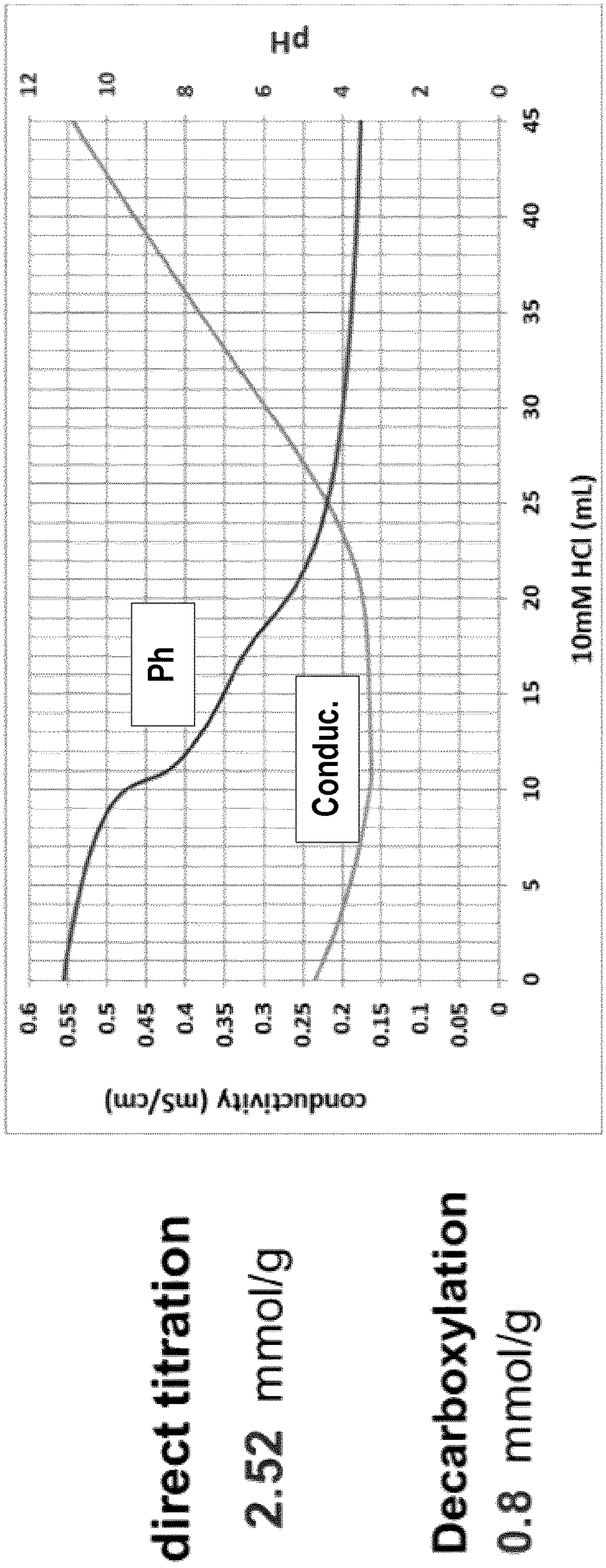
FIG. 29 shows the direct titration graph of a CMF which show 0.8 mmol/g decarboxylation.

After various tests, we finally showed that the amount of carboxyl groups on the cellulose had a direct influence on the rate of bubble formation. We also noted that a high viscosity and the presence of undissolved fiber fragments or microspherical particles in the dope reduced the number of bubbles in the film, likely because they would help to release the gas in the acid bath leaving less bubbles in the film. More specifically, we have shown that up to one third of carboxyl groups in mildly carboxylated cellulose fibers (CMF) are unstable under acidic conditions. When cellulose in a CMF dope, an alkaline carboxymethylated cellulose solution, is regenerated in an acid bath, the unstable carboxyl groups are being decarboxylated and form carbon dioxide, leaving an equivalent amount of methyl groups on the cellulose (FIGS. 28 and 29). The rate of decarboxylation was estimated by comparing the direct and back titration of the CMF (FIGS. 28 and 29). The back titration was 1.72 mmol/g, while the direct titration was 2.52 mmol/g. Therefore 0.8 mmol/g of COOH was removed.

To determine the nature of gas inside the bubbles, we collected and analyzed the released gas and determined it was carbon dioxide, not air. We hypothesized that the carbon dioxide was formed due to partial decarboxylation of the dope.

In order to eliminate bubbles and produce a defect free film with desired carboxyl comprising a partial decarboxylation of the carboxymethyl fiber (CMF) before making the dope, therefore eliminating the unstable carboxyl groups in CMF.

Decarboxylation:

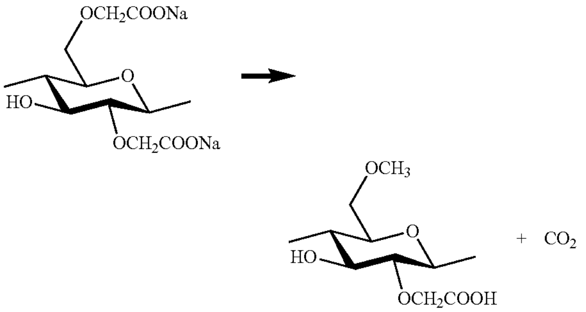

We used two methods to accomplish this partial decarboxylation. Firstly, at the end of the carboxymethylation reaction, we drained most of the isopropyl alcohol (IPA) together with by-products of salts, present in the reaction mixture, and reduced the pH from about 11 to less than 4 (preferably 3.5) by adding a few drops of HCl and allowed the partial decarboxylation and formation of carbon dioxide to proceed. The other method we used was to reduce the pH after CMF was washed and partially drained.

Figure 30:
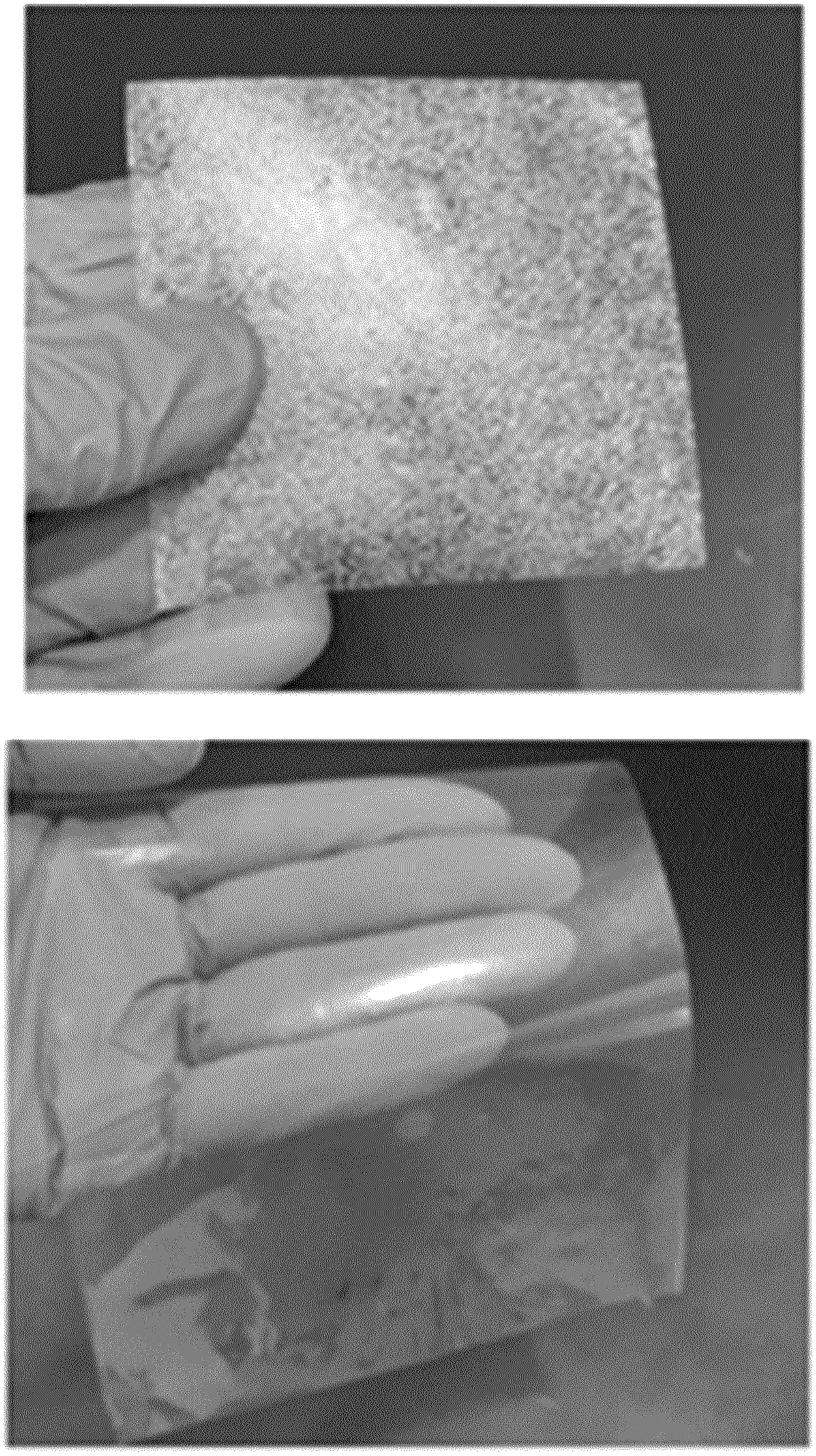
FIG. 30 is (a) an image of a film with plenty of bubbles and (b) an image of a bubble free film made with partial decarboxylation of the CMF before making the dope.

When the unstable carboxyl groups were eliminated according to either of above, prior to dope making and regeneration in an acid bath, there was no decarboxylation and $CO_2$ formation during cellulose regeneration and the films formed were uniform. See FIG. 30 shows a film with bubbles and a partially decarboxylated film which is bubble free.

The scope of the claims should not be limited by the preferred embodiments set forth in the examples, but should be given the broadest interpretation consistent with the description as a whole.

REFERENCES

The present description refers to a number of documents, the content of which is herein incorporated by reference in their entirety. These documents include, but are not limited to, the following:

A I-Kdasi A, Idris A, Saed K, Guan C (2004) Treatment of Textile Wastewater by Advanced Oxidation Processes-A Review. Global Nest Int J 6: 222-230

Adolphe D C, Dolez P I (2018) Advanced strength testing of textiles, Advanced Characterization and Testing of Textiles, The Textile Institute Book Series. 25-57

Alam M N, Christopher L P (2017) A novel, cost-effective and eco-friendly method for preparation of textile fibers from cellulosic pulps. Carbohydrate Polym 173:253-258

Alam M N, Islam M S, Christopher L P (2019) Sustainable production of cellulose-based hydrogels with superb absorbing potential in physiological saline. ACS Omega 4(5): 9419-9426

Al-Hobaib A S, Al-Sheetan K M, Shaik M R, Al-Suhybani M S (2017) Modification of thin-film polyamide membrane with multi-walled carbon nanotubes by interfacial polymerization. Appl Water Sci7:4341-4350

Amirian M, Chakoli N A, Cai W, *Sui* J (2013) Effect of functionalized multiwalled carbon nanotubes on thermal stability of poly (L-LACTIDE) biodegradable polymer. Scientia *Iranica* Transactions F: Nanotechnol 20 (3): 1023-1027

Baughman R H, Zakhidov A A, de Heer W A (2002) Carbon nanotubes—the route toward applications. Science 297: 787-792

BS 1006 (1990) Standard methods for determination of the color fastness of textile and leathers Society of dyes and colorists publication (5th ed.). Bradford, England: The Society of Dyers and Colourists Carmichael A (2015) Man-made fibers continue to grow. Textile World Innovation Forum, 165(1):20

ChaiyasatA, Jearanai S, Christopherc L P, Alam M N (2019) Novel superabsorbentmaterialsfrom bacterial cellulose. Polym. Int. 68:102-109

Dyes and Pigments Textile Dyes (2010). Kolorjet Chemicals Pvt ltd.

Chen Z, Burger C, Wan F, Zhang J, Rong L, Hsiao B S, Chu B, Cai J, Zhang L (2007) Structure study of cellulose fibers wet-spun from environmentally friendly NaOH/urea aqueous solutions. Biomacromolecules, 8(6): 1918-1926

Cai J, Zhang L (2005) Rapid dissolution of cellulose in LiOH/urea and NaOH/urea aqueous solutions. Macromol Biosci 5(6): 539-548

Chavan R B (2011) Handbook to textile and industrial dyeing, Principles, processes and types of dyes, Volume 1 in woodhead publishing series in textiles Casaburi A, Rojo U M, Cerrutti P, Vazquez A, Foresti M L (2018) Carboxymethyl cellulose with tailored degree of substitution obtained from bacterial cellulose. Food Hydrocolloids 75: 147-156

Chaiyasat A, Jearanai S, Christopherc L P, Alam M N (2019) Novel superabsorbentmaterialsfrom bacterial cellulose. Polym Int 68: 102-109

El Seoud O A, Koschella A, Fidale L C, Dorn S, Heinze T (2007) Applications of ionic liquids in carbohydrate chemistry: A window of opportunities. Biomacromol 8(9): 2629-2647

Fushimi F, Watanabe T, Hiyoshi T (1996) Role of interfacial potential in coagulation of cuprammonium cellulose solution. J Appl Polym Sci 59: 15-21

Global Rayon Fibers Market (2014) TechNavio market research report December 24, SKU: IRTNTR4944

Hummel M, Michud A, Tanttu M, Asaadi S, Ma Y, Hauru L K J, Parviainen A, King A W T, Kilpelainen I, Sixta H (2016) Ionic liquids for the production of man-made cellulosic fibers: Opportunities and challenges. Cellulose Chemistry and Properties: Fibers, Nanocelluloses and Advanced Materials 271: 133-168

Ingildeev D, Effenberger F, Bredereck K, Hermanutz F (2013) Comparison of direct solvents for regenerated cellulosic fibers via the lyocell process and by means of ionic liquids. J Appl Polym Sci 128 (6): 4141-4150

Liu Z, Wang H, Li Z (2011) Characterization of the regenerated cellulose films in ionic liquids and rheological properties of the solutions. Mater Chemi Phys 128 (1-2): 220-227

Elliott A, Hanby W, Malcolm B (1954) The Near Infra-Red Absorption Spectra of Natural and Synthetic Fibres. Br J Appl Phys Fei B (2018) High-performance fibers for textiles, Engineering of High-Performance Textiles, The Textile Institute Book Series. 27-58

Ghaly A E, Ananthashankar R, Alhattab M, Ramakrishnan W (2014) Production, characterization and treatment of textile effluents: A critical review. J Chem Eng Process Technol 5:1-18

Kolorjet Chemicals Pvt ltd. (2010) Dyes and Pigments Textile Dyes

Lafi R, Gzara L, Lajimi R H, Hafiane A (2018) Treatment of textile wastewater by a hybrid ultrafiltration/electrodialysis process. Chem Eng Processing: Process Intensification 132:105-113

Liu W, Wang M, Xu L, Zhang W, Xing Z, Hu J, Yu M, Li J, Wu G (2019) Radiation Technology Application in High-Performance Fibers and Functional Textiles, Radiation Technology for Advanced Materials From Basic to Modern Applications. 13-73

Long L, Dengru L, Miao W, Guocheng D, Jian C (2007) Preparation and Characterization of Sponge-like Composites by Cross-Linking Hyaluronic Acid and Carboxymethylcellulose Sodium with Adipic Dihydrazide. Eur Polym J 43:2672-2681

Salvetat J-P, Bonard J-M, Thomson N H, Kulik A J, Forro L, Benoit W, Zuppiroli L (1999) Mechanical properties of carbon nanotubes. Appl Phys A-Mater Sci Process 69:255-260

Subramoney S (1998) Novel Nanocarbons-Structure, Properties, and Potential Applications. Adv Mater 10:1157-1171

Laszkiewicz B, Wcislo P, Cuculo J A (1992) Fibers made from concentrated viscose solutions. J Appl Polym Sci 46 (3):445-448

Mundsinger K, Muller A, Beyer R, Hermanutz F (2015) Multifilament cellulose/chitin blend yarn spun from ionic liquids. Carbohydrate Polym 131: 34-40

Philipp B (1993) Organic solvents for cellulose as a biodegradable polymer and their applicability for cellulose spinning and dervatization. J Macromol Sci, Pure Appl Chemi A 30: 703-714

Rogers R D, Seddon K R (2003) Ionic liquids-solvents of the future. Sci 302(5646): 792-793

Morton W E, Hearle J W S (2008) Physical properties of textile fibers (4th ed.). Boca Raton, FL, USA: Woodhead Publishing Limited and CRC Press LLC Pagga U, Brown D (1986) The Degradability of Dyestuffs: Part II Behaviour of Dyestuffs in Aerobic Biodegradation Tests. Chemosphere 15: 479-491

Singh J P, Verma S (2017) Woven terry fabrics, Manufacturing and quality management, A volume in woodhead publishing series in textiles Sabzalian Z, Alam M N, van de Ven T G M (2014) Hydrophobization and characterization of internally crosslink-reinforced cellulose fibers. Cellulose 21:1381-1393

Sherif M A, Keshk S (2008) Homogenous reactions of cellulose from different natural sources. Carbohydrate Polym 74:942-945

Siddiqua U H, Ali S, Iqbal M, Hussain T (2017) Relationship between structure and dyeing properties of reactive dyes for cotton dyeing. J Molecular Liquids 241:839-844

Thostenson E T, Ren Z F, Chou T-W (2001) Advances in the science and technology of carbon nanotubes and their composites: a review. Compos Sci Technol 61:1899-1912.

Valldeperas-Morell J, Carrillo-Navarrete F (2012) Color fastness. Understanding and Improving the Durability of Textiles p 82-103

Yang H, Tejado A, Alam M N, Antal M, van de Ven T G M (2012) Films prepared from electrosterically stabilized nanocrystalline cellulose. Langmuir 28:7834-7842

Insoluble regenerated cellulose films made from mildly carboxylated dissolving and kraft pulps", M. Moradian, Md S. Islam and T. G. M. van de Ven, Industrial & Engineering Chemistry Research, 60 (15), 5385-5393, 2021

CMC Book, 1$^{st}$ edition, CPKelco, a Huber Company,

A. Vanarek, J. Carette, T. G. M. van de Ven and Md N. Alam, Absorbent fibres produced from low-substituted carboxymethyl cellulose cellulose and the process thereof, U.S. Pat. No. 9,610,379 B2, Apr. 4, 2017

The invention claimed is:

1. A functionalized cellulose comprising a negatively charged cellulose derivative having an at least one anionic functional group, wherein the at least one functional group is covalently bonded to the negatively charged cellulose derivative, wherein the negatively charged cellulose derivative has a charge content of less than or equal to about 1.4 mEq/g of functionalized cellulose, wherein the functionalized cellulose is a spun-re generated functionalized cellulose with a continuous spun-extrudate morphology, wherein the functionalized cellulose has a liquid water absorbency of at most about 0.75 g water/g functionalized cellulose after soaking in deionized water for 12 hours and centrifuging at 1000 g for 10 minutes.

2. The functionalized cellulose of claim 1, wherein the functionalized cellulose has a diameter is-between about 1 μm and about 50 μm.

3. The functionalized cellulose of claim 1, wherein the charge is-content is between about 0.8 and about 1.4 mEq/g of functionalized cellulose.

4. The functionalized cellulose of claim 1, wherein the at least one anionic functional group is covalently bonded at the C2, C3, and/or C6 positions of the glucose units of the functionalized cellulose.

5. The functionalized cellulose of claim 1, wherein the at least one anionic functional group is a carboxyalkyl group, a phosphoryl group, an amine functionalized carboxylated carbon nanotube, reactive orange 5 dye, reactive red 2 dye, reactive green 19 dye, or combinations thereof.

6. The functionalized cellulose of claim 1, wherein the negatively charged cellulose derivative is carboxymethyl cellulose.

7. The functionalized cellulose of claim 1, wherein the functionalized cellulose is free of bubbles.

8. The functionalized cellulose of claim 1, wherein the negatively charged cellulose derivative is partially decarboxylated carboxymethyl cellulose.

9. The functionalized cellulose of claim 1, being produced by a method comprising the steps of:

a) providing a negatively charged cellulose derivative bearing the at least one anionic functional group, wherein the at least one anionic functional group is covalently bonded to the negatively charged cellulose derivative, and wherein the negatively charged cellulose derivative has a charge content greater than or equal to 0.8 mEq/g of cellulose, b) preparing a dope solution comprising the negatively charged cellulose derivative;

c) extruding the dope solution into a coagulation bath so as to obtain functionalized celluloses; and if the functionalized celluloses have a charge content of greater than about 1.4 mEq/g of functionalized cellulose, d1) curing the negatively charged cellulose derivative so as to reduce the charge content to less than or equal to about 1.4 mEq/g of functionalized cellulose, and if the functionalized celluloses have a charge content of less than or equal to about 1.4 mEq/g of functionalized cellulose, d2) optionally curing the negatively charged cellulose derivative, such that the charge content of the functionalized celluloses remains less than or equal to about 1.4 mEq/g of functionalized cellulose.

10. The functionalized cellulose of claim 9, whereby the method further comprises the step of producing the negatively charged cellulose derivative by functionalizing cellulose with the at least one anionic functional group.

11. The functionalized cellulose of claim 9, wherein the negatively charged cellulose derivative is a carboxymethyl cellulose.

12. The functionalized cellulose of claim 11, whereby the method further comprises a step of partially decarboxylating the carboxymethyl cellulose.

13. The functionalized cellulose of claim 12, wherein the step of partially decarboxylating the carboxymethyl cellulose is carried out by exposing the carboxymethyl cellulose to a solution with a pH of less than about 4, then increasing the pH to about 8 in about 15 minutes, and allowing a partial decarboxylation to occur.

14. The functionalized cellulose of claim 9, wherein the dope solution is provided by dissolving the negatively charged cellulose derivative in an alkaline aqueous solution so as to create the dope solution.

15. The functionalized cellulose of claim 9, wherein step d1) and step d2) comprise dipping the functionalized cellulose into a solution of a curing agent.

16. The functionalized cellulose of claim 15, wherein the solution of the curing agent has a pH of about 3.5.

17. The functionalized cellulose of claim 1, whereby the functionalized cellulose is in a bubble-free filament, film or a 3D object.

18. The functionalized cellulose of claim 12, wherein up to about one third of carboxymethyl groups have been replaced by a methyl group in the partially decarboxylated carboxymethyl cellulose.

19. The functionalized cellulose of claim 9, wherein the dope further comprises a crosslinker.

20. The functionalized cellulose of claim 9, wherein the method further comprises a step E) whereby the functionalized cellulose is comprised of a first portion of functionalized cellulose and a second portion of functionalized cellulose, whereby the first portion of functionalized cellulose and the second portion of functionalized cellulose are overlaid in a wet state, and whereby the first portion of functionalized cellulose and the second portion of functionalized cellulose are dried to a dry state for the first portion of functionalized cellulose to stick to the second portion of functionalized cellulose.

* * * * *